United States Patent
Wu

(10) Patent No.: US 10,389,554 B2
(45) Date of Patent: Aug. 20, 2019

(54) PILOT TRANSMISSION METHOD AND DATA TRANSMISSION APPARATUS IN WIRELESS LOCAL AREA NETWORK

(71) Applicant: Huawei Technologies Co., Ltd., Shenzhen (CN)

(72) Inventor: Tao Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 12 days.

(21) Appl. No.: 15/643,104

(22) Filed: Jul. 6, 2017

(65) Prior Publication Data

US 2017/0302481 A1 Oct. 19, 2017

Related U.S. Application Data

(63) Continuation of application No. PCT/CN2015/070292, filed on Jan. 7, 2015.

(51) Int. Cl.
*H04L 25/02* (2006.01)
*H04L 5/00* (2006.01)
(Continued)

(52) U.S. Cl.
CPC ....... *H04L 25/0226* (2013.01); *H04B 7/0452* (2013.01); *H04L 5/0044* (2013.01);
(Continued)

(58) Field of Classification Search
CPC ... H04L 25/0242; H04L 5/0048; H04W 84/12
See application file for complete search history.

(56) References Cited

U.S. PATENT DOCUMENTS

| 9,325,533 B2 * | 4/2016 | Wicker, Jr. .......... H04L 25/0242 |
| 2007/0217615 A1 | 9/2007 | Rajagopal et al. |

(Continued)

FOREIGN PATENT DOCUMENTS

| CN | 1561013 | 1/2005 |
| CN | 1281003 C | 10/2006 |

(Continued)

OTHER PUBLICATIONS

"IEEE Standard for Information technology—Telecommunications and information exchange between systems, Local and metropolitan area networks—Specific requirements, Part 11: Wireless LAN Medium Access Control (MAC) and Physical Layer (PHY) Specifications", IEEE Std 802.11, Mar. 29, 2012, 2793 pages.

(Continued)

*Primary Examiner* — Hoon J Chung

(57) ABSTRACT

Embodiments of the present disclosure provide a pilot transmission method and a data transmission apparatus in a wireless local area network. The pilot transmission method in a wireless local area network in the present disclosure includes: applying a pilot matrix to an LTF to generate a pilot, and sending the pilot, where the pilot matrix includes: a matrix formed from pilot sequences each having a pilot coefficient of each of the spatial flows, where the spatial flow is on M subcarriers in N symbol periods, the pilot matrix is an orthogonal matrix, M is a positive integer multiple of L, and L is a quantity of spatial flows. According to the present disclosure, channel estimation precision can be improved.

18 Claims, 9 Drawing Sheets

(51) Int. Cl.
   *H04W 84/12*   (2009.01)
   *H04L 27/26*   (2006.01)
   *H04B 7/0452*  (2017.01)

(52) U.S. Cl.
   CPC ........ *H04L 5/0048* (2013.01); *H04L 25/0204* (2013.01); *H04L 25/0242* (2013.01); *H04L 27/26* (2013.01); *H04W 84/12* (2013.01)

(56) References Cited

U.S. PATENT DOCUMENTS

| | | | |
|---|---|---|---|
| 2008/0008258 A1* | 1/2008 | Tanabe | H04L 25/0204 375/267 |
| 2008/0212700 A1 | 9/2008 | Han et al. | |
| 2011/0194544 A1 | 8/2011 | Yang et al. | |

FOREIGN PATENT DOCUMENTS

| | | |
|---|---|---|
| CN | 1909403 A | 2/2007 |
| CN | 1909540 A | 2/2007 |
| CN | 101026606 A | 8/2007 |
| CN | 102823212 A | 12/2012 |
| WO | 2008082206 A1 | 7/2008 |
| WO | 2012062123 A1 | 5/2012 |

OTHER PUBLICATIONS

"IEEE Standard for Information technology—Telecommunications and information exchange between systems Local and metropolitan area networks—Specific requirements, Part 11: Wireless LAN Medium Access Control (MAC) and Physical Layer (PHY) Specifications Amendment 4: Enhancements for Very High Throughput for Operation in Bands below 6 GHz", IEEE Std 802.11ac, Dec. 11, 2013, 425 pages.

* cited by examiner

Apply a pilot matrix to an LTF to generate a pilot signal, where the pilot matrix includes: a pilot sequence that consists of pilot coefficients of each spatial flow on M subcarriers in N consecutive symbol periods, where the pilot matrix is an orthogonal matrix, N is a positive integer greater than or equal to L, L is a quantity of spatial flows in a wireless local area network, and M is a positive integer multiple of L — 301

Send the pilot signal on the M subcarriers — 302

FIG. 3

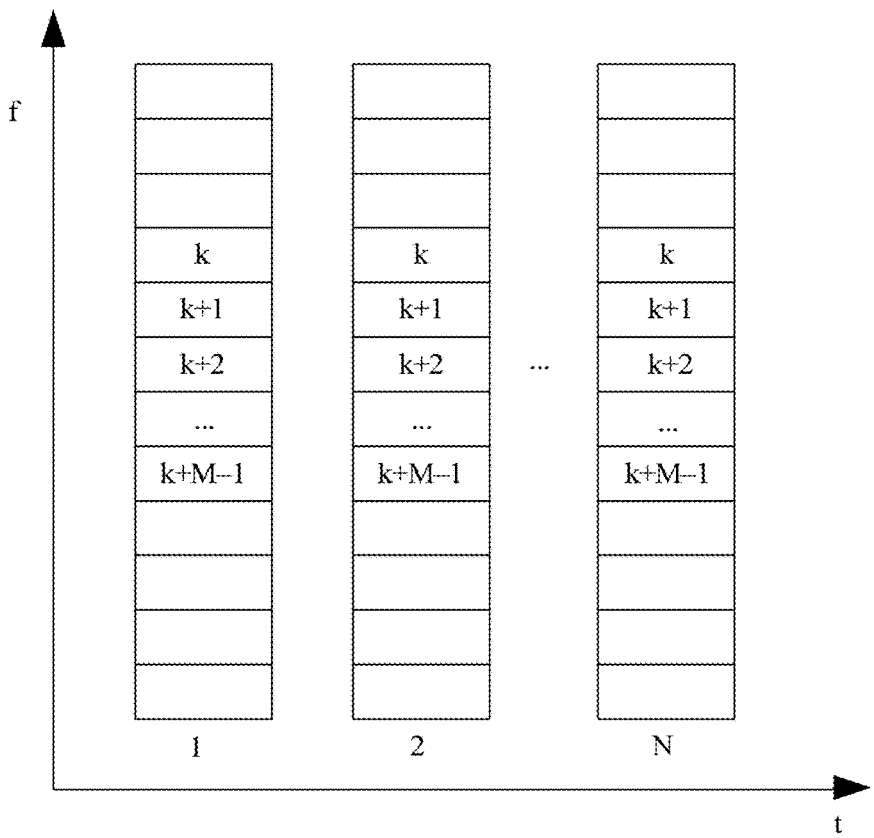

FIG. 4

Receive a pilot signal of each spatial flow on M subcarriers in N consecutive symbol periods separately, where the pilot signal is sent by a transmit end, the pilot signal of each spatial flow is a pilot signal generated by the transmit end by applying a pilot matrix to an LTF, the pilot matrix includes: a pilot sequence that consists of pilot coefficients of each spatial flow on the M subcarriers in the N consecutive symbol periods, the pilot matrix is an orthogonal matrix, N is a positive integer greater than or equal to L, L is a quantity of spatial flows in a wireless local area network, and M is a positive integer multiple of L — 701

Calculate a phase deviation of a transmit antenna corresponding to each spatial flow at the transmit end with reference to the pilot signal of each spatial flow at the transmit end — 702

FIG. 7

901 — A transmit end applies a pilot matrix to an LTF to generate a pilot signal, where the pilot matrix includes: a matrix formed from pilot sequences that each consist of pilot coefficients of two spatial flows successively, where the spatial flows are on each subcarrier in four subcarriers in two consecutive symbol periods, and a matrix formed from pilot sequences that each consist of pilot coefficients of two spatial flows successively, where the spatial flows are on the four subcarriers in each symbol period in the two consecutive symbol periods, the pilot matrix is an orthogonal matrix, the four subcarriers include two groups of subcarriers, and each group of subcarriers includes two subcarriers 902 — The transmit end sends the pilot signal on the four subcarriers 903 — A receive end receives the pilot signal of each spatial flow on the four subcarriers separately in the two consecutive symbol periods, where the pilot signal is sent by the transmit end 904 — The receive end calculates a phase deviation of each transmit antenna at the transmit end with reference to the pilot signal of each spatial flow at the transmit end 905 — The receive end corrects the pilot signal of each spatial flow at the transmit end according to a phase deviation of the transmit antenna corresponding to a first spatial flow at the transmit end and a phase deviation of the transmit antenna corresponding to a second spatial flow at the transmit end 906 — According to the corrected pilot signal and the LTF of each subcarrier in the four contiguous subcarriers, the receive end performs channel estimation on the transmit antenna corresponding to the first spatial flow at the transmit end and the transmit antenna corresponding to the second spatial flow at the transmit end

FIG. 9

PILOT TRANSMISSION METHOD AND DATA TRANSMISSION APPARATUS IN WIRELESS LOCAL AREA NETWORK

CROSS-REFERENCE TO RELATED APPLICATIONS

This application is a continuation of International Application No. PCT/CN2015/070292, filed on Jan. 7, 2015, the disclosure of which is hereby incorporated by reference in its entirety.

TECHNICAL FIELD

Embodiments of the present disclosure relate to the communications technologies, and in particular, to a pilot transmission method and a data transmission apparatus in a wireless local area network.

BACKGROUND

A wireless fidelity (WiFi) technology is a main technical standard of a wireless local area network (WLAN). The technical standard 802.11 formulated by the Institute of Electrical and Electronics Engineers (IEEE) is technically mature after developing into various versions such as 802.11a, 802.11b, 802.11d, 802.11n, and 802.11ac, and a transmission speed is increasingly higher. In another aspect, due to specific flexibility of the WiFi technology, the WiFi technology is widely applied in household and commercial environments. In a WiFi-based WLAN network, a receiver performs a baseband processing procedure on a received signal, mainly including: symbol synchronization, channel estimation, and data preprocessing. The symbol synchronization refers to performing symbol synchronization according to a received short training field (STF) and the received signal to implement frequency synchronization and time synchronization between a transmitter and a receiver. The channel estimation actually uses a received long training field (LTF) to perform channel estimation so as to obtain channel information. The data preprocessing actually refers to performing channel equalization on a signal according to the channel information obtained by means of the channel estimation, so as to eliminate channel impact.

In a multiple-input multiple-output (MIMO) scenario of uplink multiple users, that is, in a scenario in which one access station and at least two stations are included and the access station includes at least two antennas, each station multiplies an LTF by a preset pilot coefficient corresponding to each symbol period on a per-subcarrier basis on the subcarrier of each symbol period in each symbol period of N consecutive symbol periods, and sends the STF to the access station on the subcarrier in each symbol period. A quantity of the at least two stations is N. A frequency deviation between each different station and the access station makes a phase deviation of the transmitters increase over time.

If the access station directly performs channel estimation according to the pilot coefficient corresponding to the subcarrier of each station, the frequency deviation leads to low precision of the channel estimation.

SUMMARY

Embodiments of the present disclosure provide a pilot transmission method and a data transmission apparatus in a wireless local area network to resolve a problem of low channel estimation precision.

According to a first aspect, an embodiment of the present disclosure provides a pilot transmission method in a wireless local area network, including:

applying a pilot matrix to a long training field LTF to generate a pilot signal, where the pilot matrix includes: a matrix formed from pilot sequences that each consist of pilot coefficient of each of the spatial flows, where the spatial flow is on M subcarriers in N consecutive symbol periods, the pilot matrix is an orthogonal matrix, N is a positive integer greater than or equal to L, M is a positive integer multiple of L, and L is a quantity of spatial flows in the wireless local area network; and sending the pilot signal on the M subcarriers.

According to the first aspect, in a first possible implementation manner of the first aspect, the pilot matrix includes: a matrix formed from pilot sequences that each consist of pilot coefficient of each of the spatial flows successively, where the spatial flow is on each subcarrier in the M subcarriers in the N consecutive symbol periods;

a pilot sequence that includes pilot coefficient of the $n^{th}$ spatial flow successively that are sent on the $l^{th}$ subcarrier in the N consecutive symbol periods is $[p''_{1,l}\ p''_{2,l}\ \ldots\ p''_{N,l}]^T$, where n=1, 2, ..., L and l=1, 2, ..., M; and the pilot matrix $P_l$ of L spatial flows on the $l^{th}$ subcarrier in the N consecutive symbol periods is:

$$P_l = \begin{bmatrix} p^1_{1,l} & p^2_{1,l} & \cdots & p^n_{1,l} & \cdots & p^L_{1,l} \\ p^1_{2,l} & p^2_{2,l} & \vdots & p^n_{2,l} & \vdots & p^L_{2,l} \\ \vdots & \vdots & \vdots & \vdots & \vdots & \vdots \\ p^1_{N,l} & p^2_{N,l} & \cdots & p^n_{N,l} & \cdots & p^L_{N,l} \end{bmatrix}.$$

According to the first aspect or the first possible implementation manner of the first aspect, in a second possible implementation manner of the first aspect, the pilot matrix further includes: a matrix formed from pilot sequences that each consist of pilot coefficient of each of the spatial flows successively, where the spatial flow is on the M subcarriers in each symbol period in the N consecutive symbol periods;

a pilot sequence that includes pilot coefficient of the $n^{th}$ spatial flow successively on the M subcarriers in the $l'^{th}$ symbol period is where $[p''_{l',1}\ p''_{l',2}\ \ldots\ p''_{l',L}]^T$, where n=1, 2, ..., L, and l'=1, 2, ..., N; and the pilot matrix $Q_{l'}$ of the L spatial flows on the M subcarriers in the $l'^{th}$ symbol period is:

$$Q_{l'} = \begin{bmatrix} p^1_{l',1} & p^2_{l',1} & \cdots & p^{n_1}_{l',1} & \cdots & p^L_{l',1} \\ p^1_{l',2} & p^2_{l',2} & \vdots & p^{n_1}_{l',2} & \vdots & p^L_{l',2} \\ \vdots & \vdots & \vdots & \vdots & \vdots & \vdots \\ p^1_{l',M} & p^2_{l',M} & \cdots & p^{n_1}_{l',M} & \cdots & p^L_{l',M} \end{bmatrix}.$$

According to any one of the first aspect to the second possible implementation manner of the first aspect, in a third possible implementation manner, the M subcarriers include L groups of subcarriers, and each group of subcarriers includes one subcarrier.

According to any one of the first aspect to the second possible implementation manner of the first aspect, in a fourth possible implementation manner, the M subcarriers include L groups of subcarriers, each group of subcarriers includes two subcarriers, the serial number differences of subcarriers in each group of subcarriers are equal, and the serial number difference of subcarriers in each group of subcarriers is greater than or equal to 1.

According to a second aspect, an embodiment of the present disclosure provides a pilot transmission method in a wireless local area network, including:

receiving a pilot signal of each spatial flow on M subcarriers in N consecutive symbol periods separately, where the pilot signal is sent by a transmit end, the pilot signal of each spatial flow is a pilot signal generated by the transmit end by applying a pilot matrix to a long training field LTF, the pilot matrix includes: a pilot sequence that includes pilot coefficient of each of the spatial flows on the M subcarriers in the N consecutive symbol periods, the pilot matrix is an orthogonal matrix, N is a positive integer greater than or equal to L, L is a quantity of spatial flows in the wireless local area network, and M is a positive integer multiple of L; and calculating a phase deviation of a transmit antenna corresponding to each spatial flow at the transmit end with reference to the pilot signal of each spatial flow at the transmit end.

According to the second aspect, in a first possible implementation manner of the second aspect, the method further includes:

correcting the pilot signal of each spatial flow at the transmit end according to the phase deviation of the transmit antenna corresponding to each spatial flow at the transmit end; and performing channel estimation on the transmit antenna corresponding to each spatial flow at the transmit end according to the corrected pilot signal and the LTF of each subcarrier in the M subcarriers.

According to the second aspect or the first possible implementation manner of the second aspect, in a second possible implementation manner, the pilot matrix includes: a pilot sequence that includes pilot coefficient of each of the spatial flows successively on the M subcarriers in the N consecutive symbol periods;

a pilot sequence that includes pilot coefficient of the $n^{th}$ spatial flow successively that sent on the $l^{th}$ subcarrier in the N consecutive symbol periods is $[p_{1,l}{}^n \ p_{2,l}{}^n \ldots p_{N,l}{}^n]^T$, where n=1, 2, ..., L and l=1, 2, ..., M; and the pilot matrix $P_l$ of L spatial flows on the $l^{th}$ subcarrier in the N consecutive symbol periods is:

$$P_l = \begin{bmatrix} p_{1,l}^1 & p_{1,l}^2 & \cdots & p_{1,l}^{n_1} & \cdots & p_{1,l}^L \\ p_{2,l}^1 & p_{2,l}^2 & \vdots & p_{2,l}^{n_1} & \vdots & p_{2,l}^L \\ \vdots & \vdots & \vdots & \vdots & \vdots & \vdots \\ p_{N,l}^1 & p_{N,l}^2 & \cdots & p_{N,l}^{n_1} & \cdots & p_{N,l}^L \end{bmatrix}.$$

According to any one of the second aspect to the second possible implementation manner of the second aspect, in a third possible implementation manner, the pilot matrix further includes: a pilot sequence that includes pilot coefficient of each of the spatial flows successively on the M subcarriers in each symbol period in the N consecutive symbol periods;

a pilot sequence that includes pilot coefficient of the $n^{th}$ spatial flow successively on the M subcarriers in the $l'^{th}$ symbol period is $[p_{l',1}{}^n, p_{l',2}{}^n \ldots p_{l',L}{}^n]^T$, where n=1, 2, ..., L, and l'=1, 2, ..., N; and the pilot matrix $Q_{l'}$ of the L spatial flows on the M subcarriers in the $l'^{th}$ symbol period is:

$$Q_{l'} = \begin{bmatrix} p_{l',1}^1 & p_{l',1}^2 & \cdots & p_{l',1}^{n_1} & \cdots & p_{l',1}^L \\ p_{l',2}^1 & p_{l',2}^2 & \vdots & p_{l',2}^{n_1} & \vdots & p_{l',2}^L \\ \vdots & \vdots & \vdots & \vdots & \vdots & \vdots \\ p_{l',M}^1 & p_{l',M}^2 & \cdots & p_{l',M}^{n_1} & \cdots & p_{l',M}^L \end{bmatrix}.$$

According to any one of the second aspect to the third possible implementation manner of the second aspect, in a fourth possible implementation manner, the M subcarriers include L groups of subcarriers, and each group of subcarriers includes one subcarrier.

According to any one of the second aspect to the third possible implementation manner of the second aspect, in a fifth possible implementation manner, the M subcarriers include L groups of subcarriers, each group of subcarriers includes two subcarriers, the serial number differences of subcarriers in each group of subcarriers are equal, and the serial number difference of subcarriers in each group of subcarriers is greater than or equal to 1.

According to a third aspect, an embodiment of the present disclosure provides a data transmission apparatus, including:

a processing module, configured to apply a pilot matrix to a long training field LTF to generate a pilot signal, where the pilot matrix includes: a matrix formed from pilot sequences that each consist of pilot coefficient of each of the spatial flows, where the spatial flow is on M subcarriers in N consecutive symbol periods, the pilot matrix is an orthogonal matrix, N is a positive integer greater than or equal to L, L is a quantity of spatial flows in a wireless local area network, and M is a positive integer multiple of L; and a transceiver module, configured to send the pilot signal on the M subcarriers.

According to the third aspect, in a first possible implementation manner of the third aspect, the pilot matrix includes: a matrix formed from pilot sequences that each consist of pilot coefficient of each of the spatial flows successively, where the spatial flow is on each subcarrier in the M subcarriers in the N consecutive symbol periods;

a pilot sequence that includes pilot coefficient of the $n^{th}$ spatial flow successively that are sent on the $l^{th}$ subcarrier in the N consecutive symbol periods is $[p_{1,l}{}^n \ p_{2,l}{}^n \ldots p_{N,l}{}^n]^T$, where n=1, 2, ..., L and l=1, 2, ..., M; and the pilot matrix $P_l$ of L spatial flows on the $l^{th}$ subcarrier in the N consecutive symbol periods is:

$$P_l = \begin{bmatrix} p_{1,l}^1 & p_{1,l}^2 & \cdots & p_{1,l}^n & \cdots & p_{1,l}^L \\ p_{2,l}^1 & p_{2,l}^2 & \vdots & p_{2,l}^n & \vdots & p_{2,l}^L \\ \vdots & \vdots & \vdots & \vdots & \vdots & \vdots \\ p_{N,l}^1 & p_{N,l}^2 & \cdots & p_{N,l}^n & \cdots & p_{N,l}^L \end{bmatrix}.$$

According to the third aspect or the first possible implementation manner of the third aspect, in a second possible implementation manner, the pilot matrix further includes: a matrix formed from pilot sequences that each consist of pilot coefficient of each of the spatial flows successively, where the spatial flow is on the M subcarriers in each symbol period in the N consecutive symbol periods;

a pilot sequence that includes pilot coefficient of the $n^{th}$ spatial flow successively on the M subcarriers in the $l'^{th}$ symbol period is $[p''_{l',1}, p''_{l',2} \ldots p''_{l',L}]^T$, where, n=1, 2, ... L, and l'=1, 2, ..., N; and the pilot matrix $Q_{l'}$ of the L spatial flows on the M subcarriers in the $l^{th}$ symbol period is:

$$Q_{l'} = \begin{bmatrix} p^1_{l',1} & p^2_{l',1} & \cdots & p^{n_1}_{l',1} & \cdots & p^L_{l',1} \\ p^1_{l',2} & p^2_{l',2} & \vdots & p^{n_1}_{l',2} & \vdots & p^L_{l',2} \\ \vdots & \vdots & \vdots & \vdots & \vdots & \vdots \\ p^1_{l',M} & p^2_{l',M} & \cdots & p^{n_1}_{l',M} & \cdots & p^L_{l',M} \end{bmatrix}.$$

According to any one of the third aspect to the second possible implementation manner of the third aspect, in a third possible implementation manner, the M subcarriers include L groups of subcarriers, and each group of subcarriers includes one subcarrier.

According to any one of the third aspect to the second possible implementation manner of the third aspect, in a fourth possible implementation manner, the M subcarriers include L groups of subcarriers, each group of subcarriers includes two subcarriers, the serial number differences of subcarriers in each group of subcarriers are equal, and the serial number difference of subcarriers in each group of subcarriers is greater than or equal to 1.

According to a fourth aspect, an embodiment of the present disclosure provides a data transmission apparatus, including:

a transceiver module, configured to receive a pilot signal of each spatial flow on M subcarriers in N consecutive symbol periods separately, where the pilot signal is sent by a transmit end, the pilot signal of each spatial flow is a pilot signal generated by the transmit end by applying a pilot matrix to a long training field LTF, the pilot matrix includes: a pilot sequence that includes pilot coefficient of each of the spatial flows on the M subcarriers in the N consecutive symbol periods, the pilot matrix is an orthogonal matrix, N is a positive integer greater than or equal to L, L is a quantity of spatial flows in a wireless local area network, and M is a positive integer multiple of L; and a processing module, configured to calculate a phase deviation of a transmit antenna corresponding to each spatial flow at the transmit end with reference to the pilot signal of each spatial flow at the transmit end.

According to the fourth aspect, in a first possible implementation manner of the fourth aspect, the processing module is further configured to correct the pilot signal of each spatial flow at the transmit end according to the phase deviation of the transmit antenna corresponding to each spatial flow at the transmit end; and perform channel estimation on the transmit antenna corresponding to each spatial flow at the transmit end according to the corrected pilot signal and the LTF of each subcarrier in the M subcarriers.

According to the fourth aspect or the first possible implementation manner of the fourth aspect, in a second possible implementation manner, the pilot matrix includes: a pilot sequence that includes pilot coefficient of each of the spatial flows successively on the M subcarriers in the N consecutive symbol periods;

a pilot sequence that includes pilot coefficient of the $n^{th}$ spatial flow successively that sent on the $l^{th}$ subcarrier in the N consecutive symbol periods is $[p^n_{1,l}\ p^n_{2,l} \ldots p^n_{N,l}]^T$, where $n=1, 2, \ldots, L$ and $l=1, 2, \ldots, M$; and the pilot matrix $P_l$ of L spatial flows on the $l^{th}$ subcarrier in the N consecutive symbol periods is:

$$P_l = \begin{bmatrix} p^1_{1,l} & p^2_{1,l} & \cdots & p^{n_1}_{1,l} & \cdots & p^L_{1,l} \\ p^1_{2,l} & p^2_{2,l} & \vdots & p^{n_1}_{2,l} & \vdots & p^L_{2,l} \\ \vdots & \vdots & \vdots & \vdots & \vdots & \vdots \\ p^1_{N,l} & p^2_{N,l} & \cdots & p^{n_1}_{N,l} & \cdots & p^L_{N,l} \end{bmatrix}.$$

According to any one of the fourth aspect to the second possible implementation manner of the fourth aspect, in a third possible implementation manner, the pilot matrix further includes: a pilot sequence that includes pilot coefficient of each of the spatial flows successively on the M subcarriers in each symbol period in the N consecutive symbol periods;

a pilot sequence that includes pilot coefficient of the $n^{th}$ spatial flow successively on the M subcarriers in the $l'^{th}$ symbol period is $[p''_{l',1}\ p''_{l',2} \ldots p''_{l',L}]^T$, where $n=1, 2, \ldots, L$, and $l'=1, 2, \ldots, N$; and the pilot matrix $Q_{l'}$ of the L spatial flows on the M subcarriers in the $l^{th}$ symbol period is:

$$Q_{l'} = \begin{bmatrix} p^1_{l',1} & p^2_{l',1} & \cdots & p^{n_1}_{l',1} & \cdots & p^L_{l',1} \\ p^1_{l',2} & p^2_{l',2} & \vdots & p^{n_1}_{l',2} & \vdots & p^L_{l',2} \\ \vdots & \vdots & \vdots & \vdots & \vdots & \vdots \\ p^1_{l',M} & p^2_{l',M} & \cdots & p^{n_1}_{l',M} & \cdots & p^L_{l',M} \end{bmatrix}.$$

According to any one of the fourth aspect to the third possible implementation manner of the fourth aspect, in a fourth possible implementation manner, the M subcarriers include L groups of subcarriers, and each group of subcarriers includes one subcarrier.

According to any one of the fourth aspect to the third possible implementation manner of the fourth aspect, in a fifth possible implementation manner, the M subcarriers include L groups of subcarriers, each group of subcarriers includes two subcarriers, the serial number differences of subcarriers in each group of subcarriers are equal, and the serial number difference of subcarriers in each group of subcarriers is greater than or equal to 1.

According to the pilot transmission method and the data transmission apparatus in a wireless local area network that are provided in the embodiments of the present disclosure, a pilot matrix is applied to an LTF to generate a pilot signal, where the pilot matrix includes: a pilot sequence that includes pilot coefficient of each of the spatial flows on M subcarriers in N consecutive symbol periods, where the pilot matrix is an orthogonal matrix, N is a positive integer greater than or equal to L, M is a positive integer multiple of L, and L is a quantity of spatial flows in the wireless local area network. Because the pilot matrix is an orthogonal matrix, the pilot signal generated by applying the pilot matrix to the LTF is an orthogonal signal. Therefore, after the pilot signal is sent on the M subcarriers, a receive end may perform an inverse operation on the orthogonal pilot matrix, and a phase deviation of each transmit end is determined by solving each orthogonal signal received by the receive end, and channel estimation precision can be improved by performing channel estimation according to the determined phase deviation.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

FIG. 3 is a flowchart of a pilot transmission method in a wireless local area network according to Embodiment 1 of the present disclosure;

FIG. 4 is a time domain and frequency domain relationship diagram of a subcarrier used in a pilot transmission method in a wireless local area network according to Embodiment 1 of the present disclosure;

FIG. 7 is a flowchart of a pilot transmission method in a wireless local area network according to Embodiment 4 of the present disclosure;

FIG. 9 is a flowchart of a pilot transmission method in a wireless local area network according to Embodiment 6 of the present disclosure;

DETAILED DESCRIPTION

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
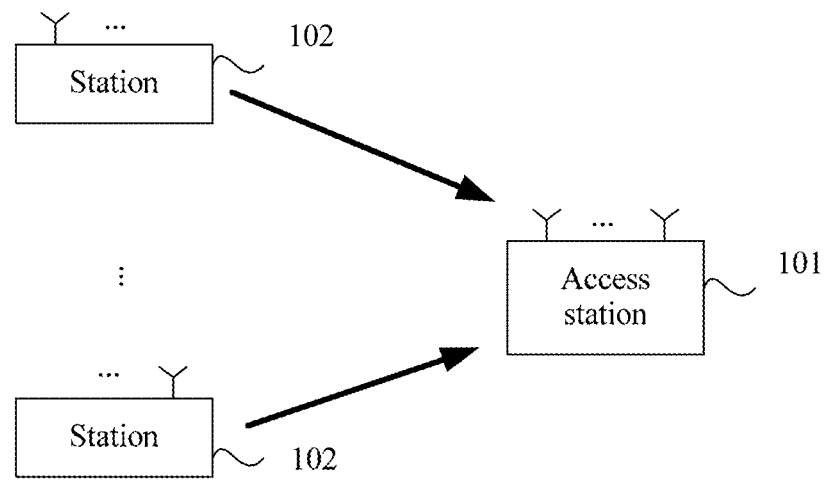
FIG. 1 is a schematic diagram of an application scenario of a pilot transmission method in a wireless local area network according to Embodiment 1 of the present disclosure.

The solution in this embodiment is applicable to WLAN network systems based on WiFi technologies and MIMO technologies that use the 802.11 version and all other later versions. FIG. 1 is a schematic diagram of an application scenario of a pilot transmission method in a wireless local area network according to Embodiment 1 of the present disclosure. As shown in FIG. 1, the WLAN network system may include an access station 101 and at least two stations 102. The access station 101 includes at least two receive antennas, and each station may include at least one transmit antenna. The solution in this embodiment is applicable to a scenario in which the access station receives a spatial flow by using the at least two receive antennas, where the spatial flow is transmitted by the at least two stations by using their respective antennas. Each transmit antenna may transmit one spatial flow.

The station (STA), also referred to as a user, may be a wireless sensor, a wireless communications terminal or a mobile terminal, for example, a mobile phone that supports a WiFi communication function (or referred to as a "cellular" phone) and a computer with a wireless communication function. For example, the station may be a portable, pocket-sized, handheld, computer built-in, wearable, or in-vehicle wireless communications apparatus that supports the WiFi communication function, and the station exchanges communication data such as voice and data with a radio access network. An access point (AP) is also referred to as a wireless access point or a bridge or a hotspot or the like, and may access a server or a communications network. Persons skilled in the art understand that some communications devices may have functions of the access point or the station concurrently, which is not limited herein.

Currently in a WiFi standard, channel estimation is generally implemented based on pilot design of an orthogonal matrix. The following describes different pilot matrices used for 2 flows, 3 flows, and 4 flows respectively in the existing WiFi standard, where a row vector of each pilot matrix denotes a pilot sequence that successively includes pilot coefficient corresponding to one spatial flow in each symbol period of a time domain.

$$F_2 = \begin{pmatrix} 1 & -1 \\ 1 & 1 \end{pmatrix}, F_3 = \begin{pmatrix} 1 & -1 & 1 & 1 \\ 1 & 1 & -1 & 1 \\ 1 & 1 & 1 & -1 \end{pmatrix},$$

$$F_4 = \begin{pmatrix} 1 & -1 & 1 & 1 \\ 1 & 1 & -1 & 1 \\ 1 & 1 & 1 & -1 \\ -1 & 1 & 1 & 1 \end{pmatrix}.$$

Figure 2:
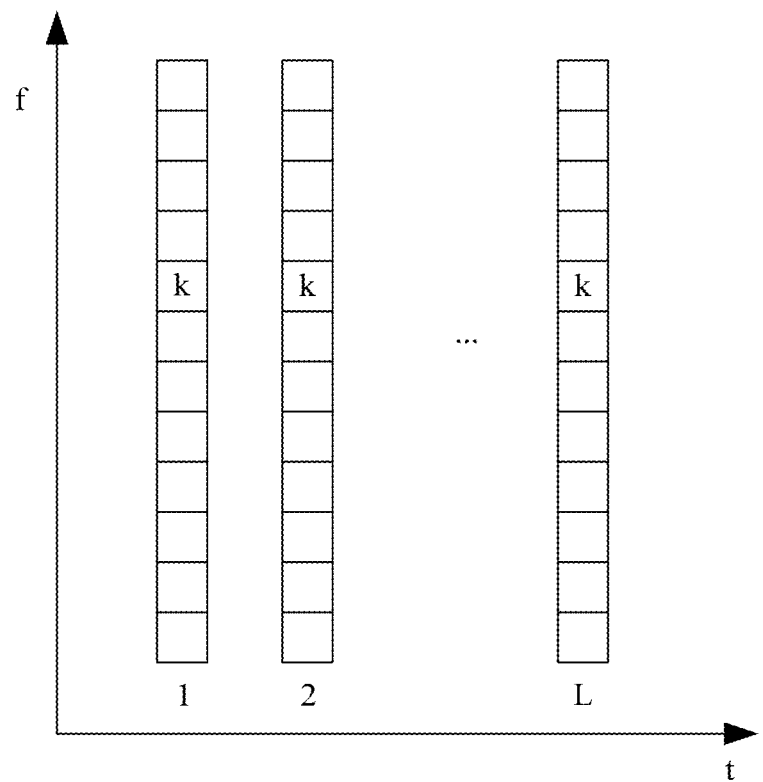
FIG. 2 is a frequency domain and time domain relationship diagram of a subcarrier used in an existing pilot transmission method.

FIG. 2 is a frequency domain and time domain relationship diagram of a subcarrier used in an existing pilot transmission method. In FIG. 2, a horizontal coordinate t from a small value to a large value may denote symbol periods whose time domains are arranged in ascending order, and a vertical coordinate f from a small value to a large value may denote subcarriers whose frequency domains are arranged in ascending order. As shown in FIG. 2, according to the existing pilot transmission method, if a quantity of spatial flows is L, L symbol periods numbered from 1 to L may be selected in the time domain, and one subcarrier numbered k may be selected in the frequency domain.

For example, in a WiFi system, a signal matrix that includes pilot signals of each different spatial flow on each subcarrier in each symbol period may be constructed according to the foregoing matrix in the following way.

If 2 spatial flows exist in a wireless local area network, a pilot signal needs to be generated by using one subcarrier in 2 consecutive symbol periods.

$p_{n,k}^l = F_2(l,k) * LTF_k$, where k is a serial number of a subcarrier, l=1, 2 is a serial number of a spatial flow, n=1, 2 is a serial number of a symbol period, n=1, 2 denotes a value in the $l^{th}$ row and the $n^{th}$ column in an $F_2$ matrix.

According to the foregoing method, a signal matrix of 2 spatial flows may be generated, as shown in Table 1:

TABLE 1

| $LTF_k$ | $-LTF_k$ |
|---|---|
| $LTF_k$ | $LTF_k$ |

If 3 spatial flows exist in a wireless local area network, a pilot signal needs to be generated by using one subcarrier in 3 consecutive symbol periods.

$p_{n,k}{}^l = F_3(l,k) * LTF_k$, where k is a serial number of a subcarrier, l=1, 2, 3 is a serial number of a spatial flow, n=1, 2, 3 is a serial number of a symbol period, $F_3(l,k)$ denotes a value in the $l^{th}$ row and the $n^{th}$ column in an $F_3$ matrix.

According to the foregoing method, a signal matrix of 3 spatial flows may be generated, as shown in Table 2:

TABLE 2

| $LTF_k$ | $-LTF_k$ | $LTF_k$ | $LTF_k$ |
|---|---|---|---|
| $LTF_k$ | $LTF_k$ | $-LTF_k$ | $LTF_k$ |
| $LTF_k$ | $LTF_k$ | $LTF_k$ | $-LTF_k$ |

If 4 spatial flows exist in a wireless local area network, a pilot signal is generated by using one subcarrier in 4 consecutive symbol periods.

$p_{n,k}{}^l = F_4(l,k) * LTF_k$ where k is a serial number of a subcarrier, l=1, 2, 3, 4 is a serial number of a spatial flow, n=1, 2, 3, 4 is a serial number of a symbol period, $F_4(l,k)$ denotes a value in the $l^{th}$ row and the $n^{th}$ column in an $F_4$ matrix.

According to the foregoing method, a signal matrix of 4 spatial flows may be generated, as shown in Table 3:

TABLE 3

| $LTF_k$ | $-LTF_k$ | $LTF_k$ | $LTF_k$ |
|---|---|---|---|
| $LTF_k$ | $LTF_k$ | $-LTF_k$ | $LTF_k$ |
| $LTF_k$ | $LTF_k$ | $LTF_k$ | $-LTF_k$ |
| $-LTF_k$ | $LTF_k$ | $LTF_k$ | $LTF_k$ |

According to Embodiment 1 of the present disclosure, a pilot transmission method in a wireless local area network is provided. FIG. 3 is a flowchart of a pilot transmission method in a wireless local area network according to Embodiment 1 of the present disclosure. The method is executed by a transmit end. The transmit end may be a transmit end of a station or an access point.

As shown in FIG. 3, the method in Embodiment 1 includes the following steps.

Step 301: Apply a pilot matrix to an LTF to generate a pilot signal, where the pilot matrix includes: a pilot sequence that includes pilot coefficient of each of the spatial flows on M subcarriers in N consecutive symbol periods, where the pilot matrix is an orthogonal matrix, N is a positive integer greater than or equal to L, L is a quantity of spatial flows in the wireless local area network, and M is a positive integer multiple of L.

The LTF may be a high throughput long training field (High Throughput Long Training Field, HTLTF for short). The LTF corresponding to each subcarrier in the M subcarriers may be preconfigured.

The applying a pilot matrix to an LTF to generate a pilot signal may be: multiplying an LTF corresponding to each subcarrier in the M subcarriers by the pilot coefficient of each spatial flow corresponding to each subcarrier in the M subcarriers in the N consecutive symbol periods, so as to generate the pilot signal.

The symbol period may be a symbol period corresponding to one time period in multiple time periods obtained by dividing a time domain for each timeslot included in a radio frame. A time length of a symbol period may be determined according to a timeslot division method, for example, a quantity of symbol periods of each timeslot. The N consecutive symbol periods may be time domain periods corresponding to N consecutive orthogonal frequency division multiplexing (Orthogonal Frequency Division Multiplexing, OFDM for short) symbols in the time domain. The quantity of symbol periods is N, which is greater than or equal to the quantity L of spatial flows in a wireless local area network. That is, the quantity of symbol periods may be determined according to the quantity of spatial flows in the wireless local area network.

The M subcarriers include at least one pilot subcarrier (Pilot Subcarrier), and each subcarrier in the M subcarriers may be used to transmit a pilot. A preset quantity of pilot subcarriers are reserved in each symbol period used to transmit data in the WiFi standard. The pilot subcarrier included in the M subcarriers may be any pilot subcarrier. The quantity of subcarriers is M, the quantity of spatial flows is L, and M is a positive integer multiple of L, that is, the quantity of subcarriers may also be a positive integer multiple of the quantity of spatial flows in the wireless local area network. Adjacent subcarriers in the M subcarriers may be contiguous in the frequency domain.

FIG. 4 is a time domain and frequency domain relationship diagram of a subcarrier used in a pilot transmission method in a wireless local area network according to Embodiment 1 of the present disclosure. In FIG. 4, a horizontal coordinate t from a small value to a large value may denote symbol periods whose time domains are arranged in ascending order, and a vertical coordinate f from a small value to a large value may denote subcarriers whose frequency domains are arranged in ascending order. The pilot matrix includes: a pilot sequence that includes pilot coefficient of each of the spatial flows on the M subcarriers in the N consecutive symbol periods. From FIG. 4, it can be learned that according to the pilot transmission method provided in Embodiment 1 of the present disclosure, if the quantity of spatial flows is L, N symbol periods numbered from 1 to N may be selected in the time domain, and M subcarriers numbered from k to k+M-1 may be selected in the frequency domain.

The pilot matrix includes: a pilot sequence that includes pilot coefficient of each of the spatial flows on M subcarriers in N consecutive symbol periods, and the pilot matrix is an orthogonal matrix. Therefore, each pilot signal of each subcarrier in the M subcarriers, which is generated by applying the pilot matrix to the LTF, is an orthogonal signal.

Step 302: Send the pilot signal on the M subcarriers.

The sending the pilot signal on the M subcarriers may be: sending a pilot signal corresponding to each subcarrier on each subcarrier in the M subcarriers. The pilot signal is an orthogonal signal, the pilot signal is sent to a receive end, and the receive end may perform an inverse operation on the orthogonal pilot matrix. Therefore, a phase deviation of each transmit end is determined by solving each orthogonal signal received by the receive end, and channel estimation precision can be improved by performing channel estimation according to the determined phase deviation.

According to the pilot transmission method provided in Embodiment 1 of the present disclosure, a pilot matrix is applied to an LTF to generate a pilot signal, where the pilot matrix includes: a pilot sequence that includes pilot coefficient of each of the spatial flows on M subcarriers in N consecutive symbol periods, where the pilot matrix is an orthogonal matrix, N is a positive integer greater than or equal to L, M is a positive integer multiple of L, and L is a quantity of spatial flows in a wireless local area network. Because the pilot matrix is an orthogonal matrix, the pilot signal generated by applying the pilot matrix to the LTF is an orthogonal signal. Therefore, after the pilot signal is sent on the M subcarriers, a receive end may perform an inverse operation on the orthogonal pilot matrix, and a phase deviation of each transmit end is determined by solving each orthogonal signal received by the receive end, and channel estimation precision can be improved by performing channel estimation according to the determined phase deviation.

Embodiment 2

According to Embodiment 2 of the present disclosure, a pilot transmission method is further provided.

Optionally, the pilot matrix includes: a pilot sequence that includes pilot coefficient of each of the spatial flows successively on each subcarrier in the M subcarriers in the N consecutive symbol periods.

Specifically, the pilot sequence that includes pilot coefficient of each of the spatial flows successively on each subcarrier in the M subcarriers in the N consecutive symbol periods may be a pilot sequence that is formed successively in ascending order of the time domains of the N consecutive symbol periods. That is, each pilot sequence in the pilot matrix may be a pilot sequence that includes pilot coefficient of each of the spatial flows successively on each subcarrier in ascending order of the time domains of the N consecutive symbol periods. Therefore, the pilot matrix may be a pilot matrix of each spatial flow on each subcarrier in the N consecutive symbol periods.

A pilot sequence that includes pilot coefficient of the $n^{th}$ spatial flow successively that are sent on the $l^{th}$ subcarrier in the N consecutive symbol periods is $[p^n{}_{1,l}\ p^n{}_{2,l} \ldots p^n{}_{N,l}]^T$, where and n=1, 2, ..., L, and l=1, 2, ..., M.

The pilot matrix of L spatial flows on the $l^{th}$ subcarrier in the N consecutive symbol periods may be denoted by $P_l$, and $P_l$ may be denoted by Formula (1):

$$P_l = \begin{bmatrix} p^1_{1,l} & p^2_{1,l} & \cdots & p^n_{1,l} & \cdots & p^L_{1,l} \\ p^1_{2,l} & p^2_{2,l} & \vdots & p^n_{2,l} & \vdots & p^L_{2,l} \\ \vdots & \vdots & \vdots & \vdots & \vdots & \vdots \\ p^1_{N,l} & p^2_{N,l} & \cdots & p^n_{N,l} & \cdots & p^L_{N,l} \end{bmatrix} \quad (1)$$

$P_l$ is an orthogonal matrix. That is, $P_l$ may be denoted by Formula (2):

$$P_l^H * P_l = qI \quad (2).$$

$P_l^H$ is a conjugate transpose matrix of $P_l$, q is a constant, and I is a diagonal matrix, that is, an identity matrix.

The pilot matrix includes: a pilot sequence that includes pilot coefficient of each of the spatial flows successively on each subcarrier in the M subcarriers in N consecutive symbol periods, and the pilot matrix is an orthogonal matrix. Therefore, each pilot sequence that includes pilot coefficient of each of the spatial flows successively on each subcarrier in the M subcarriers in the N consecutive symbol periods is an orthogonal sequence. Therefore, a product of a conjugate transpose of a pilot sequence that includes pilot coefficient of one spatial flow successively on each subcarrier in the M subcarriers in the N consecutive symbol periods, and a pilot sequence that includes pilot coefficient of another spatial flow successively, is 0.

For example, the N consecutive symbol periods may be denoted by 1, 2, ..., N successively, and the spatial flow is denoted by the $n_1{}^{th}$ spatial flow, expressed as $n_1$. A pilot coefficient of the spatial flow on the $l^{th}$ subcarrier in the $1^{st}$ symbol period may be denoted by $p^{n_1}{}_{1,l}$, a pilot coefficient of the spatial flow on the $l^{th}$ subcarrier in the $2^{nd}$ symbol period may be denoted by $p^{n_2}{}_{2,l}$, and a pilot coefficient of the spatial flow on the $l^{th}$ subcarrier in the $N^{th}$ symbol period may be denoted by $p^{n_1}{}_{N,l}$. Therefore, the pilot sequence that includes pilot coefficient of the spatial flow successively on the $l^{th}$ subcarrier in the N consecutive symbol periods may be $[p^{n_1}{}_{1,l}\ p^{n_1}{}_{2,l} \ldots p^{n_1}{}_{N,l}]^T$, where $(\ )^T$ denotes a transpose, that is, the pilot sequence is a column vector.

The another spatial flow may be the $n_2{}^{th}$ spatial flow, expressed as $n_2$. A pilot sequence that includes pilot coefficient of the another spatial flow on each subcarrier in the M subcarriers in the N consecutive symbol periods may be $[p^{n_2}{}_{1,l}\ p^{n_2}{}_{2,l} \ldots p^{n_2}{}_{N,l}]^T$. Because the spatial flow and the another spatial flow are different spatial flows, $n_1 \neq n_2$. A relationship between a transpose of a pilot sequence that includes pilot coefficient of the spatial flow successively on each subcarrier in the M subcarriers in the N consecutive symbol periods, and a pilot sequence that includes pilot coefficient of the another spatial flow successively, may be denoted by Formula (3):

$$([p^{n_1}_{1,l}\ p^{n_1}_{2,l}\ \cdots\ p^{n_1}_{N,l}]^T)^H * [p^{n_2}_{1,l}\ p^{n_2}_{2,l}\ \cdots\ p^{n_2}_{N,l}]^T = \quad (3)$$
$$[p^{n_1*}_{1,l}\ p^{n_1*}_1\ \cdots\ p^{n_1*}_{N,l}] * [p^{n_2}_{1,l}\ p^{n_2}_{2,l}\ \cdots\ p^{n_2}_{N,l}]^T = 0$$

$([p^{n_1}{}_{1,l}\ p^{n_1}{}_{2,l} \ldots p^{n_1}{}_{N,l}]^T)^H$ may be a conjugate transpose sequence of $[p^{n_1}{}_{1,l}\ p^{n_1}{}_{2,l} \ldots p^{n_1}{}_{N,l}]^T$, and $p^{n_1*}{}_{1,l}$ may be a conjugate signal of $p^{n_1}{}_{1,l}$, and so on. Therefore, both of the two pilot sequences are orthogonal sequences.

It should be noted that the foregoing description uses the $l^{th}$ subcarrier in the N consecutive symbol periods as an example. A pilot sequence that includes pilot coefficient of each of the spatial flows successively on other subcarriers in the N consecutive symbol periods, and a matrix formed from pilot sequences that each consist of pilot coefficient of the L spatial flows successively, may be similar to that on the $l^{th}$ subcarrier, and details are not described herein.

Optionally, the pilot matrix further includes: a pilot sequence that includes pilot coefficient of each of the spatial flows successively on the M subcarriers in each symbol period in the N consecutive symbol periods.

Specifically, the pilot sequence that includes pilot coefficient of each of the spatial flows successively on the M subcarriers in each symbol period in the N consecutive symbol periods may be a pilot sequence that is formed successively in ascending order of the frequency domains on the M subcarriers. That is, each pilot sequence in the pilot matrix may be a pilot sequence that includes pilot coefficient of each of the spatial flows successively in each symbol period in ascending order of the frequency domains of the M subcarriers. The frequency domains of the M subcarriers may be determined according to the serial numbers of the M subcarriers. Generally, a larger serial number of a subcarrier indicates a larger frequency domain of the subcarrier. Therefore, the pilot matrix may be a pilot matrix of each spatial flow on the M subcarriers in each symbol period.

A pilot sequence that includes pilot coefficient of the $n^{th}$ spatial flow successively on the M subcarriers in the $l'^{th}$ symbol period is $[p^n_{l',1}\ p^n_{l',2}\ \ldots\ p^n_{l',L}]^T$, where $n=1, 2, \ldots, L$, and $l'=1, 2, \ldots, N$.

The pilot matrix of L spatial flows on the M subcarriers in the $l'^{th}$ symbol period may be denoted by $Q_{l'}$, and $Q_{l'}$ may be denoted by Formula (4):

$$Q_{l'} = \begin{bmatrix} p^1_{l',1} & p^2_{l',1} & \cdots & p^{n_1}_{l',1} & \cdots & p^L_{l',1} \\ p^1_{l',2} & p^2_{l',2} & \vdots & p^{n_1}_{l',2} & \vdots & p^L_{l',2} \\ \vdots & \vdots & \vdots & \vdots & \vdots & \vdots \\ p^1_{l',M} & p^2_{l',M} & \cdots & p^{n_1}_{l',M} & \cdots & p^L_{l',M} \end{bmatrix} \quad (4)$$

$Q_{l'}$ is an orthogonal matrix. That is, $Q_{l'}$ may be denoted by Formula (5):

$$Q_{l'}^H * Q_{l'} = q'I \quad (5)$$

$Q_{l'}^H$ is a conjugate transpose matrix $Q_{l'}$, of q' is a constant, and I is a diagonal matrix, that is, an identity matrix.

The pilot matrix includes: a pilot sequence that includes pilot coefficient of each of the spatial flows successively on the M subcarriers in each symbol period in the N consecutive symbol periods, and the pilot matrix is an orthogonal matrix. Therefore, each pilot sequence that includes pilot coefficient of each of the spatial flows successively on the M subcarriers in each symbol period is an orthogonal sequence. Therefore, a product of a conjugate transpose of a pilot sequence that includes pilot coefficient of each of the spatial flows successively on the M subcarriers in each symbol period, and a pilot sequence that includes pilot coefficient of another spatial flow successively, is 0.

For example, if the frequency domains of adjacent subcarriers in the M subcarriers are contiguous and k is 1, the M subcarriers may be denoted by 1, 2, ..., M successively, and the spatial flow is denoted by the $n_1^{th}$ spatial flow, expressed as $n_1$. A pilot coefficient of the spatial flow on the $1^{st}$ subcarrier in the $l'^{th}$ symbol period may be denoted by $p^{n_1}_{l',1}$, a pilot coefficient of the spatial flow on the $2^{nd}$ subcarrier in the $l'^{th}$ symbol period may be denoted by $p^{n_1}_{l',2}$, and a pilot coefficient of the spatial flow on the $M^{th}$ subcarrier in the $l'^{th}$ symbol period may be denoted by $p^{n_1}_{l',M}$. Therefore, the pilot sequence that includes pilot coefficient of the spatial flow successively on the M subcarriers in the $l'^{th}$ symbol period may be $[p^{n_1}_{l',1}\ p^{n_1}_{l',2}\ \ldots\ p^{n_1}_{l',M}]^T$.

The another spatial flow may be the $n_2^{th}$ spatial flow, expressed as $n_2$. A pilot sequence that includes pilot coefficient of another spatial flow station successively on the M subcarriers in each symbol period may be $[p^{n_2}_{l',1}\ p^{n_2}_{l',2}\ \ldots\ p^{n_2}_{l',M}]^T$. Because the spatial flow and the another spatial flow are different spatial flows, $n_1 \neq n_2$. A relationship between a pilot sequence that includes pilot coefficient of the spatial flow successively on the M subcarriers in each symbol period in the N consecutive symbol periods, and a pilot sequence that includes pilot coefficient of the another spatial flow successively, may be denoted by Formula (6):

$$([p^{n_1}_{l',1} p^{n_1}_{l',2} \ldots p^{n_1}_{l',M}]^T)^H * [p^{n_2}_{l',1} p^{n_2}_{l',2} \ldots p^{n_2}_{l',M}]^T =$$
$$([p^{n_1*}_{l',1} p^{n_1*}_{l',2} \ldots p^{n_1*}_{l',M}]^T * [p^{n_2}_{l',1} p^{n_2}_{l',2} \ldots$$
$$p^{n_2}_{l',M}]^T = 0 \quad (6)$$

$([p^{n_1}_{l',1}\ p^{n_1}_{l',2}\ \ldots\ p^{n_1}_{l',M}]^T)^H$ may be a conjugate transpose sequence of $[p^{n_1}_{l',1}\ p^{n_1}_{l',2}\ \ldots\ p^{n_1}_{l',M}]^T$, and $p^{n_1*}_{l',1}$ may be a conjugate signal of $p^{n_1}_{l',1}$, and so on.

It should be noted that the foregoing description uses the M subcarriers in the $l'^{th}$ symbol period as an example. A pilot sequence that includes pilot coefficient of each of the spatial flows successively in other symbol periods in the N consecutive symbol periods, and a matrix formed from pilot sequences that each consist of pilot coefficient of the L spatial flows successively, may be similar to that in the $l'^{th}$ symbol period, and details are not described herein.

Embodiment 3

According to Embodiment 3 of the present disclosure, a pilot transmission method is further provided. Optionally, M subcarriers include L groups of subcarriers, and each group of subcarriers includes one subcarrier.

If each group of subcarriers includes one subcarrier, that is, M is equal to L, the M subcarriers may be L contiguous subcarriers.

Specifically, if a multipath effect of channels in a current network system is relatively low, it may be considered that channel information of adjacent subcarriers is the same. Therefore, L groups of subcarriers, that is, L contiguous subcarriers, are selected, in which each group of subcarriers includes one subcarrier.

Figure 5:
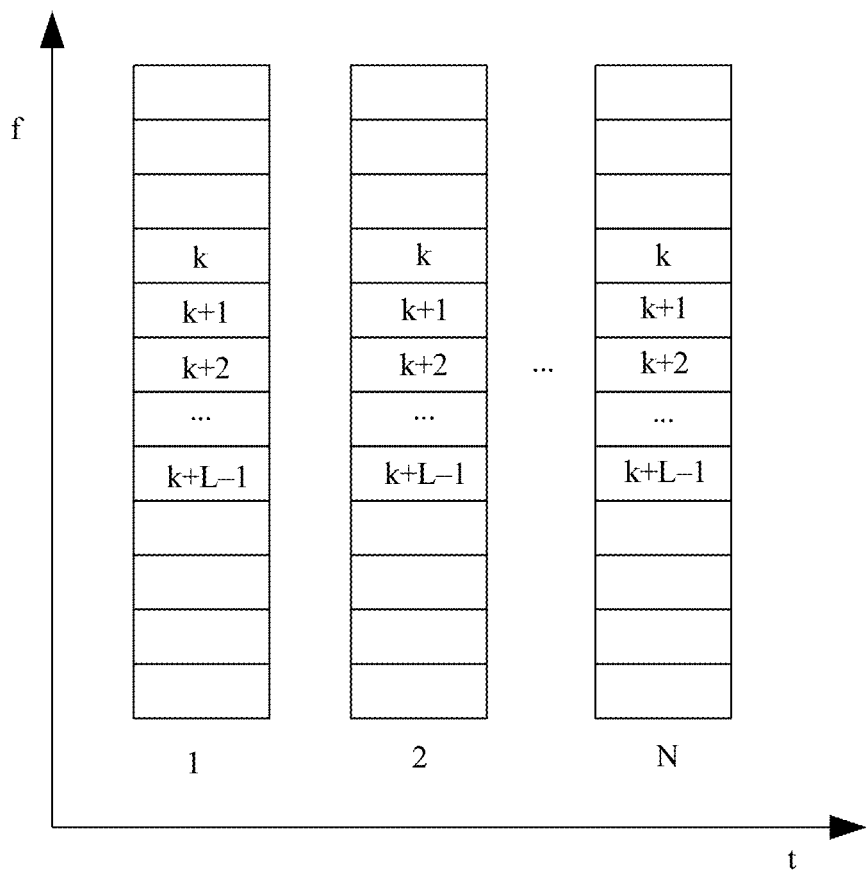
FIG. 5 is a time domain and frequency domain relationship diagram of a subcarrier used in a pilot transmission method in a wireless local area network according to Embodiment 3 of the present disclosure.

FIG. 5 is a time domain and frequency domain relationship diagram of a subcarrier used in a pilot transmission method in a wireless local area network according to Embodiment 3 of the present disclosure. In FIG. 5, a horizontal coordinate t from a small value to a large value may denote symbol periods whose time domains are arranged in ascending order, and a vertical coordinate f from a small value to a large value may denote subcarriers whose frequency domains are arranged in ascending order. From FIG. 5, it can be learned that according to the pilot transmission method provided in Embodiment 3 of the present disclosure, if the quantity of spatial flows is L, N symbol periods numbered from 1 to N may be selected in the time domain, and M subcarriers numbered from k to k+L−1 may be selected in the frequency domain.

The L contiguous subcarriers refer to L contiguous subcarriers in a frequency domain. The M subcarriers are L contiguous subcarriers. If a station sends a pilot to the access station on the L contiguous subcarriers, the access station may use channel information of one subcarrier to replace channel information of an adjacent subcarrier according to a characteristic that adjacent subcarriers have the same channel information, thereby simplifying calculation performed by the access station on a phase deviation of each station and improving calculation precision.

For example, it is assumed that a quantity of spatial flows in a wireless local area network is 2. The two spatial flows are a first spatial flow and a second spatial flow respectively. The two consecutive symbol periods may be symbol periods numbered i and i+1 respectively, and the two contiguous subcarriers may be subcarriers numbered j and j+1 respectively. A pilot coefficient of the first spatial flow on the subcarrier numbered j in the symbol period numbered i may be $p^1_{i,j}$, a pilot coefficient of the first spatial flow on the subcarrier numbered j in the symbol period numbered i+1 may be $p^1_{i+1,j}$, a pilot coefficient of the first spatial flow on the subcarrier numbered j+1 in the symbol period numbered i may be $p^1_{i,j+1}$, and a pilot coefficient of the first spatial flow on the subcarrier numbered j+1 in the symbol period numbered i+1 may be $p^1_{i+1,j+1}$. Correspondingly, a pilot coefficient of the second spatial flow on the subcarrier numbered j in the symbol period numbered i may be $p^2_{i,j}$, a pilot coefficient of the second spatial flow on the subcarrier numbered j in the symbol period numbered i+1 may be $p^2_{i+1,j}$, a pilot coefficient of the second spatial flow on the subcarrier numbered j+1 in the symbol period numbered i may be $p^2_{i,j+1}$, and a pilot coefficient of the second spatial flow on the subcarrier numbered j+1 in the symbol period numbered i+1 may be $p^2_{i+1,j+1}$.

Therefore, a pilot sequence that includes pilot coefficient of the first spatial flow successively on the subcarrier numbered j in the two consecutive symbol periods may be $[p^1_{i,j} \ p^1_{i+1,j}]^T$, and a pilot sequence that includes pilot coefficient of the second spatial flow successively may be $[p^2_{i,j} \ p^2_{i+1,j}]^T$. A relationship between the pilot sequence that includes pilot coefficient of the first spatial flow successively on the subcarrier numbered j in the two consecutive symbol periods and the pilot sequence that includes pilot coefficient of the second spatial flow successively may be denoted by Formula (7):

$$([p^1_{i,j}p^1_{i+1,j}]^T)^{H*}[p^2_{i,j}p^2_{i+1,j}]^T = 0 \qquad (7)$$

A matrix formed from the pilot sequence that includes pilot coefficient of the first spatial flow successively on the subcarrier numbered j in the two consecutive symbol periods and the pilot sequence that includes pilot coefficient of the second spatial flow successively may be $P_j$, and $P_j$ may be denoted by Formula (8):

$$P_j = \begin{bmatrix} p^1_{i,j} & p^2_{i,j} \\ p^1_{i+1,j} & p^2_{i+1,j} \end{bmatrix} \qquad (8)$$

$P_j$ may be an orthogonal matrix. Therefore, the pilot sequence that includes pilot coefficient of the first spatial flow successively on the subcarrier numbered j in the two consecutive symbol periods and the pilot sequence that includes pilot coefficient of the second spatial flow successively are both orthogonal sequences.

A pilot sequence that includes pilot coefficient of the first spatial flow successively on the subcarrier numbered j+1 in the two consecutive symbol periods may be $[p^1_{i,j+1} \ p^1_{i+1,j+1}]^T$, and a pilot sequence that includes pilot coefficient of the second spatial flow successively may be $[p^2_{i,j+1} \ p^2_{i+1,j+1}]^T$. A relationship between the pilot sequence that includes pilot coefficient of the first spatial flow successively on the subcarrier numbered j+1 in the two consecutive symbol periods and the pilot sequence that includes pilot coefficient of the second spatial flow successively may be denoted by Formula (9):

$$([p^2_{i,j+1}p^2_{i+1,j+1}]^T)^{H*}[p^1_{i,j+1}p^1_{i+1,j+1}]^T = 0 \qquad (9)$$

A matrix formed from the pilot sequence that includes pilot coefficient of the first spatial flow successively on the subcarrier numbered j+1 in the two consecutive symbol periods and the pilot sequence that includes pilot coefficient of the second spatial flow successively may be $P_{j+1}$, and $P_{j+1}$ may be denoted by Formula (10):

$$P_{j+1} = \begin{bmatrix} p^1_{i,j+1} & p^2_{i,j+1} \\ p^1_{i+1,j+1} & p^2_{i+1,j+1} \end{bmatrix} \qquad (10)$$

$P_{j+1}$ may be an orthogonal matrix. That is, the pilot sequence that includes pilot coefficient of the first spatial flow successively on the subcarrier numbered j+1 in the two consecutive symbol periods and the pilot sequence that includes pilot coefficient of the second spatial flow successively are both orthogonal sequences.

A pilot sequence that includes pilot coefficient of the first spatial flow successively on the two subcarriers in the symbol period numbered i may be $[p^1_{i,j} \ p^1_{i,j+1}]^T$, and a pilot sequence that includes pilot coefficient of the second spatial flow successively may be $[p^2_{i,j} \ p^2_{i,j+1}]^T$. A relationship between the pilot sequence that includes pilot coefficient of the first spatial flow successively on the two subcarriers in the symbol period numbered i and the pilot sequence that includes pilot coefficient of the second spatial flow successively may be denoted by Formula (11):

$$([p^2_{i,j}p^2_{i,j+1}]^T)^{H*}[p^1_{i,j}p^1_{i,j+1}]^T = 0 \qquad (11)$$

A matrix formed from the pilot sequence that includes pilot coefficient of the first spatial flow successively on the two subcarriers in the symbol period numbered i and the pilot sequence that includes pilot coefficient of the second spatial flow successively may be $Q_i$, and $Q_i$ may be denoted by Formula (12):

$$Q_i = \begin{bmatrix} p^1_{i,j} & p^2_{i,j} \\ p^1_{i,j+1} & p^2_{i,j+1} \end{bmatrix} \qquad (12)$$

$Q_i$ may be an orthogonal matrix. That is, all the pilot sequences that each consist of pilot coefficient of each of the spatial flows successively on the two subcarriers in the symbol period numbered i are orthogonal sequences.

A pilot sequence that includes pilot coefficient of the first spatial flow successively on the two subcarriers in the symbol period numbered i+1 may be $[p^1_{i+1,j} \ p^1_{i+1,j+1}]^T$, and a pilot sequence that includes pilot coefficient of the second spatial flow successively may be $[p^2_{i+1,j} \ p^2_{i+1,j+1}]^T$. A relationship between the pilot sequence that includes pilot coefficient of the first spatial flow successively on the two subcarriers in the symbol period numbered i+1 and the pilot sequence that includes pilot coefficient of the second spatial flow successively may be denoted by Formula (13):

$$([p^2_{i+1,j}p^2_{i+1,j+1}]^T)^H[p^1_{i+1,j}p^1_{i+1,j+1}]^T = 0 \qquad (13)$$

A matrix formed from the pilot sequence that includes pilot coefficient of the first spatial flow successively on the two subcarriers in the symbol period numbered i+1 and the pilot sequence that includes pilot coefficient of the second spatial flow successively may be $Q_{i+1}$, and $Q_{i+1}$ may be denoted by Formula (14):

$$Q_{i+1} = \begin{bmatrix} p^1_{i+1,j} & p^2_{i+1,j} \\ p^1_{i+1,j+1} & p^2_{i+1,j+1} \end{bmatrix} \qquad (14)$$

$Q_{i+1}$ may be an orthogonal matrix. That is, the pilot sequence that includes pilot coefficient of the first spatial flow successively on the two subcarriers in the symbol period numbered i+1 and the pilot sequence that includes pilot coefficient of the second spatial flow successively are both orthogonal sequences.

It can be learned from the foregoing description that, if the quantity of spatial flows in the wireless local area network is 2, $P_j$, $P_{j+1}$, $Q_i$, and $Q_{i+1}$ are all orthogonal matrices.

It is assumed that the quantity of spatial flows in the wireless local area network is 3. The three spatial flows are a first spatial flow, a second spatial flow, and a third spatial flow. The three consecutive symbol periods may be symbol periods numbered i, i+1, and i+2 respectively, and the three contiguous subcarriers may be subcarriers numbered j, j+1, and j+2 respectively.

Therefore, a pilot coefficient of the first spatial flow on the subcarrier numbered j in the symbol period numbered i may be $p^1_{i,j}$, a pilot coefficient of the first spatial flow on the subcarrier numbered j in the symbol period numbered i+1 may be $p^1_{i+1,j}$, and a pilot coefficient of the first spatial flow on the subcarrier numbered j in the symbol period numbered i+2 may be $p^1_{i+2,j}$; a pilot coefficient of the first spatial flow on the subcarrier numbered j+1 in the symbol period numbered i may be $p^1_{i,j+1}$, a pilot coefficient of the first spatial flow on the subcarrier numbered j+1 in the symbol period numbered i+1 may be $p^1_{i+1,j+1}$, and a pilot coefficient of the first spatial flow on the subcarrier numbered j+1 in the symbol period numbered i+2 may be $p^1_{i+2,j+1}$; and a pilot coefficient of the first spatial flow on the subcarrier numbered j+2 in the symbol period numbered i may be $p^1_{i,j+2}$, a pilot coefficient of the first spatial flow on the subcarrier numbered j+2 in the symbol period numbered i+1 may be $p^1_{i+1,j+2}$, and a pilot coefficient of the first spatial flow on the subcarrier numbered j+2 in the symbol period numbered i+2 may be $p^1_{i+2,j+2}$. Correspondingly, a pilot coefficient of the second spatial flow on the subcarrier numbered j in the symbol period numbered i may be $p^2_{i,j}$, a pilot coefficient of the second spatial flow on the subcarrier numbered j in the symbol period numbered i+1 may be $p^2_{i+1,j}$, and a pilot coefficient of the second spatial flow on the subcarrier numbered j in the symbol period numbered i+2 may be $p^2_{i+2,j}$; a pilot coefficient of the second spatial flow on the subcarrier numbered j+1 in the symbol period numbered i may be $p^2_{i,j+1}$, a pilot coefficient of the second spatial flow on the subcarrier numbered j+1 in the symbol period numbered i+1 may be $p^2_{i+1,j+1}$, and a pilot coefficient of the second spatial flow on the subcarrier numbered j+1 in the symbol period numbered i+2 may be $p^2_{i+2,j+1}$; and a pilot coefficient of the second spatial flow on the subcarrier numbered j+2 in the symbol period numbered i may be $p^2_{i,j+2}$, a pilot coefficient of the second spatial flow on the subcarrier numbered j+2 in the symbol period numbered i+1 may be $p^2_{i+1,j+2}$, and a pilot coefficient of the second spatial flow on the subcarrier numbered j+2 in the symbol period numbered i+2 may be $p^2_{i+2,j+2}$. A pilot coefficient of the third spatial flow on the subcarrier numbered j in the symbol period numbered i may be $p^3_{i,j}$, a pilot coefficient of the third spatial flow on the subcarrier numbered j in the symbol period numbered i+1 may be $p^3_{i+1,j}$, and a pilot coefficient of the third spatial flow on the subcarrier numbered j in the symbol period numbered i+2 may be $p^3_{i+2,j}$; a pilot coefficient of the third spatial flow on the subcarrier numbered j+1 in the symbol period numbered i may be $p^3_{i,j+1}$, a pilot coefficient of the third spatial flow on the subcarrier numbered j+1 in the symbol period numbered i+1 may be $p_{i+1,j+1}$, and a pilot coefficient of the third spatial flow on the subcarrier numbered j+1 in the symbol period numbered i+2 may be $p^3_{i+2,j+1}$; and a pilot coefficient of the third spatial flow on the subcarrier numbered j+2 in the symbol period numbered i may be $p^3_{i,j+2}$, a pilot coefficient of the third spatial flow on the subcarrier numbered j+2 in the symbol period numbered i+1 may be $p^3_{i+1,j+2}$, and a pilot coefficient of the third spatial flow on the subcarrier numbered j+2 in the symbol period numbered i+2 may be $p^3_{i+2,j+2}$.

Therefore, a pilot sequence that includes pilot coefficient of the first spatial flow successively on the subcarrier numbered j in the three consecutive symbol periods may be $[p^1_{i,j}\ p^1_{i+1,j}\ p^1_{i+2,j}]^T$, a pilot sequence that includes pilot coefficient of the second spatial flow successively on the subcarrier numbered j in the three consecutive symbol periods may be $[p^2_{i,j}\ p^2_{i+1,j}\ p^2_{i+2,j}]^T$, and a pilot sequence that includes pilot coefficient of the third spatial flow successively on the subcarrier numbered j in the three consecutive symbol periods may be $[p^3_{i,j}\ p^3_{i+1,j}\ p^3_{i+2,j}]^T$.

A relationship between the pilot sequences that each consist of pilot coefficient of different spatial flows successively on the subcarrier numbered j in the three consecutive symbol periods may be denoted by Formula (15):

$$([p^{n2}_{i,j} p^{n2}_{i+1,j} p^{n2}_{i+2,j}]^T)^{H*}[p^{n1}_{i,j} p^{n1}_{i+1,j} p^{n1}_{i+2,j}]^T = 0 \quad (15)$$

In Formula (15), $n_1 \neq n_2$. $[p^{n1}_{i,j}\ p^{n1}_{i+1,j}\ p^{n1}_{i+2,j}]^T$ and $[p^{n2}_{i,j}\ p^{n2}_{i+1,j}\ p^{n2}_{i+2,j}]^T$ are pilot sequences that each consist of pilot coefficient of any two different spatial flows in the three spatial flows successively on the subcarrier numbered j in the three consecutive symbol periods.

A matrix formed from the pilot sequence that includes pilot coefficient of the first spatial flow successively on the subcarrier numbered j in the three consecutive symbol periods, the pilot sequence that includes pilot coefficient of the second spatial flow successively, and the pilot sequence that includes pilot coefficient of the third spatial flow successively may be $P_j$, and $P_j$ may be denoted by Formula (16):

$$P_j = \begin{bmatrix} p^1_{i,j} & p^2_{i,j} & p^3_{i,j} \\ p^1_{i+1,j} & p^2_{i+1,j} & p^3_{i+1,j} \\ p^1_{i+2,j} & p^2_{i+2,j} & p^3_{i+2,j} \end{bmatrix} \quad (16)$$

Because all the pilot sequences that each consist of pilot coefficient of each of the spatial flows successively on the subcarrier numbered j in the three consecutive symbol periods are orthogonal sequences, $P_j$ may be an orthogonal matrix.

A pilot sequence that includes pilot coefficient of the first spatial flow successively on the subcarrier numbered j+1 in the three consecutive symbol periods may be $[p^1_{i,j+1}\ p^1_{i+1,j+1}\ p^1_{i+2,j+1}]^T$, a pilot sequence that includes pilot coefficient of the second spatial flow successively may be $[p^2_{i,j+1}\ p^2_{i+1,j+1}\ p^2_{i+2,j+1}]^T$, and a pilot sequence that includes pilot coefficient of the third spatial flow successively may be $[p^2_{i,j+1}\ p^3_{i-1,j+1}\ p^3_{i-2,j+1}]^T$.

A relationship between the pilot sequences that each consist of pilot coefficient of different spatial flows successively on the subcarrier numbered j+1 in the three consecutive symbol periods may be denoted by Formula (17):

$$([p^{n2}_{i,j+1} p^{n2}_{i+1,j+1} p^{n2}_{i+2,j+1}]^T)^{H*}[p^{n1}_{i,j+1}\ p^{n1}_{i+1,j+1} p^{n1}_{i-2,j+1}]^T = 0 \quad (17)$$

In Formula (17), $n_1 \neq n_2$. $[p^{n2}_{i,j+1}\ p^{n2}_{i+1,j+1}\ p^{n2}_{i+2,j+1}]^T$, and $[p^{n2}_{i,j}\ p^{n2}_{i+1}\ p^{n2}_{i+2,j}]^T$ are pilot sequences that each consist of pilot coefficient of any two different spatial flows in the three spatial flows successively on the subcarrier numbered j+1 in the three consecutive symbol periods.

A matrix formed from the pilot sequences that each consist of pilot coefficient of spatial flows successively on the subcarrier numbered j+1 in the three consecutive symbol periods may be $P_{j+1}$, and $P_{j+1}$ may be denoted by Formula (18):

$$P_{j+1} = \begin{bmatrix} p^1_{i,j+1} & p^2_{i,j+1} & p^3_{i,j+1} \\ p^1_{i+1,j+1} & p^2_{i+1,j+1} & p^3_{i+1,j+1} \\ p^1_{i+2,j+1} & p^2_{i+2,j+1} & p^3_{i+2,j+1} \end{bmatrix} \quad (18)$$

Because all the pilot sequences that each consist of pilot coefficient of each of the spatial flows successively on the subcarrier numbered j+1 in the three consecutive symbol periods are orthogonal sequences, $P_{j+1}$ may be an orthogonal matrix.

A pilot sequence that includes pilot coefficient of the first spatial flow successively on the subcarrier numbered j+2 in the three consecutive symbol periods may be $[p^1_{i,j+2}\ p^1_{i+1,j+2}\ p^1_{i+2,j+2}]^T$, a pilot sequence that includes pilot coefficient of the second spatial flow successively may be $[p^2_{i,j+2}\ p^2_{i+1,j+2}\ p^2_{i+2,j+2}]^T$, and a pilot sequence that includes pilot coefficient of the third spatial flow successively may be $[p^3_{i,j+2}\ p^3_{i+1,j+2}\ p^3_{i+2,j+2}]^T$.

A relationship between the pilot sequences that each consist of pilot coefficient of different spatial flows successively on the subcarrier numbered j+2 in the three consecutive symbol periods may be denoted by Formula (19):

$$([p^{n2}_{i,j+2}\,p^{n2}_{i+1,j+2}\,p^{n2}_{i+2,j+2}]^T)^{H*}[p^{n1}_{i,j+2}\,p^{n1}_{i+1,j+2}\,p^{n1}_{i+2,j+2}]^T = 0 \quad (19)$$

In Formula (19), $n_1 \neq n_2$. $[p^{n1}_{i,j+2}\ p^{n1}_{i+1,j+2}\ p^{n1}_{i+2,j+2}]^T$, and $[p^{n2}_{i,j+2}\ p^{n2}_{i+1,j+2}\ p^{n2}_{i+2,j+2}]^T$, are pilot sequences that each consist of pilot coefficient of any two different spatial flows in the three spatial flows successively on the subcarrier numbered j+2 in the three consecutive symbol periods.

A matrix formed from the pilot sequences that each consist of pilot coefficient of spatial flows successively on the subcarrier numbered j+2 in the three consecutive symbol periods may be $P_{j+2}$, and $P_{j+2}$ may be denoted by Formula (20):

$$P_{j+2} = \begin{bmatrix} P^1_{i,j+2} & P^2_{i,j+2} & P^3_{i,j+2} \\ P^1_{i+1,j+2} & P^2_{i+1,j+2} & P^3_{i+1,j+2} \\ P^1_{i+2,j+2} & P^2_{i+2,j+2} & P^3_{i+2,j+1} \end{bmatrix} \quad (20)$$

Because all the pilot sequences that each consist of pilot coefficient of each of the spatial flows successively on the subcarrier numbered j+2 in the three consecutive symbol periods are orthogonal sequences, $P_{j+2}$ may be an orthogonal matrix.

A pilot sequence that includes pilot coefficient of the first spatial flow successively on the three subcarriers in the symbol period numbered i may be $[p^1_{i,j}\ p^1_{i,j+1}\ p^1_{i,j+2}]^T$, a pilot sequence that includes pilot coefficient of the second spatial flow successively may be $[p^2_{i,j}\ p^2_{i,j+2}\ p^2_{i,j+2}]^T$, and a pilot sequence that includes pilot coefficient of the third spatial flow successively may be $[p^3_{i,j}\ p^3_{i,j+2}\ p^3_{i,j+2}]^T$.

A relationship between the pilot sequences that each consist of pilot coefficient of different spatial flows successively on the three subcarriers in the symbol period numbered i may be denoted by Formula (21):

$$([p^{n2}_{i,j}\,p^{n2}_{i,j+1}\,p^{n2}_{i,j+2}]^T)^{H*}[p^{n1}_{i,j}\,p^{n1}_{i,j+1}\,p^{n1}_{i,j+2}]^T = 0 \quad (21)$$

In Formula (21), $n_1 \neq n_2$. $[p^{n1}_{i,j}\ p^{n1}_{i,j+1}\ p^{n1}_{i,j+2}]^T$, and $[p^{n2}_{i,j}\ p^{n2}_{i,j+1}\ p^{n2}_{i,j+2}]^T$ are pilot sequences that each consist of pilot coefficient of any two different stations in the three spatial flows successively on the three subcarriers in the symbol period numbered i.

A matrix formed from the pilot sequences that each consist of pilot coefficient of each of the spatial flows successively on the three subcarriers in the symbol period numbered i may be $Q_i$, and $Q_i$ may be denoted by Formula (22):

$$Q_i = \begin{bmatrix} P^1_{i,j} & P^2_{i,j} & P^3_{i,j} \\ P^1_{i,j+1} & P^2_{i,j+1} & P^3_{i,j+1} \\ P^1_{i,j+2} & P^2_{i,j+2} & P^3_{i,j+2} \end{bmatrix} \quad (22)$$

All the pilot sequences that each consist of pilot coefficient of each of the spatial flows successively on the three subcarriers in the symbol period numbered i are orthogonal sequences. Therefore, $Q_i$ may be an orthogonal matrix.

A pilot sequence that includes pilot coefficient of the first spatial flow successively on the three subcarriers in the symbol period numbered i+1 may be $[p^1_{i+1,j}\ p^1_{i+1,j+1}\ p^1_{i+1,j+2}]^T$, a pilot sequence that includes pilot coefficient of the second spatial flow successively may be $[p^2_{i+1,j}\ p^2_{i+1,j+1}\ p^2_{i+1,j+2}]^T$, and a pilot sequence that includes pilot coefficient of the third spatial flow successively may be $[p^3_{i+1,j}\ p^3_{i+1,j+1}\ p^3_{i+1,j+2}]^T$.

A relationship between the pilot sequences that each consist of pilot coefficient of different spatial flows successively on the three subcarriers in the symbol period numbered i+1 may be denoted by Formula (23):

$$([p^{n2}_{i+1,j}\,p^{n2}_{i+1,j+1}\,p^{n2}_{i+1,j+2}]^T)^{H*}[p^{n1}_{i+1,j}\,p^{n1}_{i+1,j+1}\,p^{n1}_{i+1,j+2}]^T = 0 \quad (23)$$

In Formula (23), $n_1 \neq n_2$. $[p^{n1}_{i+1,j}\ p^{n1}_{i+1,j+1}\ p^{n1}_{i+1,j+2}]^T$ and $[p^{n2}_{i+1,j}\ p^{n2}_{i+1,j+1}\ p^{n2}_{i+1,j+2}]^T$ are pilot sequences that each consist of pilot coefficient of any two different spatial flows in three stations successively on the three subcarriers in the symbol period numbered i+1.

A matrix formed from the pilot sequences that each consist of pilot coefficient of each of the spatial flows successively on the three subcarriers in the symbol period numbered i+1 may be $Q_{i+1}$, and $Q_{i+1}$ may be denoted by Formula (24):

$$Q_{i+1} = \begin{bmatrix} P^1_{i+1,j} & P^2_{i+1,j} & P^3_{i+1,j} \\ P^1_{i+1,j+1} & P^2_{i+1,j+1} & P^3_{i+1,j+1} \\ P^1_{i+1,j+2} & P^2_{i+1,j+2} & P^3_{i+1,j+2} \end{bmatrix} \quad (24)$$

All the pilot sequences that each consist of pilot coefficient of each of the spatial flows successively on the three subcarriers in the symbol period numbered i+1 are orthogonal sequences. Therefore, $Q_{i+1}$ is also an orthogonal matrix.

A pilot sequence that includes pilot coefficient of the first spatial flow successively on the three subcarriers in the symbol period numbered i+2 may be $[p^1_{i+2,j}\ p^1_{i+2,j+1}\ p^1_{i+2,j+2}]^T$, a pilot sequence that includes pilot coefficient of the second spatial flow successively may be $[p^2_{i+2,j}\ p^2_{i+2,j+1}\ p^2_{i+2,j+2}]^T$, and a pilot sequence that includes pilot coefficient of the third spatial flow successively may be $[p^3_{i+2,j}\ p^3_{i+2,j+1}\ p^3_{i+2,j+2}]^T$.

A relationship between the pilot sequences that each consist of pilot coefficient of different spatial flows successively on the three subcarriers in the symbol period numbered i+2 may be denoted by Formula (25):

$$([p^{n2}_{i+2,j}\,p^{n2}_{i+2,j+1}\,p^{n2}_{i+2,j+2}]^T)^{H*}[p^{n1}_{i+2,j}\,p^{n1}_{i+2,j+1}\,p^{n1}_{i+2,j+2}]^T = 0 \quad (25)$$

In Formula (25), $n_1 \neq n_2$. $[p^{n1}_{i+2,j}\ p^{n1}_{i+2,j+1}\ p^{n2}_{i+2,j+2}]^T$ and $[p^{n2}_{i+2,j}\ p^{n2}_{i+2,j+1}\ p^{n2}_{i+2,j+2}]^T$ are pilot sequences that each consist of pilot coefficient of any two different spatial flows in the three spatial flows successively on the three subcarriers in the symbol period numbered i+2.

A matrix formed from the pilot sequences that each consist of pilot coefficient of each of the spatial flows successively on the three subcarriers in the symbol period numbered i+2 may be $Q_{i+2}$, and $Q_{i+2}$ may be denoted by Formula (26):

$$Q_{i+2} = \begin{bmatrix} p^1_{i+2,j} & p^2_{i+2,j} & p^3_{i+2,j} \\ p^1_{i+2,j+1} & p^2_{i+2,j+1} & p^3_{i+2,j+1} \\ p^1_{i+2,j+2} & p^2_{i+2,j+2} & p^3_{i+2,j+2} \end{bmatrix} \quad (26)$$

All the pilot sequences that each consist of pilot coefficient of each of the spatial flows successively on the three subcarriers in the symbol period numbered i+2 are orthogonal sequences. Therefore, $Q_{i+2}$ is also an orthogonal matrix.

It can be learned from the foregoing description that, if the quantity of spatial flows in the wireless local area network is 3, $P_j$, $P_{j+1}$, $P_{j+2}$, $Q_i$, $Q_{i+1}$, and $Q_{i+2}$ are all orthogonal matrices.

It is assumed that the quantity of spatial flows in the wireless local area network is 4. The fourth spatial flows are a first spatial flow, a second spatial flow, a third spatial flow, and a fourth spatial flow. The four consecutive symbol periods may be symbol periods numbered i, i+1, i+2, and i+3 respectively, and the four contiguous subcarriers may be subcarriers numbered j, j+1, j+2, and j+3 respectively.

Therefore, a pilot coefficient of the first spatial flow on the subcarrier numbered j in the symbol period numbered i may be $p^1_{i,j}$, a pilot coefficient of the second spatial flow may be $p^2_{i,j}$, a pilot coefficient of the third spatial flow may be $p^3_{i,j}$, and a pilot coefficient of the fourth spatial flow may be $p^4_{i,j}$; a pilot coefficient of the first spatial flow on the subcarrier numbered j in the symbol period numbered i+1 may be $p^1_{i+1,j}$, a pilot coefficient of the second spatial flow may be $p^2_{i-1,j}$, a pilot coefficient of the third spatial flow may be $p^3_{i+1,j}$, and a pilot coefficient of the fourth spatial flow may be $p^4_{i+1,j}$; a pilot coefficient of the first spatial flow on the subcarrier numbered j in the symbol period numbered i+2 may be $p^1_{i+2,j}$, a pilot coefficient of the second spatial flow may be $p^2_{i+2,j}$, a pilot coefficient of the third spatial flow may be $p^3_{i+2,j}$ a pilot coefficient of the fourth spatial flow may be $p^4_{i+2,j}$; and a pilot coefficient of the first spatial flow on the subcarrier numbered j in the symbol period numbered i+3 may be $p^1_{i+3,j}$, a pilot coefficient of the second spatial flow may be $p^2_{i+3,j}$, a pilot coefficient of the third spatial flow may be $p^3_{i+3,j}$, and a pilot coefficient of the fourth spatial flow may be $p^4_{i+3,j}$.

A pilot coefficient of the first spatial flow on the subcarrier numbered j+1 in the symbol period numbered i may be $p^1_{i,j+1}$, a pilot coefficient of the second spatial flow may be $p^2_{i,j+1}$, a pilot coefficient of the third spatial flow may be $p^3_{i,j+1}$, and a pilot coefficient of the fourth spatial flow may be $p^4_{i,j+1}$; a pilot coefficient of the first spatial flow on the subcarrier numbered j+1 in the symbol period numbered i+1 may be $p^1_{i+1,j+1}$, a pilot coefficient of the second spatial flow may be $p^2_{i+1,j+1}$, a pilot coefficient of the third spatial flow may be $p^3_{i+1,j+1}$, and a pilot coefficient of the fourth spatial flow may be $p^4_{i+1,j+1}$; a pilot coefficient of the first spatial flow on the subcarrier numbered j+1 in the symbol period numbered i+2 may be $p^1_{i+2,j+1}$, a pilot coefficient of the second spatial flow may be $p^2_{i+2,j+1}$, a pilot coefficient of the third spatial flow may be $p^3_{i+2,j+1}$, and a pilot coefficient of the fourth spatial flow may be $p^4_{i+2,j+1}$; and a pilot coefficient of the first spatial flow on the subcarrier numbered j+1 in the symbol period numbered i+3 may be $p^1_{i+3,j+1}$, a pilot coefficient of the second spatial flow may be $p^2_{i+3,j+1}$, a pilot coefficient of the third spatial flow may be $P^3_{i+3,j+1}$ and a pilot coefficient of the fourth spatial flow may be $p^4_{i+3,j+1}$.

A pilot coefficient of the first spatial flow on the subcarrier numbered j+2 in the symbol period numbered i is $p^1_{i,j+2}$, a pilot coefficient of the second spatial flow is $p^2_{i,j+2}$, a pilot coefficient of the third spatial flow is $p^3_{i,j+2}$, and a pilot coefficient of the fourth spatial flow is $p^4_{i,j+2}$; a pilot coefficient of the first spatial flow on the subcarrier numbered j+2 in the symbol period numbered i+1 may be $p^1_{i+1,j+2}$, a pilot coefficient of the second spatial flow may be $p^2_{i+1,j+2}$, a pilot coefficient of the third spatial flow may be $p^3_{i+1,j+2}$, and a pilot coefficient of the fourth spatial flow may be $p^4_{i+1,j+2}$; a pilot coefficient of the first spatial flow on the subcarrier numbered j+2 in the symbol period numbered i+2 may be $p^1_{i+2,j+2}$, a pilot coefficient of the second spatial flow may be $p^2_{i+2,j+2}$, a pilot coefficient of the third spatial flow may be $p^3_{i+2,j+2}$, and a pilot coefficient of the fourth spatial flow may be $p^4_{i+2,j+2}$; and a pilot coefficient of the first spatial flow on the subcarrier numbered j+2 in the symbol period numbered i+3 may be $p^1_{i+3,j+2}$, a pilot coefficient of the second spatial flow may be $p^2_{i+3,j+2}$, a pilot coefficient of the third spatial flow may be $p^3_{i+3,j+2}$, and a pilot coefficient of the fourth spatial flow may be $p^4_{i+3,j+2}$.

A pilot coefficient of the first spatial flow on the subcarrier numbered j+3 in the symbol period numbered i may be $p^1_{i,j+3}$, a pilot coefficient of the second spatial flow is $p^2_{i,j+3}$, a pilot coefficient of the third spatial flow is $p^3_{i,j+3}$, and a pilot coefficient of the fourth spatial flow is $p^4_{i,j+3}$; a pilot coefficient of the first spatial flow on the subcarrier numbered j+3 in the symbol period numbered i+1 may be $p^1_{i+1,j+3}$, a pilot coefficient of the second spatial flow may be $p^2_{i+1,j+3}$, a pilot coefficient of the third spatial flow may be $p^3_{i+1,j+3}$, and a pilot coefficient of the fourth spatial flow may be $p^4_{i+1,j+3}$; a pilot coefficient of the first spatial flow on the subcarrier numbered j+3 in the symbol period numbered i+2 may be $p^1_{i+2,j+3}$, a pilot coefficient of the second spatial flow may be $p^2_{i+2,j+3}$, a pilot coefficient of the third spatial flow may be $p^3_{i+2,j+3}$, and a pilot coefficient of the fourth spatial flow may be $p^4_{i+2,j+3}$; and a pilot coefficient of the first spatial flow on the subcarrier numbered j+3 in the symbol period numbered i+3 may be $p^1_{i+3,j+3}$, a pilot coefficient of the second spatial flow may be $p^2_{i+3,j+3}$, a pilot coefficient of the third spatial flow may be $p^4_{i+3,j+3}$, and a pilot coefficient of the fourth spatial flow may be $p^4_{i+3,j+3}$.

Therefore, a pilot sequence that includes pilot coefficient of the first spatial flow successively on the subcarrier numbered j in the four consecutive symbol periods may be $[p^1_{i,j}\ p^1_{i+1,j}\ p^1_{i+2,j}\ p^1_{i-3,j}]^T$, a pilot sequence that includes pilot coefficient of the second spatial flow successively on the subcarrier numbered j in the four consecutive symbol periods may be $[p^2_{i,j}\ p^2_{i+1,j}\ p^2_{i+2,j}\ p^2_{i+3,j}]^T$, a pilot sequence that includes pilot coefficient of the third spatial flow successively on the subcarrier numbered j in the four consecutive symbol periods may be $[p^3_{i,j}\ p^3_{i+1,j}\ p^3_{i+2,j}\ p^3_{i+3,j}]^T$, and a pilot sequence that includes pilot coefficient of the fourth spatial flow successively on the subcarrier numbered j in the four consecutive symbol periods may be $[p^4_{i,j}\ p^4_{i+1,j}\ p^4_{i+2,j}\ p^4_{i+3,j}]^T$.

A relationship between the pilot sequences that each consist of pilot coefficient of different spatial flows successively on the subcarrier numbered j in the four consecutive symbol periods may be denoted by Formula (27):

$$([p^{n2}_{i,j} p^{n2}_{i+1,j} p^{n2}_{i+2,j} p^{n2}_{i+3,j}]^T)^{H} * [p^{n1}_{i,j} p^{n1}_{i+1,j} p^{n1}_{i+2,j} p^{n1}_{i+3,j}]^T = 0 \quad (27)$$

In Formula (27), $n_1 \neq n_2$. $[p^{n_1}_{i,j} \ p^{n_1}_{i+1,j} \ p^{n_1}_{i+2,j} \ p^{n_1}_{i+3,j}]^T$ and $[p^{n_2}_{i,j} \ p^{n_2}_{i+1,j} \ p^{n_2}_{i+2,j} \ p^{n_2}_{i+3,j}]^T$ are pilot sequences that each consist of pilot coefficient of any two different spatial flows in the four spatial flows successively on the subcarrier numbered j in the four consecutive symbol periods.

A matrix formed from the pilot sequences that each consist of pilot coefficient of each of the spatial flows successively on the subcarrier numbered j in the four consecutive symbol periods may be $P_j$, and $P_j$ may be denoted by Formula (28):

$$P_j = \begin{bmatrix} P^1_{i,j} & P^2_{i,j} & P^3_{i,j} & P^4_{i,j} \\ P^1_{i+1,j} & P^2_{i+1,j} & P^3_{i+1,j} & P^4_{i+1,j} \\ P^1_{i+2,j} & P^2_{i+2,j} & P^3_{i+2,j} & P^4_{i+2,j} \\ P^1_{i+3,j} & P^2_{i+3,j} & P^3_{i+3,j} & P^4_{i+3,j} \end{bmatrix} \quad (28)$$

Because all the pilot sequences that each consist of pilot coefficient of each of the spatial flows successively on the subcarrier numbered j in the four consecutive symbol periods are orthogonal sequences, $P_j$ may be an orthogonal matrix.

A pilot sequence that includes pilot coefficient of the first spatial flow successively on the subcarrier numbered j+1 in the four consecutive symbol periods may be $[p^1_{i,j+1} \ p^1_{i+1,j+1} \ p^1_{i+2,j+1} \ p^1_{i+3,j+1}]^T$, a pilot sequence that includes pilot coefficient of the second spatial flow successively may be $[p^2_{i,j+1} \ p^2_{i+1,j+1} \ p^2_{i+2,j+1} \ p^2_{i+3,j+1}]^T$, a pilot sequence that includes pilot coefficient of the third spatial flow successively may be $[p^3_{i,j+1} \ p^3_{i+1,j+1} \ p^3_{i+2,j+1} \ p^3_{i+3,j+1}]^T$, and a pilot sequence that includes pilot coefficient of the fourth spatial flow successively may be $[p^4_{i,j+1} \ p^4_{i+1,j+1} \ p^4_{i+2,j+1} \ p^4_{i+3,j+1}]^T$, A relationship between the pilot sequences that each consist of pilot coefficient of different spatial flows successively on the subcarrier numbered j+1 in the four consecutive symbol periods may be denoted by Formula (29):

$$([p^{n_2}_{i,j+1} p^{n_2}_{i+1,j+1} p^{n_2}_{i+2,j+1} p^{n_2}_{i-3,j+1}]^T)^{H} * [p^{n_1}_{i,j+1} \ p^{n_1}_{i+1,j+1} p^{n_1}_{i+2,j+1} p^{n_1}_{i+3,j+1}]^T = 0 \quad (29)$$

In Formula (29), $n_1 \neq n_2$. $[p^{n_1}_{i,j+1} \ p^{n_1}_{i+1,j+1} \ p^{n_1}_{i+2,j+1} \ p^{n_1}_{i+3,j+1}]^T$ and $[p^{n_2}_{i,j+1} \ p^{n_2}_{i+1,j+1} \ p^{n_2}_{i+2,j+1} \ p^{n_2}_{i-3,j+1}]^T$ are pilot sequences that each consist of pilot coefficient of any two different spatial flows in the four spatial flows successively on the subcarrier numbered j+1 in the four consecutive symbol periods.

A matrix formed from the pilot sequences that each consist of pilot coefficient of spatial flows successively on the subcarrier numbered j+1 in the four consecutive symbol periods may be $P_{j+1}$, and $P_{j+1}$ may be denoted by Formula (30):

$$P_{j+1} = \begin{bmatrix} P^1_{i,j+1} & P^2_{i,j+1} & P^3_{i,j+1} & P^4_{i,j+1} \\ P^1_{i+1,j+1} & P^2_{i+1,j+1} & P^3_{i+1,j+1} & P^4_{i+1,j+1} \\ P^1_{i+2,j+1} & P^2_{i+2,j+1} & P^3_{i+2,j+1} & P^4_{i+2,j+1} \\ P^1_{i+3,j+1} & P^2_{i+3,j+1} & P^3_{i+3,j+1} & P^4_{i+3,j+1} \end{bmatrix} \quad (30)$$

Because all the pilot sequences that each consist of pilot coefficient of each of the spatial flows successively on the subcarrier numbered j+1 in the four consecutive symbol periods are orthogonal sequences, $P_{j+1}$ may be an orthogonal matrix.

A pilot sequence that includes pilot coefficient of the first spatial flow successively on the subcarrier numbered j+2 in the four consecutive symbol periods may be $[p^1_{i,j+2} \ p^1_{i+1,j+2} p^1_{i+2,j+2} \ p^1_{i+3,j+2}]^T$, a pilot sequence that includes pilot coefficient of the second spatial flow successively may be $[p^2_{i,j+2} \ p^2_{i+1,j+2} p^2_{i+2,j+2} \ p^2_{i+3,j+2}]^T$, a pilot sequence that includes pilot coefficient of the third spatial flow successively may be $[p^3_{i,j+2} \ p^3_{i+1,j+2} p^3_{i+2,j+2} \ p^3_{i+3,j+2}]^T$, and a pilot sequence that includes pilot coefficient of the fourth spatial flow successively may be $[p^4_{i,j+2} \ p^4_{i+1,j+2} p^4_{i+2,j+2} \ p^4_{i+3,j+2}]^T$.

A relationship between the pilot sequences that each consist of pilot coefficient of different spatial flows successively on the subcarrier numbered j+2 in the four consecutive symbol periods may be denoted by Formula (31):

$$([p^{n_2}_{i,j+2} p^{n_2}_{i+1,j+2} p^{n_2}_{i+2,j+2} p^{n_2}_{i-3,j+2}]^T)^{H} * [p^{n_1}_{i,j+2} \ p^{n_1}_{i+1,j+2} p^{n_1}_{i+2,j+2} p^{n_1}_{i+3,j+2}]^T = 0 \quad (31)$$

In Formula (31), $n_1 \neq n_2$. $[p^{n_1}_{i,j+2} \ p^{n_1}_{i+1,j+2} \ p^{n_1}_{i+2,j+2} \ p^{n_1}_{i-3,j+2}]^T$ and $[p^{n_2}_{i,j+2} \ p^{n_2}_{i+1,j+2} \ p^{n_2}_{i+2,j+2} \ p^{n_2}_{i-3,j+2}]^T$ are pilot sequences that each consist of pilot coefficient of any two different spatial flows in the four spatial flows successively on the subcarrier numbered j+2 in the four consecutive symbol periods.

A matrix formed from the pilot sequences that each consist of pilot coefficient of spatial flows successively on the subcarrier numbered j+2 in the four consecutive symbol periods may be $P_{j+2}$, and $P_{j+2}$ may be denoted by Formula (32):

$$P_{j+2} = \begin{bmatrix} P^1_{i,j+2} & P^2_{i,j+2} & P^3_{i,j+2} & P^4_{i,j+2} \\ P^1_{i+1,j+2} & P^2_{i+1,j+2} & P^3_{i+1,j+2} & P^4_{i+1,j+2} \\ P^1_{i+2,j+2} & P^2_{i+2,j+2} & P^3_{i+2,j+2} & P^4_{i+2,j+2} \\ P^1_{i+3,j+2} & P^2_{i+3,j+2} & P^3_{i+3,j+2} & P^4_{i+3,j+2} \end{bmatrix} \quad (32)$$

Because all the pilot sequences that each consist of pilot coefficient of each of the spatial flows successively on the subcarrier numbered j+2 in the four consecutive symbol periods are orthogonal sequences, $P_{j+2}$ may be an orthogonal matrix.

A pilot sequence that includes pilot coefficient of the first spatial flow successively on the subcarrier numbered j+3 in the four consecutive symbol periods may be $[p^1_{i,j+3} \ p^1_{i+1,j+3} p^1_{i+2,j+3} \ p^1_{i+3,j+3}]^T$, a pilot sequence that includes pilot coefficient of the second spatial flow successively may be $[p^2_{i,j+3} \ p^2_{i+1,j+3} p^2_{i+2,j+3} \ p^2_{i+3,j+3}]^T$, a pilot sequence that includes pilot coefficient of the third spatial flow successively may be $[p^3_{i,j+3} \ p^3_{i+1,j+3} p^3_{i+2,j+3} \ p^3_{i+3,j+3}]^T$, and a pilot sequence that includes pilot coefficient of the fourth spatial flow successively may be $[p^4_{i,j+3} \ p^4_{i+1,j+3} p^4_{i+2,j+3} \ p^4_{i+3,j+3}]^T$.

A relationship between the pilot sequences that each consist of pilot coefficient of different spatial flows successively on the subcarrier numbered j+3 in the four consecutive symbol periods may be denoted by Formula (33):

$$([p^{n_2}_{i,j+3} p^{n_2}_{i+1,j+3} p^{n_2}_{i+2,j+3} p^{n_2}_{i-3,j+3}]^T)^{H} * [p^{n_1}_{i,j+3} \ p^{n_1}_{i+1,j+3} p^{n_1}_{i+2,j+3} p^{n_1}_{i+3,j+3}]^T = 0 \quad (33)$$

In Formula (33), $n_1 \neq n_2$. $[p^{n_1}_{i,j+3} \ p^{n_1}_{i+1,j+3} \ p^{n_1}_{i+2,j+3} \ p^{n_1}_{i-3,j+3}]^T$ and $[p^{n_2}_{i,j+3} \ p^{n_2}_{i+1,j+3} \ p^{n_2}_{i+2,j+3} \ p^{n_2}_{i+3,j+3}]^T$ are pilot sequences that each consist of pilot coefficient of any two different spatial flows in the four spatial flows successively on the subcarrier numbered j+3 in the four consecutive symbol periods.

A matrix formed from the pilot sequences that each consist of pilot coefficient of each of the spatial flows successively on the subcarrier numbered j+3 in the four consecutive symbol periods may be $P_{j+3}$, and $P_{j+3}$ may be denoted by Formula (34):

$$P_{j+3} = \begin{bmatrix} P^1_{i,j+3} & P^2_{i,j+3} & P^3_{i,j+3} & P^4_{i,j+3} \\ P^1_{i+1,j+3} & P^2_{i+1,j+3} & P^3_{i+1,j+3} & P^4_{i+1,j+3} \\ P^1_{i+2,j+3} & P^2_{i+2,j+3} & P^3_{i+2,j+3} & P^4_{i+2,j+3} \\ P^1_{i+3,j+3} & P^2_{i+3,j+3} & P^3_{i+3,j+3} & P^4_{i+3,j+3} \end{bmatrix} \quad (34)$$

Because all the pilot sequences that each consist of pilot coefficient of each of the spatial flows successively on the subcarrier numbered j+3 in the four consecutive symbol periods are orthogonal sequences, $P_{j+3}$ may be an orthogonal matrix.

A pilot sequence that includes pilot coefficient of the first spatial flow successively on the four subcarriers in the symbol period numbered i may be $[p^1_{i,j} \, p^1_{i,j+1} \, p^1_{i,j+2} \, p^1_{i,j+3}]^T$, a pilot sequence that includes pilot coefficient of the second spatial flow successively may be $[p^2_{i,j} \, p^2_{i,j+1} \, p^2_{i,j+2} \, p^2_{i,j+3}]^T$, a pilot sequence that includes pilot coefficient of the third spatial flow successively may be $[p^3_{i,j} \, p^3_{i,j+1} \, p^3_{i,j+2} \, p^3_{i,j+3}]^T$, and a pilot sequence that includes pilot coefficient of the fourth spatial flow successively may be $[p^4_{i,j} \, p^4_{i,j+1} \, p^4_{i,j+2} \, p^4_{i,j+3}]^T$.

A relationship between the pilot sequences that each consist of pilot coefficient of different spatial flows successively on the four subcarriers in the symbol period numbered i may be denoted by Formula (35):

$$([p^{n_2}_{i,j} p^{n_2}_{i,j+1} p^{n_2}_{i,j+2} p^{n_2}_{i,j+3}]^T)^{H*} [p^{n_1}_{i,j} p^{n_1}_{i,j+1} p^{n_1}_{i,j+2} p^{n_1}_{i,j+3}]^T = 0 \quad (35)$$

In Formula (35), $n_1 \neq n_2$. $[p^{n_1}_{i,j} \, p^{n_1}_{i,j+1} \, p^{n_1}_{i,j+2} \, p^{n_1}_{i,j+3}]^T$ and $[p^{n_2}_{i,j} \, p^{n_2}_{i,j+1} \, p^{n_2}_{i,j+2} \, p^{n_2}_{i,j+3}]^T$ are pilot sequences that each consist of pilot coefficient of any two different spatial flows in the four spatial flows successively on the four subcarriers in the symbol period numbered i+1.

A matrix formed from the pilot sequences that each consist of pilot coefficient of each of the spatial flows successively on the four subcarriers in the symbol period numbered i may be $Q_i$, and $Q_i$ may be denoted by Formula (36):

$$Q_i = \begin{bmatrix} P^1_{i,j} & P^2_{i,j} & P^3_{i,j} & P^4_{i,j} \\ P^1_{i,j+1} & P^2_{i,j+1} & P^3_{i,j+1} & P^4_{i,j+1} \\ P^1_{i,j+2} & P^2_{i,j+2} & P^3_{i,j+2} & P^4_{i,j+2} \\ P^1_{i,j+3} & P^2_{i,j+3} & P^3_{i,j+3} & P^4_{i,j+3} \end{bmatrix} \quad (36)$$

All the pilot sequences that each consist of pilot coefficient of each of the spatial flows successively on the four subcarriers in the symbol period numbered i are orthogonal sequences. Therefore, $Q_i$ may be an orthogonal matrix.

A pilot sequence that includes pilot coefficient of the first spatial flow successively on the four subcarriers in the symbol period numbered i+1 may be $[p^1_{i+1,j} \, p^1_{i+1,j+1} \, p^1_{i+1,j+2} \, p^1_{i+1,j+3}]^T$, a pilot sequence that includes pilot coefficient of the second spatial flow successively may be $[p^2_{i+1,j} \, p^2_{i+1,j+1} \, p^2_{i+1,j+2} \, p^2_{i+1,j+3}]^T$, a pilot sequence that includes pilot coefficient of the third spatial flow successively may be $[p^3_{i+1,j} \, p^3_{i+1,j+1} \, p^3_{i+1,j+2} \, p^3_{i+1,j+3}]^T$, and a pilot sequence that includes pilot coefficient of the fourth spatial flow successively may be $[p^4_{i+1,j} \, p^4_{i+1,j+1} \, p^4_{i+1,j+2} \, p^4_{i+1,j+3}]^T$.

A relationship between the pilot sequences that each consist of pilot coefficient of different spatial flows successively on the four subcarriers in the symbol period numbered i+1 may be denoted by Formula (37):

$$([p^{n_2}_{i+1,j} p^{n_2}_{i+1,j+1} p^{n_2}_{i+1,j+2} p^{n_2}_{i+1,j+3}]^T)^{H*} [p^{n_1}_{i+1,j} p^{n_1}_{i+1,j+1} p^{n_1}_{i+1,j+2} p^{n_1}_{i+1,j+3}]^T = 0 \quad (37)$$

In Formula (37), $n_1 \neq n_2$. $[p^{n_1}_{i+1,j} \, p^{n_1}_{i+1,j+1} \, p^{n_1}_{i+1,j+2} \, p^{n_1}_{i+1,j+3}]^T$ and $[p^{n_2}_{i+1,j} \, p^{n_2}_{i+1,j+1} \, p^{n_2}_{i+1,j+2} \, p^{n_2}_{i+1,j+3}]^T$ are pilot sequences that each consist of pilot coefficient of any two different spatial flows in the four spatial flows successively on the four subcarriers in the symbol period numbered i+1.

A matrix formed from the pilot sequences that each consist of pilot coefficient of each of the spatial flows successively on the four subcarriers in the symbol period numbered i+1 may be $Q_{i+1}$, and $Q_{i+1}$ may be denoted by Formula (38):

$$Q_{i+1} = \begin{bmatrix} P^1_{i+1,j} & P^2_{i+1,j} & P^3_{i+1,j} & P^4_{i+1,j} \\ P^1_{i+1,j+1} & P^2_{i+1,j+1} & P^3_{i+1,j+1} & P^4_{i+1,j+1} \\ P^1_{i+1,j+2} & P^2_{i+1,j+2} & P^3_{i+1,j+2} & P^4_{i+1,j+2} \\ P^1_{i+1,j+3} & P^2_{i+1,j+3} & P^3_{i+1,j+3} & P^4_{i+1,j+3} \end{bmatrix} \quad (38)$$

All the pilot sequences that each consist of pilot coefficient of each of the spatial flows successively on the four subcarriers in the symbol period numbered i+1 are orthogonal sequences. Therefore, $Q_{i+1}$ is also an orthogonal matrix.

A pilot sequence that includes pilot coefficient of the first spatial flow successively on the four subcarriers in the symbol period numbered i+2 may be $[p^1_{i+2,j} \, p^1_{i+2,j+1} \, p^1_{i+2,j+2} \, p^1_{i+2,j+3}]^T$, a pilot sequence that includes pilot coefficient of the second spatial flow successively may be $[p^2_{i+2,j} \, p^2_{i+2,j+1} \, p^2_{i+2,j+2} \, p^2_{i+2,j+3}]^T$, a pilot sequence that includes pilot coefficient of the third spatial flow successively may be $[p^3_{i+2,j} \, p^3_{i-2,j+1} \, p^3_{i+2,j+2} \, p^3_{i+2,j+3}]^T$, and a pilot sequence that includes pilot coefficient of the fourth spatial flow successively may be $[p^4_{i+2,j} \, p^4_{i+2,j+1} \, p^4_{i+2,j+2} \, p^4_{i+2,j+3}]^T$.

A relationship between the pilot sequences that each consist of pilot coefficient of different spatial flows successively on the four subcarriers in the symbol period numbered i+2 may be denoted by Formula (39):

$$([p^{n_2}_{i+2,j} p^{n_2}_{i+2,j+1} p^{n_2}_{i+2,j+2} p^{n_2}_{i+2,j+3}]^T)^{H*} [p^{n_1}_{i+2,j} p^{n_1}_{i+2,j+1} p^{n_1}_{i+2,j+2} p^{n_1}_{i+2,j+3}]^T = 0 \quad (39)$$

In Formula (39), $n_1 \neq n_2$. $[p^{n_1}_{i+2,j} \, p^{n_1}_{i+2,j+1} \, p^{n_1}_{i+2,j+2} \, p^{n_1}_{i+2,j+3}]^T$ and $[p^2_{i+2,j} \, p^2_{i+2,j+1} \, p^2_{i+2,j+2} \, p^2_{i+2,j+3}]^T$ are pilot sequences that each consist of pilot coefficient of any two different spatial flows in the four spatial flows successively on the four subcarriers in the symbol period numbered i+2.

A matrix formed from the pilot sequences that each consist of pilot coefficient of each of the spatial flows successively on the four subcarriers in the symbol period numbered i+2 may be $Q_{i+2}$, and $Q_{i+2}$ may be denoted by Formula (40):

$$Q_{i+2} = \begin{bmatrix} P^1_{i+2,j} & P^2_{i+2,j} & P^3_{i+2,j} & P^4_{i+2,j} \\ P^1_{i+2,j+1} & P^2_{i+2,j+1} & P^3_{i+2,j+1} & P^4_{i+2,j+1} \\ P^1_{i+2,j+2} & P^2_{i+2,j+2} & P^3_{i+2,j+2} & P^4_{i+2,j+2} \\ P^1_{i+2,j+3} & P^2_{i+2,j+3} & P^3_{i+2,j+3} & P^4_{i+2,j+3} \end{bmatrix} \quad (40)$$

All the pilot sequences that each consist of pilot coefficient of each of the spatial flows successively on the four subcarriers in the symbol period numbered i+2 are orthogonal sequences. Therefore, $Q_{i+2}$ is also an orthogonal matrix.

A pilot sequence that includes pilot coefficient of the first spatial flow successively on the four subcarriers in the symbol period numbered i+3 may be $[p^1_{i+3,j} \, p^1_{i+3,j+1}$ $p^1_{i+3,j+2}$ $p^1_{i+3,j+3}]^T$, a pilot sequence that includes pilot coefficient of the second spatial flow successively may be $[p^2_{i+3,j}$ $p^2_{i+3,j+1}$ $p^2_{i+3,j+2}$ $p^2_{i+3,j+3}]^T$, a pilot sequence that includes pilot coefficient of the third spatial flow successively may be $[p^3_{i+3,j}$ $p^3_{i+3,j+1}$ $p^3_{i+3,j+2}$ $p^3_{i+3,j+3}]^T$, and a pilot sequence that includes pilot coefficient of the fourth spatial flow successively may be $[p^4_{i+3,j}$ $p^4_{i+3,j+1}$ $p^4_{i+3,j+2}$ $p^4_{i+3,j+3}]^T$.

A relationship between the pilot sequences that each consist of pilot coefficient of different spatial flows successively on the four subcarriers in the symbol period numbered i+3 may be denoted by Formula (41):

$$([p^{n_2}_{i+3,j} p^{n_2}_{i+3,j+1} p^{n_2}_{i+3,j+2} p^{n_2}_{i+3,j+3}]^T)^{H*}[p^{n_1}_{i+3,j} p^{n_1}_{i+3,j+1} p^{n_1}_{i+3,j+2} p^{n_1}_{i+3,j+3}]^T = 0 \quad (41)$$

In Formula (41), $n_1 \ne n_2$. $[p^{n_1}_{i+3,j}$ $p^{n_1}_{i+3,j+1}$ $p^{n_1}_{i+3,j+2}$ $p^{n_1}_{i+3,j+3}]^T$ and $[p^2_{i+3,j}$ $p^2_{i+3,j+1}$ $p^2_{i+3,j+2}$ $p^2_{i+3,j+3}]^T$ are pilot sequences that each consist of pilot coefficient of any two different spatial flows in the four spatial flows successively on the four subcarriers in the symbol period numbered i+3.

A matrix formed from the pilot sequences that each consist of pilot coefficient of each of the spatial flows successively on the four subcarriers in the symbol period numbered i+3 may be $Q_{i+3}$, and $Q_{i+3}$ may be denoted by Formula (42):

$$Q_{i+3} = \begin{bmatrix} P^1_{i+3,j} & P^2_{i+3,j} & P^3_{i+3,j} & P^4_{i+3,j} \\ P^1_{i+3,j+1} & P^2_{i+3,j+1} & P^3_{i+3,j+1} & P^4_{i+3,j+1} \\ P^1_{i+3,j+2} & P^2_{i+3,j+2} & P^3_{i+3,j+2} & P^4_{i+3,j+2} \\ P^1_{i+3,j+3} & P^2_{i+3,j+3} & P^3_{i+3,j+3} & P^4_{i+3,j+3} \end{bmatrix} \quad (42)$$

All the pilot sequences that each consist of pilot coefficient of each of the spatial flows successively on the four subcarriers in the symbol period numbered i+3 are orthogonal sequences. Therefore, $Q_{i+3}$ is also an orthogonal matrix.

It can be learned from the foregoing description that, if the quantity of spatial flows in the wireless local area network is 4, $P_j$, $P_{j+1}$, $P_{j+2}$, $P_{j+3}$, $Q_i$, $Q_{i+1}$, $Q_{i+2}$, and $Q_{i+3}$ are all orthogonal matrices.

Optionally, the M subcarriers include L groups of subcarriers, each group of subcarriers includes two subcarriers, the serial number differences of subcarriers in each group of subcarriers are equal, and the serial number difference of subcarriers in each group of subcarriers is greater than or equal to 1.

Each group of subcarriers includes one subcarrier. That is, M is 2 times L. The pilot coefficient of the same spatial flow on each subcarrier in each group of subcarriers in the same symbol period are the same, a serial number difference of subcarriers in this group of subcarriers is the same, and the serial number difference may be greater than or equal to 1.

Specifically, if the transmit end sends a pilot to the receive end on the M subcarriers, the receive end may use a channel difference of two subcarriers with a same frequency domain distance to replace a channel difference of other two subcarriers with the same frequency domain distance according to a characteristic that two subcarriers with the same frequency domain distance have the same channel difference, thereby simplifying calculation performed by the access station on a phase deviation of each transmit end and improving calculation precision.

Figure 6:
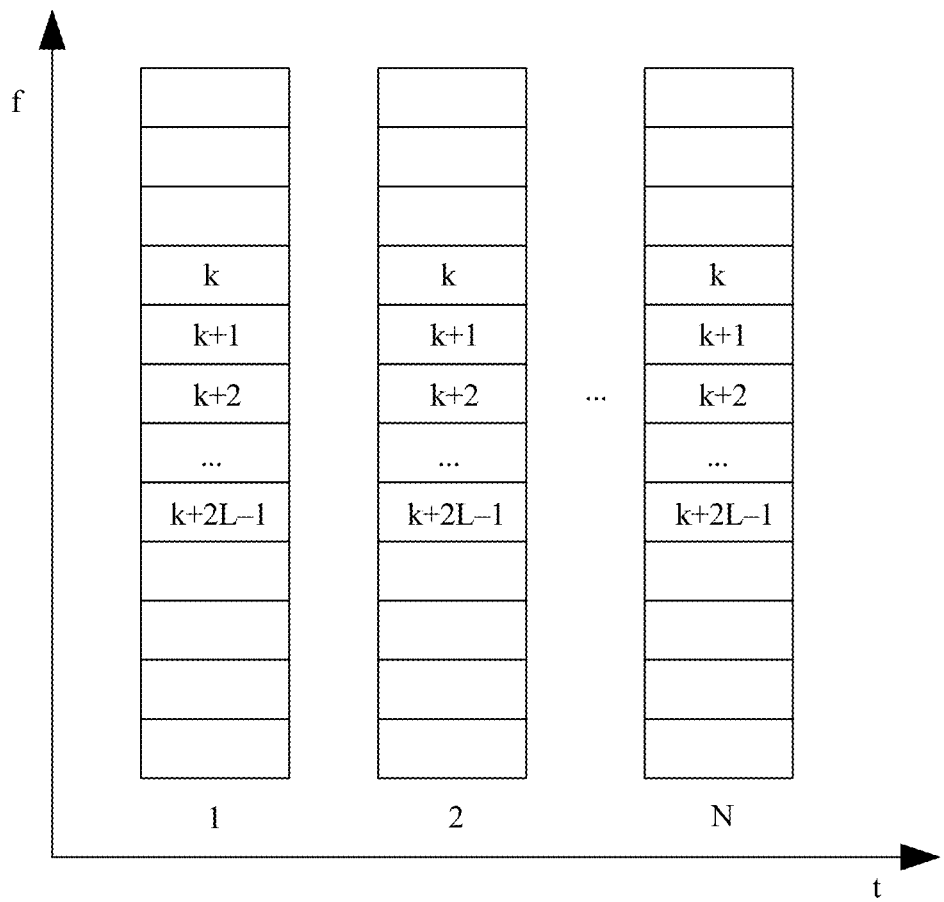
FIG. 6 is a time domain and frequency domain relationship diagram of another subcarrier used in a pilot transmission method in a wireless local area network according to Embodiment 3 of the present disclosure.

FIG. 6 is a time domain and frequency domain relationship diagram of another subcarrier used in a pilot transmission method in a wireless local area network according to Embodiment 3 of the present disclosure. In FIG. 6, a horizontal coordinate t from a small value to a large value may denote symbol periods whose time domains are arranged in ascending order, and a vertical coordinate f from a small value to a large value may denote subcarriers whose frequency domains are arranged in ascending order. From FIG. 6, it can be learned that according to the pilot transmission method provided in Embodiment 3 of the present disclosure, if the quantity of spatial flows is L, N symbol periods numbered from 1 to N may be selected in the time domain, and M subcarriers numbered from k to k+2L−1 may be selected in the frequency domain.

For example, if k is 2, a quantity of subcarriers in each group is 2, and the transmit end generates a pilot signal by using the pilot matrix formed from the pilot coefficient on the M subcarriers, the receive end may determine the phase deviation of each transmit end in the L stations according to the channel difference between two subcarriers in each group in the N groups of sub carriers.

The serial number difference of subcarriers in each group of subcarriers is the same, and the serial number difference is greater than or equal to 1. That is, the subcarriers in each group of subcarriers may be contiguous or not contiguous. If the subcarriers in each group of subcarriers are contiguous, the serial number difference of subcarriers in each group of subcarriers may be 1. If the subcarriers in each group of subcarriers are not contiguous, the serial number difference of subcarriers in each group of subcarriers may be greater than 1.

For example, if L is 4, that is, the quantity of spatial flows is 4, and k is 2, the M subcarriers include: 4 groups of subcarriers; and the quantity of subcarriers in each group is 2. That is, the M subcarriers are 8 subcarriers, and the 8 subcarriers may be subcarriers numbered from 1 to 8 and denoted by (1, 2, 3, 4, 5, 6, 7, 8), for example.

When the serial number difference of subcarriers in each group in the 4 groups of subcarriers is equal to 1, the 4 groups of subcarriers may be denoted by (1, 2), (3, 4), (5, 6), and (7, 8) successively.

When the serial number difference of subcarriers in each group in the 4 groups of subcarriers is greater than 1, the 4 groups of subcarriers may be denoted by (1, 5), (2, 6), (3, 7), and (4, 8) successively. In this case, the serial number difference of subcarriers in each group of subcarriers is 4.

If the multipath effect of channels in the current network system is relatively high and changes linearly with increase of frequencies, the channel difference between adjacent subcarriers is the same, and the channel difference between two subcarriers with the same frequency domain distance is the same, and k may be set to an integer greater than 1. The k subcarriers in each group of subcarriers may be contiguous with respect to the frequency domain, and therefore, the serial numbers of k subcarriers in each group of subcarriers are contiguous.

When each group of subcarriers includes two subcarriers, that is, when k is 2, if the quantity of spatial flows in the wireless local area network is 2, the pilot coefficient of the two spatial flows on each subcarrier in two consecutive symbol periods, the pilot sequence that includes the pilot coefficient of the two spatial flows successively according to the frequency domain and the time domain, and the matrix formed from the pilot sequences of each spatial flow are similar to those in the scenario of k being equal to 1 in Formula (7) to Formula (14), and details are not described herein.

When each group of subcarriers includes two subcarriers, that is, when k is 2, if the quantity of spatial flows in the wireless local area network is 3, the pilot coefficient of the three spatial flows on each subcarrier in three consecutive symbol periods, the pilot sequence that includes the pilot coefficient of the three spatial flows successively according to the frequency domain and the time domain, and the matrix formed from the pilot sequences of each station are similar to those in the scenario of k being equal to 1 in Formula (15) to Formula (26), and details are not described herein.

When each group of subcarriers includes two subcarriers, that is, when k is 2, if the quantity of spatial flows in the wireless local area network is 4, the pilot coefficient of the four spatial flows on each subcarrier in four consecutive symbol periods, the pilot sequence that includes the pilot coefficient of the four spatial flows successively according to the frequency domain and the time domain, and the matrix formed from the pilot sequences of each spatial flow are similar to the results in the scenario of k being equal to 1 on each subcarrier in four consecutive symbol periods in Formula (27) to Formula (42), and details are not described herein.

According to Embodiment 2 of the present disclosure, different forms of the M subcarriers are further provided to further describe the method in Embodiment 1. This may simplify calculation performed by the access station on the phase deviation of each spatial flow, improve calculation precision, and better ensure channel estimation precision of the access station.

Embodiment 4

According to Embodiment 4 of the present disclosure, a pilot transmission method in a wireless local area network is further provided. FIG. 7 is a flowchart of a pilot transmission method in a wireless local area network according to Embodiment 4 of the present disclosure. The pilot receiving method in a wireless local area network provided in Embodiment 4 of the present disclosure may be the method executed by the receive end according to any one of Embodiments 1 to 3. The method is executed by the receive end. The transmit end may be a station or an access point. As shown in FIG. 7, the method may include the following steps.

Step 701: Receive a pilot signal of each spatial flow on M subcarriers in N consecutive symbol periods separately, where the pilot signal is sent by a transmit end, the pilot signal of each spatial flow is a pilot signal generated by the transmit end by applying a pilot matrix to an LTF, the pilot matrix includes: a pilot sequence that includes pilot coefficient of each of the spatial flows on the M subcarriers in the N consecutive symbol periods, the pilot matrix is an orthogonal matrix, N is a positive integer greater than or equal to L, L is a quantity of spatial flows in the wireless local area network, and M is a positive integer multiple of L.

It should be noted that the pilot signal sent by the transmit end and received by the receive end on each subcarrier in the M subcarriers in the N consecutive symbol periods is actually a hybrid signal received on each subcarrier. The signal received on each subcarrier is correlated with but different from the pilot signal sent by the transmit end. The hybrid signal received on each subcarrier may be a hybrid signal on each subcarrier in the M subcarriers after the pilot sent by the transmit end passes through a corresponding channel.

Step 702: Calculate a phase deviation of a transmit antenna corresponding to each spatial flow at the transmit end with reference to the pilot signal of each spatial flow at the transmit end.

The pilot transmission method provided in Embodiment 4 of the present disclosure is a pilot transmission method in the wireless local area network corresponding to the pilot transmission method described in Embodiments 1 to 3, and beneficial effects of the method are similar to those in the foregoing embodiments, and details are not described herein.

Optionally, the method further includes:

correcting the pilot signal of each spatial flow at the transmit end according to the phase deviation of the transmit antenna corresponding to each spatial flow at the transmit end; and performing channel estimation on the transmit antenna corresponding to each spatial flow at the transmit end according to the corrected pilot signal and the LTF of each subcarrier in the M subcarriers.

Further, the pilot matrix includes: a pilot sequence that includes pilot coefficient of each of the spatial flows successively on the M subcarriers in the N consecutive symbol periods.

A pilot sequence that includes pilot coefficient of the $n^{th}$ spatial flow successively that are sent on the $l^{th}$ subcarrier in the N consecutive symbol periods is $[p''_{1,l}\ p''_{2,l} \ldots p''_{N,l}]$, where n=1, 2, ..., L, and l=1, 2, ..., M.

The pilot matrix $P_l$ of L spatial flows on the $l^{th}$ subcarrier in the N consecutive symbol periods is:

$$P_l = \begin{bmatrix} p^1_{1,l} & p^2_{1,l} & \cdots & p^{n_1}_{1,l} & \cdots & p^L_{1,l} \\ p^1_{2,l} & p^2_{2,l} & \vdots & p^{n_1}_{2,l} & \vdots & p^L_{2,l} \\ \vdots & \vdots & \vdots & \vdots & \vdots & \vdots \\ p^1_{N,l} & p^2_{N,l} & \cdots & p^{n_1}_{N,l} & \cdots & p^L_{N,l} \end{bmatrix}.$$

Optionally, the pilot matrix further includes: a pilot sequence that includes pilot coefficient of each of the spatial flows successively on the M subcarriers in each symbol period in the N consecutive symbol periods.

A pilot sequence that includes pilot coefficient of the $n^{th}$ spatial flow successively on the M subcarriers in the $l'^{th}$ symbol period is $[p''_{l',1}\ p''_{l',2} \ldots p''_{l',L}]^T$, where n=1, 2, ..., L, and l'=1, 2, ..., N.

The pilot matrix of the L spatial flows on the M subcarriers in the $l'^{th}$ symbol period is:

$$Q_{l'} = \begin{bmatrix} p^1_{l',1} & p^2_{l',1} & \cdots & p^{n_1}_{l',1} & \cdots & p^L_{l',1} \\ p^1_{l',2} & p^2_{l',2} & \vdots & p^{n_1}_{l',2} & \vdots & p^L_{l',2} \\ \vdots & \vdots & \vdots & \vdots & \vdots & \vdots \\ p^1_{l',M} & p^2_{l',M} & \cdots & p^{n_1}_{l',M} & \cdots & p^L_{l',M} \end{bmatrix}.$$

Further, M subcarriers include L groups of subcarriers, and each group of subcarriers includes one subcarrier.

Optionally, the M subcarriers include L groups of subcarriers, each group of subcarriers includes two subcarriers, the serial number differences of subcarriers in each group of subcarriers are equal, and the serial number difference of subcarriers in each group of subcarriers is greater than or equal to 1.

The pilot transmission method provided in Embodiment 4 of the present disclosure is a pilot receiving method corresponding to the pilot transmission method described in Embodiments 1 to 3, and beneficial effects of the method are similar to those in the foregoing embodiments, and details are not described herein.

Embodiment 5

Figure 8:
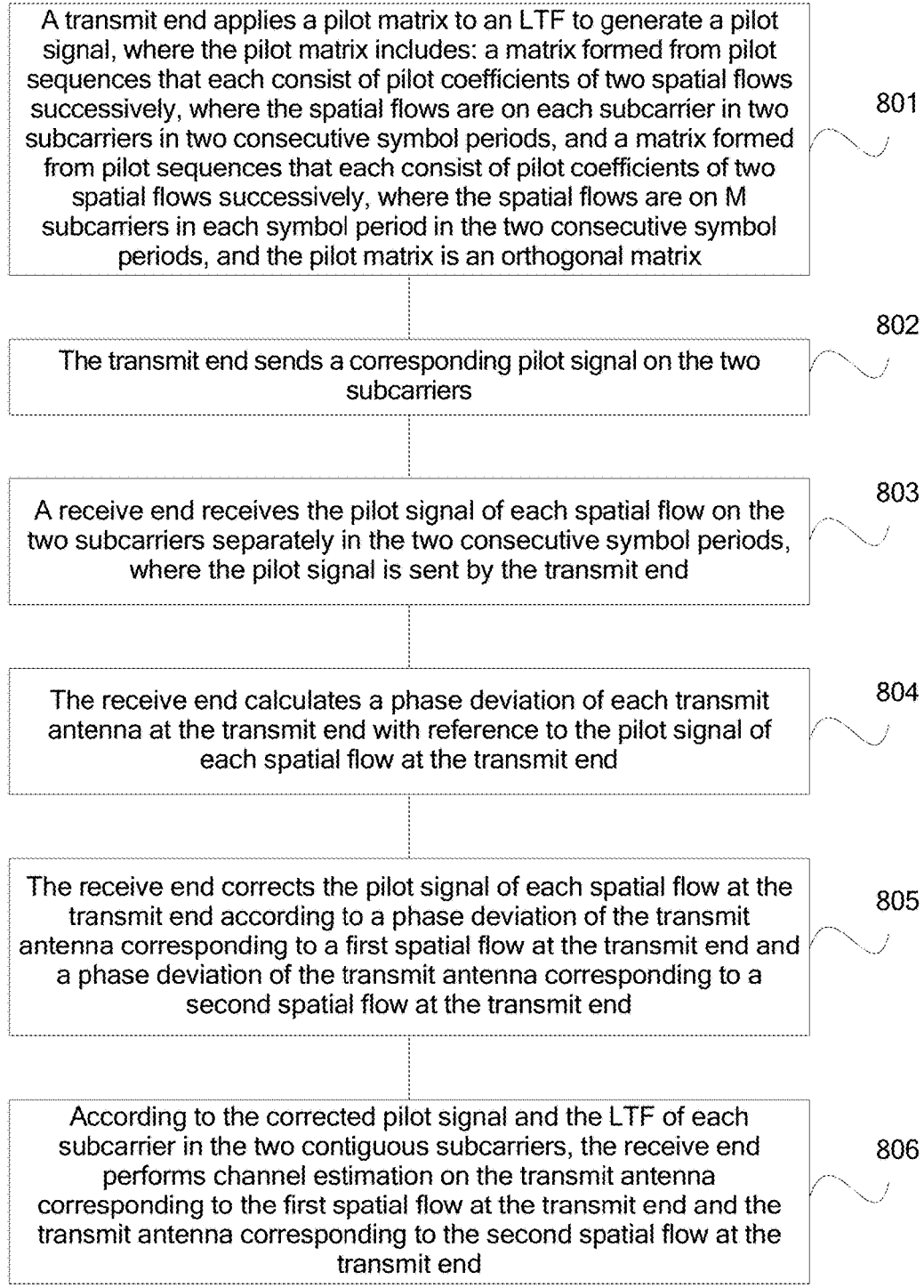
FIG. 8 is a flowchart of a pilot transmission method in a wireless local area network according to Embodiment 5 of the present disclosure.

According to Embodiment 5 of the present disclosure, a pilot transmission method is further provided. According to Embodiment 5 of the present disclosure, a pilot transmission method is further provided. In Embodiment 5 of the present disclosure, the method described in any one of Embodiments 1 to 4 is described by using an instance in which a quantity of spatial flows in a wireless local area network is 2. FIG. 8 is a flowchart of a pilot transmission method in a wireless local area network according to Embodiment 5 of the present disclosure. As shown in FIG. 8, the method may include the following steps.

Step 801: A transmit end applies a pilot matrix to an LTF to generate a pilot signal, where the pilot matrix includes: a matrix formed from pilot sequences that each consist of pilot coefficient of two spatial flows successively, where the spatial flows are on each subcarrier in two subcarriers in two consecutive symbol periods, and a matrix formed from pilot sequences that each consist of pilot coefficient of two spatial flows successively, where the spatial flows are on M subcarriers in each symbol period in the two consecutive symbol periods, and the pilot matrix is an orthogonal matrix.

A pilot sequence that includes pilot coefficient of the first spatial flow successively on the subcarrier numbered j in the two consecutive symbol periods may be $[1\ -1]^T$, and a pilot sequence that includes pilot coefficient of the second spatial flow successively may be $[1\ 1]^T$. A pilot sequence that includes pilot coefficient of the first spatial flow successively on the subcarrier numbered j+1 in the two consecutive symbol periods may be $[-1\ 1]^T$, and a pilot sequence that includes pilot coefficient of the second spatial flow successively may be $[1\ 1]^T$.

If the LTF corresponding to the subcarrier numbered j is $LTF_j$ and the LTF corresponding to the subcarrier numbered j+1 is $LTF_{j+1}$, the signal matrix formed from the pilot signals of the first spatial flow and the second spatial flow on the subcarrier numbered j in the two consecutive symbol periods may be shown in Table 4:

TABLE 4

| $LTF_j$ | $-LTF_j$ |
|---|---|
| $LTF_j$ | $LTF_j$ |

As shown in Table 4, the pilot signals of the first spatial flow on the subcarrier numbered j in the two consecutive symbol periods are $[LTF_j, -LTF_j]$ successively; and the pilot signals of the second spatial flow on the subcarrier numbered j in the two consecutive symbol periods are $[LTF_j, LTF_j]$ successively.

The signal matrix formed from the pilot signals of the first spatial flow and the second spatial flow on the subcarrier numbered j+1 in the two consecutive symbol periods may be shown in Table 5:

TABLE 5

| $-LTF_{j+1}$ | $LTF_{j+1}$ |
|---|---|
| $LTF_{j+1}$ | $LTF_{j+1}$ |

As shown in Table 5, the pilot signals of the first spatial flow on the subcarrier numbered j+1 in the two consecutive symbol periods are $[-LTF_{j+1}, LTF_{j+1}]$ successively; and the pilot signals of the second spatial flow on the subcarrier numbered j+1 in the two consecutive symbol periods are $[LTF_{j+1}, LTF_{j+1}]$ successively.

Step 802: The transmit end sends a corresponding pilot signal on the two subcarriers.

Step 803: A receive end receives the pilot signal of each spatial flow on the two subcarriers separately in the two consecutive symbol periods, where the pilot signal is sent by the transmit end.

A signal received by the receive end on the subcarrier numbered j in the symbol period numbered i may be denoted by $r_{i,j}$, a signal received by the receive end on the subcarrier numbered j in the symbol period numbered i+1 may be denoted by $r_{i+1,j}$, a signal received by the receive end on the subcarrier numbered j+1 in the symbol period numbered i may be denoted by $r_{i,j+1}$, and a signal received by the receive end on the subcarrier numbered j+1 in the symbol period numbered i+1 may be denoted by $r_{i+1,j+1}$. Channel information of the transmit antenna corresponding to the first spatial flow at the transmit end on the two subcarriers may be denoted by $h_{1,j}$ and $h_{1,j+1}$, and channel information of the transmit antenna corresponding to the second spatial flow at the transmit end on the two subcarriers may be denoted by $h_{2,j}$ and $h_{2,j+1}$. A phase deviation of the transmit antenna corresponding to the first spatial flow at the transmit end may be denoted by $\theta_1$, and a phase deviation of the transmit antenna corresponding to the second spatial flow at the transmit end may be denoted by $\theta_2$.

$r_{i,j}$ may be denoted by Formula (43), $r_{i+1,j}$ may be denoted by Formula (44), $r_{i,j+1}$ may be denoted by Formula (45), and $r_{i+1,j+1}$ may be denoted by Formula (46).

$$r_{i,j} = h_{1,j}LTF_j + h_{2,j}LTF_j \tag{43}$$

$$r_{i+1,j} = -e^{j\theta_1}h_{1,j}LTF_j + e^{j\theta_2}h_{2,j}LTF_j \tag{44}$$

$$r_{i,j+1} = h_{1,j+1}LTF_{j+1} + h_{2,j+1}LTF_{j+1} \tag{45}$$

$$r_{i+1,j+1} = -e^{j\theta_1}h_{1,j+1}LTF_{j+1} + e^{j\theta_2}h_{2,j+1}LTF_{j+1} \tag{46}$$

Step 804: The receive end calculates a phase deviation of each transmit antenna at the transmit end with reference to the pilot signal of each spatial flow at the transmit end.

By using $r'_{i,j}$ to refer to dividing $r_{i,j}$ by $LTF_j$, Formula (43) is converted into Formula (47); by using $r'_{i+1,j}$ to refer to dividing $r_{i+1,j}$ by $LTF_j$, Formula (44) is converted into Formula (48); by using $r'_{i,j+1}$ to refer to dividing $r_{i,j+1}$ by $LTF_{j+1}$, Formula (45) is converted into Formula (49); and by using $r'_{i+1,j+1}$ to refer to dividing $r_{i+1,k+1}$ by $LTF_{j+1}$, Formula (46) is converted into Formula (50).

$$r'_{i,j} = h_{1,j} + h_{2,j} \tag{47}$$

$$r'_{i+1,j} = -e^{j\theta_1}h_{1,j} + e^{j\theta_2}h_{2,j} \tag{48}$$

$$r'_{i,j+1} = h_{1,j+1} + h_{2,j+1} \tag{49}$$

$$r'_{i+1,j+1} = -e^{j\theta_1}h_{1,j+1} + e^{j\theta_2}h_{2,j+1} \tag{50}$$

Because the subcarrier numbered j and the subcarrier numbered j+1 are contiguous subcarriers, their channel information is the same. That is, $h_{1,j}$ is the same as $h_{1,j+1}$, and $h_{2,j}$ is the same as $h_{2,j+1}$.

Formula (47) and Formula (49) may be combined into the following expression:

$$\begin{bmatrix} r'_{i,j} \\ r'_{i,j+1} \end{bmatrix} = \begin{bmatrix} 1 & 1 \\ -1 & 1 \end{bmatrix} \begin{bmatrix} h_{1,j} \\ h_{2,j} \end{bmatrix} = Q_1 \begin{bmatrix} h_{1,j} \\ h_{2,j} \end{bmatrix} \quad (51)$$

Formula (48) and Formula (50) may combine into the following expression:

$$\begin{bmatrix} r'_{i+1,j} \\ r'_{i+1,j+1} \end{bmatrix} = \begin{bmatrix} -1 & 1 \\ 1 & 1 \end{bmatrix} \begin{bmatrix} e^{j\theta_1}h_{1,j} \\ e^{j\theta_2}h_{2,j} \end{bmatrix} = Q_2 \begin{bmatrix} e^{j\theta_1}h_{1,j} \\ e^{j\theta_2}h_{2,j} \end{bmatrix} \quad (52)$$

where $$Q_1 = \begin{bmatrix} 1 & 1 \\ -1 & 1 \end{bmatrix} \text{ and } Q_2 = \begin{bmatrix} -1 & 1 \\ 1 & 1 \end{bmatrix}.$$

Therefore, Formula (51) may be used to deduce:

$$\begin{bmatrix} h_{1,j} \\ h_{2,j} \end{bmatrix} = \frac{1}{2} Q_1^H Q_1 \begin{bmatrix} r'_{i,j} \\ r'_{i,j+1} \end{bmatrix} \quad (53)$$

Similarly, Formula (52) may be used to deduce:

$$\begin{bmatrix} e^{j\theta_1}h_{1,j} \\ e^{j\theta_2}h_{2,j} \end{bmatrix} = Q_2^H Q_2 \begin{bmatrix} r'_{i,j} \\ r'_{i,j+1} \end{bmatrix} \quad (54)$$

Therefore, a phase may be calculated according to results of the foregoing two formulas, and $\theta_1$ is determined. $\theta_1$ may be denoted by Formula (55):

$$\theta_1 = \angle(e^{j\theta_1}) = \angle(h^*_{1,j} e^{j\theta_1} h_{1,j}) \quad (55)$$

$\angle$ refers to calculating a phase, and $h^*_{1,j}$ is a conjugate of $h_{1,j}$.

$\theta_2$ is determined in a similar way, and $\theta_2$ may be denoted by Formula (56):

$$\eta_2 = \angle(e^{j\theta_2}) = \angle(h^*_{2,j} e^{j\theta_2} h_{2,j}) \quad (56)$$

Step 805: The receive end corrects the pilot signal of each spatial flow at the transmit end according to a phase deviation of the transmit antenna corresponding to a first spatial flow at the transmit end and a phase deviation of the transmit antenna corresponding to a second spatial flow at the transmit end.

Step 806: According to the corrected pilot signal and the LTF of each subcarrier in the two contiguous subcarriers, the receive end performs channel estimation on the transmit antenna corresponding to the first spatial flow at the transmit end and the transmit antenna corresponding to the second spatial flow at the transmit end.

After determining the phase deviation of the transmit antenna corresponding to the first spatial flow at the transmit end and the phase deviation of the transmit antenna corresponding to the second spatial flow at the transmit end, the receive end may determine, according to Formula (57), channel information $h_{1,j}$ of the transmit antenna corresponding to the first spatial flow at the transmit end on the subcarrier numbered j, and channel information $h_{2,j}$ of the transmit antenna corresponding to the second spatial flow at the transmit end on the subcarrier numbered j; and the receive end may determine, according to Formula (58), channel information $h_{1,j+1}$ of the transmit antenna corresponding to the first spatial flow at the transmit end on the subcarrier numbered j+1, and channel information $h_{2,j+1}$ of the transmit antenna corresponding to the second spatial flow at the transmit end on the subcarrier numbered j+1, for example.

$$\begin{bmatrix} h_{1,j} \\ h_{2,j} \end{bmatrix} = \left( \begin{bmatrix} 1 & 1 \\ -e^{j\theta_1} & -e^{j\theta_2} \end{bmatrix}^H \begin{bmatrix} 1 & 1 \\ -e^{j\theta_1} & e^{j\theta_2} \end{bmatrix} \right)^{-1} \begin{bmatrix} 1 & 1 \\ -e^{j\theta_1} & e^{j\theta_2} \end{bmatrix}^H \begin{bmatrix} r'_{i,j} \\ r'_{i,j+1} \end{bmatrix} \quad (57)$$

$$\begin{bmatrix} h_{1,j+1} \\ h_{2,j+1} \end{bmatrix} = \left( \begin{bmatrix} -1 & 1 \\ e^{j\theta_1} & e^{j\theta_2} \end{bmatrix}^H \begin{bmatrix} -1 & 1 \\ e^{j\theta_1} & e^{j\theta_2} \end{bmatrix} \right)^{-1} \begin{bmatrix} -1 & 1 \\ -e^{j\theta_1} & e^{j\theta_2} \end{bmatrix}^H \begin{bmatrix} r'_{i,j+1} \\ r'_{i+1,j+1} \end{bmatrix} \quad (58)$$

In the solution provided in Embodiment 5 of the present disclosure, the receive end may perform channel estimation on each transmit antenna at the receive end according to the determined phase deviation after determining the phase deviation of each transmit antenna at the transmit end, thereby improving channel estimation precision.

It should be noted that the solution provided in Embodiment 5 of the present disclosure can also improve channel estimation precision of the transmit end when the quantity of spatial flows in the wireless local area network is 3 or 4.

If the quantity of spatial flows in the wireless local area network is 3, a process of determining, by the receive end, to perform channel estimation is similar to the foregoing scenario in which there are two spatial flows, and a difference lies in that pilot coefficient of each of the spatial flows on each subcarrier in the symbol period are different. Optionally, if N=L, that is, if N=3, a pilot sequence that includes pilot coefficient of the first spatial flow successively on the subcarrier numbered j in the three consecutive symbol periods may be $[1\ 1\ 1]^T$, a pilot sequence that includes pilot coefficient of the second spatial flow successively may be $$\left[ 1 e^{-j\frac{2\pi}{3}} e^{-j\frac{4\pi}{3}} \right]^T,$$

and a pilot sequence that includes pilot coefficient of the third spatial flow successively may be $$\left[ 1 e^{-j\frac{4\pi}{3}} e^{-j\frac{8\pi}{3}} \right]^T.$$

A pilot sequence that includes pilot coefficient of the first spatial flow successively on the subcarrier numbered j+1 in the three consecutive symbol periods may be $[1\ 1\ 1]^T$, a pilot sequence that includes pilot coefficient of the second spatial flow successively may be $$\left[ e^{-j\frac{4\pi}{3}} 1 e^{-j\frac{2\pi}{3}} \right]^T,$$

and a pilot sequence that includes pilot coefficient of the third spatial flow successively may be $$\left[ e^{-j\frac{8\pi}{3}} 1 e^{-j\frac{4\pi}{3}} \right]^T.$$

A pilot sequence that includes pilot coefficient of the first spatial flow successively on the subcarrier numbered j+2 in the three consecutive symbol periods may be $[1\ 1\ 1]^T$, a pilot sequence that includes pilot coefficient of the second spatial flow successively may be $$\left[e^{-j\frac{2\pi}{3}} 1 e^{-j\frac{4\pi}{3}} 1\right]^T,$$

and a pilot sequence that includes pilot coefficient of the third spatial flow successively may be $$\left[e^{-j\frac{4\pi}{3}} e^{-j\frac{8\pi}{3}} 1\right]^T.$$

If the quantity of spatial flows in the wireless local area network is 3, a process of determining, by the receive end, to perform channel estimation is similar to the foregoing scenario in which there are two spatial flows, and a difference lies in that pilot coefficient of each of the spatial flows on each subcarrier in the symbol period are different. Optionally, if N>L, for example, if N=4, a pilot sequence that includes pilot coefficient of the first spatial flow successively on the subcarrier numbered j in the four consecutive symbol periods may be $[1\ -1\ 1\ 1]^T$, a pilot sequence that includes pilot coefficient of the second spatial flow successively may be $[1\ 1\ -1\ 1]^T$, and a pilot sequence that includes pilot coefficient of the third spatial flow successively may be $[1\ 1\ 1\ -1]^T$. A pilot sequence that includes pilot coefficient of the first spatial flow successively on the subcarrier numbered j+1 in the four consecutive symbol periods may be $[-1\ 1\ 1\ 1]^T$, a pilot sequence that includes pilot coefficient of the second spatial flow successively may be $[1\ -1\ 1\ 1]^T$, and a pilot sequence that includes pilot coefficient of the third spatial flow successively may be $[1\ 1\ -1\ 1]^T$. A pilot sequence that includes pilot coefficient of the first spatial flow successively on the subcarrier numbered j+2 in the four consecutive symbol periods may be $[1\ 1\ 1\ -1]^T$, a pilot sequence that includes pilot coefficient of the second spatial flow successively may be $[-1\ 1\ 1\ 1]^T$, and a pilot sequence that includes pilot coefficient of the third spatial flow successively may be $[1\ -1\ 1\ 1]^T$.

If the LTF corresponding to the subcarrier numbered j is $LTF_j$, the LTF corresponding to the subcarrier numbered j+1 is $LTF_{j+1}$, and the LTF corresponding to the subcarrier numbered j+2 is $LTF_{j+2}$, the signal matrix formed from the pilot signals of the first spatial flow, the second spatial flow, and the third spatial flow on the subcarrier numbered j in the four consecutive symbol periods may be shown in Table 6:

TABLE 6

| $LTF_j$ | $-LTF_j$ | $LTF_j$ | $LTF_j$ |
|---|---|---|---|
| $LTF_j$ | $LTF_j$ | $-LTF_j$ | $LTF_j$ |
| $LTF_j$ | $LTF_j$ | $LTF_j$ | $-LTF_j$ |

As shown in Table 6, the pilot signals of the first spatial flow on the subcarrier numbered j in the four consecutive symbol periods are $[LTF_j, -LTF_j, LTF_j, LTF_j]$ successively. The pilot signals of the second spatial flow on the subcarrier numbered j in the four consecutive symbol periods are $[LTF_j, LTF_j, -LTF_j, LTF_j]$ successively. The pilot signals of the third spatial flow on the subcarrier numbered j in the four consecutive symbol periods are $[LTF_j, LTF_j, LTF_j, -LTF_j]$ successively.

Therefore, the signal matrix formed from the pilot signals of the first spatial flow, the second spatial flow, and the third spatial flow on the subcarrier numbered j+1 in the four consecutive symbol periods may be shown in Table 7:

TABLE 7

| $-LTF_{j+1}$ | $LTF_{j+1}$ | $LTF_{j+1}$ | $LTF_{j+1}$ |
|---|---|---|---|
| $LTF_{j+1}$ | $-LTF_{j+1}$ | $LTF_{j+1}$ | $LTF_{j+1}$ |
| $LTF_{j+1}$ | $LTF_{j+1}$ | $-LTF_{j+1}$ | $LTF_{j+1}$ |

As shown in Table 7, the pilot signals of the first spatial flow on the subcarrier numbered j+1 in the four consecutive symbol periods are $[-LTF_{j+1}, LTF_{j+1}, LTF_{j+1}, LTF_{j+1}]$ successively. The pilot signals of the second spatial flow on the subcarrier numbered j+1 in the four consecutive symbol periods are $[LTF_{j+1}, -LTF_{j+1}, LTF_{j+1}, LTF_{j+1}]$ successively. The pilot signals of the third spatial flow on the subcarrier numbered j+1 in the four consecutive symbol periods are $[LTF_{j+1}, LTF_{j+1}, -LTF_{j+1}, LTF_{j+1}]$ successively.

Therefore, the signal matrix formed from the pilot signals of the first spatial flow, the second spatial flow, and the third spatial flow on the subcarrier numbered j+2 in the four consecutive symbol periods may be shown in Table 8:

TABLE 8

| $LTF_{j+2}$ | $LTF_{j+2}$ | $LTF_{j+2}$ | $-LTF_{j+2}$ |
|---|---|---|---|
| $-LTF_{j+2}$ | $LTF_{j+2}$ | $LTF_{j+2}$ | $LTF_{j+2}$ |
| $LTF_{j+2}$ | $-LTF_{j+2}$ | $LTF_{j+2}$ | $LTF_{j+2}$ |

As shown in Table 8, the pilot signals of the first spatial flow on the subcarrier numbered j+2 in the four consecutive symbol periods are $[LTF_{j+2}, LTF_{j+2}, LTF_{j+2}, -LTF_{j+2}]$ successively. The pilot signals of the second spatial flow on the subcarrier numbered j+2 in the four consecutive symbol periods are $[-LTF_{j+2}, LTF_{j+2}, LTF_{j+2}, LTF_{j+2}]$ successively. The pilot signals of the third spatial flow on the subcarrier numbered j+2 in the four consecutive symbol periods are $[LTF_{j+2}, -LTF_{j+2}, LTF_{j+2}, LTF_{j+2}]$ successively.

If the quantity of spatial flows in the wireless local area network is 4, a process of determining, by the receive end, to perform channel estimation is similar to the foregoing scenario in which there are two spatial flows, and a difference lies in that pilot coefficient of each of the spatial flows on each subcarrier in the symbol period are different. Optionally, a pilot sequence that includes pilot coefficient of the first spatial flow successively on the subcarrier numbered j in the four consecutive symbol periods may be $[1\ -1\ 1\ 1]^T$, a pilot sequence that includes pilot coefficient of the second spatial flow successively may be $[1\ 1\ -1\ 1]^T$, a pilot sequence that includes pilot coefficient of the third spatial flow successively may be $[1\ 1\ 1\ -1]^T$, and a pilot sequence that includes pilot coefficient of the fourth spatial flow successively may be $[-1\ 1\ 1\ 1]^T$. A pilot sequence that includes pilot coefficient of the first spatial flow successively on the subcarrier numbered j+1 in the four consecutive symbol periods may be $[-1\ 1\ 1\ 1]^T$, a pilot sequence that includes pilot coefficient of the second spatial flow successively may be $[1\ -1\ 1\ 1]^T$, a pilot sequence that includes pilot coefficient of the third spatial flow successively may be $[1\ 1\ -1\ 1]^T$, and a pilot sequence that includes pilot coefficient of the fourth spatial flow successively may be $[1\ 1\ 1\ -1]^T$. A pilot sequence that includes pilot coefficient of the first spatial flow successively on the subcarrier numbered j+2 in the four consecutive symbol periods may be $[1\ 1\ 1\ -1]^T$, a pilot sequence that includes pilot coefficient of the second spatial flow successively may be $[-1\ 1\ 1\ 1]^T$, a pilot sequence that includes pilot coefficient of the third spatial flow successively may be $[1\ -1\ 1\ 1]^T$, and a pilot sequence that includes pilot coefficient of the fourth spatial flow successively may be $[1\ 1\ -1\ 1]^T$. A pilot sequence that includes pilot coefficient of the first spatial flow successively on the subcarrier numbered j+3 in the four consecutive symbol periods may be $[1\ 1\ -1\ 1]^T$, a pilot sequence that includes pilot coefficient of the second spatial flow successively may be $[1\ 1\ 1\ -1]^T$, a pilot sequence that includes pilot coefficient of the third spatial flow successively may be $[-1\ 1\ 1\ 1]^T$, and a pilot sequence that includes pilot coefficient of the fourth spatial flow successively may be $[1\ -1\ 1\ 1]^T$.

If the LTF corresponding to the subcarrier numbered j is $LTF_j$, the LTF corresponding to the subcarrier numbered j+1 is $LTF_{j+1}$, the LTF corresponding to the subcarrier numbered j+2 is $LTF_{j+2}$, and the LTF corresponding to the subcarrier numbered j+3 is $LTF_{j+3}$, the signal matrix formed from the pilot signals of the first spatial flow, the second spatial flow, the third spatial flow, and the fourth spatial flow on the subcarrier numbered j in the four consecutive symbol periods may be shown in Table 9:

TABLE 9

| | | | |
|---|---|---|---|
| $LTF_j$ | $-LTF_j$ | $LTF_j$ | $LTF_j$ |
| $LTF_j$ | $LTF_j$ | $-LTF_j$ | $LTF_j$ |
| $LTF_j$ | $LTF_j$ | $LTF_j$ | $-LTF_j$ |
| $-LTF_j$ | $LTF_j$ | $LTF_j$ | $LTF_j$ |

As shown in Table 9, the pilot signals of the first spatial flow on the subcarrier numbered j in the four consecutive symbol periods are $[LTF_j, -LTF_j, LTF_j, LTF_j]$ successively. The pilot signals of the second spatial flow on the subcarrier numbered j in the four consecutive symbol periods are $[LTF_j, LTF_j, -LTF_j, LTF_j]$ successively. The pilot signals of the third spatial flow on the subcarrier numbered j in the four consecutive symbol periods are $[LTF_j, LTF_j, LTF_j, -LTF_j]$ successively. The pilot signals of the fourth spatial flow on the subcarrier numbered j in the four consecutive symbol periods are $[-LTF_j, LTF_j, LTF_j, LTF_j, LTF_j]$ successively.

Therefore, the signal matrix formed from the pilot signals of the first spatial flow, the second spatial flow, the third spatial flow, and the fourth spatial flow on the subcarrier numbered j+1 in the four consecutive symbol periods may be shown in Table 10:

TABLE 10

| | | | |
|---|---|---|---|
| $-LTF_{j+1}$ | $LTF_{j+1}$ | $LTF_{j+1}$ | $LTF_{j+1}$ |
| $LTF_{j+1}$ | $-LTF_{j+1}$ | $LTF_{j+1}$ | $LTF_{j+1}$ |
| $LTF_{j+1}$ | $LTF_{j+1}$ | $-LTF_{j+1}$ | $LTF_{j+1}$ |
| $LTF_{j+1}$ | $LTF_{j+1}$ | $LTF_{j+1}$ | $-LTF_{j+1}$ |

As shown in Table 10, the pilot signals of the first spatial flow on the subcarrier numbered j+1 in the four consecutive symbol periods are $[-LTF_{j+1}, LTF_{j+1}, LTF_{j+1}, LTF_{j+1}]$ successively. The pilot signals of the second spatial flow on the subcarrier numbered j+1 in the four consecutive symbol periods are $[LTF_{j+1}, -LTF_{j+1}, LTF_{j+1}, LTF_{j+1}]$ successively. The pilot signals of the third spatial flow on the subcarrier numbered j+1 in the four consecutive symbol periods are $[LTF_{j+1}, LTF_{j+1}, -LTF_{j+1}, LTF_{j+1}]$ successively. The pilot signals of the fourth spatial flow on the subcarrier numbered j+1 in the four consecutive symbol periods are $[LTF_{j+1}, LTF_{j+1}, LTF_{j+1}, -LTF_{j+1}]$ successively.

Therefore, the signal matrix formed from the pilot signals of the first spatial flow, the second spatial flow, the third spatial flow, and the fourth spatial flow on the subcarrier numbered j+2 in the four consecutive symbol periods may be shown in Table 11:

TABLE 11

| | | | |
|---|---|---|---|
| $LTF_{j+2}$ | $LTF_{j+2}$ | $LTF_{j+2}$ | $-LTF_{j+2}$ |
| $-LTF_{j+2}$ | $LTF_{j+2}$ | $LTF_{j+2}$ | $LTF_{j+2}$ |
| $LTF_{j+2}$ | $-LTF_{j+2}$ | $LTF_{j+2}$ | $LTF_{j+2}$ |
| $LTF_{j+2}$ | $LTF_{j+2}$ | $-LTF_{j+2}$ | $LTF_{j+2}$ |

As shown in Table 11, the pilot signals of the first spatial flow on the subcarrier numbered j+2 in the four consecutive symbol periods are $[LTF_{j+1}, LTF_{j+2}, LTF_{j+2}, -LTF_{j+2}]$ successively. The pilot signals of the second spatial flow on the subcarrier numbered j+2 in the four consecutive symbol periods are $[-LTF_{j+2}, LTF_{j+2}, LTF_{j+2}, LTF_{j+2}]$ successively. The pilot signals of the third spatial flow on the subcarrier numbered j+2 in the four consecutive symbol periods are $[LTF_{j+2}, -LTF_{j+2}, LTF_{j+2}, LTF_{j+2}]$ successively. The pilot signals of the fourth spatial flow on the subcarrier numbered j+2 in the four consecutive symbol periods are $[LTF_{j+2}, LTF_{j+2}, -LTF_{j+2}, LTF_{j+2}]$ successively.

Therefore, the signal matrix formed from the pilot signals of the first spatial flow, the second spatial flow, the third spatial flow, and the fourth spatial flow on the subcarrier numbered j+3 in the four consecutive symbol periods may be shown in Table 12:

TABLE 12

| | | | |
|---|---|---|---|
| $LTF_{j+3}$ | $LTF_{j+3}$ | $-LTF_{j+3}$ | $LTF_{j+3}$ |
| $LTF_{j+3}$ | $LTF_{j+3}$ | $LTF_{j+3}$ | $-LTF_{j+3}$ |
| $-LTF_{j+3}$ | $LTF_{j+3}$ | $LTF_{j+3}$ | $LTF_{j+3}$ |
| $LTF_{j+3}$ | $-LTF_{j+3}$ | $LTF_{j+3}$ | $LTF_{j+3}$ |

As shown in Table 12, the pilot signals of the first spatial flow on the subcarrier numbered j+3 in the four consecutive symbol periods are $[LTF_{j+3}\ LTF_{j+3}, LTF_{j+3}, -LTF_{-3}, LTF_{j+3}]$ successively. The pilot signals of the second spatial flow on the subcarrier numbered j+3 in the four consecutive symbol periods are $[LTF_{j+3}, LTF_{j+3}, LTF_{j+3}, -LTF_{j+}]$ successively. The pilot signals of the third spatial flow on the subcarrier numbered j+3 in the four consecutive symbol periods are $[-LTF_{j+3}, LTF_{j+3}, LTF_{j+3}, LTF_{j+3}]$ successively. The pilot signals of the fourth spatial flow on the subcarrier numbered j+3 in the four consecutive symbol periods are $[LTF_{j+3}, -LTF_{j+3}, LTF_{j+3}, LTF_{j+3}]$ successively.

Embodiment 6

According to Embodiment 6 of the present disclosure, a pilot transmission method in a wireless local area network is further provided. According to Embodiment 6 of the present disclosure, another pilot transmission method is further provided. In Embodiment 6 of the present disclosure, the method described in any one of Embodiments 1 to 4 is described by using an instance in which a quantity of spatial flows in a wireless local area network is 2. FIG. 9 is a flowchart of a pilot transmission method in a wireless local area network according to Embodiment 6 of the present disclosure. As shown in FIG. 9, the method may include the following steps.

Step 901: A transmit end applies a pilot matrix to an LTF to generate a pilot signal, where the pilot matrix includes: a matrix formed from pilot sequences that each consist of pilot coefficient of two spatial flows successively, where the spatial flows are on each subcarrier in four subcarriers in two consecutive symbol periods, and a matrix formed from pilot sequences that each consist of pilot coefficient of two spatial flows successively, where the spatial flows are on the four subcarriers in each symbol period in the two consecutive symbol periods, the pilot matrix is an orthogonal matrix, the four subcarriers include two groups of subcarriers, and each group of subcarriers includes two subcarriers.

In the contiguous two groups of subcarriers, the subcarriers in the first group of subcarriers are subcarriers numbered j and j+1, and the subcarriers in the second group of subcarriers are the subcarriers numbered j+2 and j+3. That is, in Embodiment 6 of the present disclosure, an example is used in which a serial number difference of subcarriers in each group of subcarriers is 1.

A pilot sequence that includes pilot coefficient of the first spatial flow successively on the subcarrier numbered j in the two consecutive symbol periods may be $[1\ -1]^T$, and a pilot sequence that includes pilot coefficient of the second spatial flow successively may be $[1\ 1]^T$. A pilot sequence that includes pilot coefficient of the first spatial flow successively on the subcarrier numbered j+1 in the two consecutive symbol periods may also be $[1\ -1]^T$, and a pilot sequence that includes pilot coefficient of the second spatial flow successively may also be $[1\ 1]^T$. A pilot sequence that includes pilot coefficient of the first spatial flow successively on the subcarrier numbered j+2 in the two consecutive symbol periods may be $[-1\ 1]^T$, and a pilot sequence that includes pilot coefficient of the second spatial flow successively may be $[1\ 1]^T$. A pilot sequence that includes pilot coefficient of the first spatial flow successively on the subcarrier numbered j+3 in the two consecutive symbol periods may also be $[-1\ 1]^T$, and a pilot sequence that includes pilot coefficient of the second spatial flow successively may also be $[1\ 1]^T$.

If the LTF corresponding to the subcarrier numbered j is $LTF_j$, the LTF corresponding to the subcarrier numbered j+1 is $LTF_{j+1}$, pilots of the first spatial flow, which are to be sent on the subcarrier numbered j in the two consecutive symbol periods, are $[LTF_j, -LTF_j]$ successively, and pilots of the first spatial flow, which are to be sent on the subcarrier numbered j+1 in the two consecutive symbol periods, are $[LTF_j, -LTF_j]$ successively. Pilots of the first spatial flow, which are to be sent on the subcarrier numbered j+2 in the two consecutive symbol periods, are $[-LTF_j, LTF_j]$ successively, and pilots of the first spatial flow, which are to be sent on the subcarrier numbered j+3 in the two consecutive symbol periods, are $[-LTF_j, LTF_j]$ successively.

Pilots of the second spatial flow, which are to be sent on the subcarrier numbered j in the two consecutive symbol periods, are $[LTF_j, LTF_j]$ successively, and pilots of the second spatial flow, which are to be sent on the subcarrier numbered j+1 in the two consecutive symbol periods, are $[LTF_j, LTF_j]$ successively. Pilots of the second spatial flow, which are to be sent on the subcarrier numbered j+2 in the two consecutive symbol periods, are $[LTF_j, LTF_j]$ successively, and pilots of the second spatial flow, which are to be sent on the subcarrier numbered j+2 in the two consecutive symbol periods, are $[LTF_j, LTF_j]$ successively.

Step 902: The transmit end sends the pilot signal on the four subcarriers.

Step 903: A receive end receives the pilot signal of each spatial flow on the four subcarriers separately in the two consecutive symbol periods, where the pilot signal is sent by the transmit end.

A signal received by the receive end on the subcarrier numbered j in the symbol period numbered i may be denoted by $r_{i,j}$, a signal received by the receive end on the subcarrier numbered j in the symbol period numbered i+1 may be denoted by $r_{i+1,j}$, a signal received by the receive end on the subcarrier numbered j+1 in the symbol period numbered i may be denoted by $r_{i,j+1}$, and a signal received by the receive end on the subcarrier numbered j+1 in the symbol period numbered i+1 may be denoted by $r_{i+1,j+1}$. A signal received by the receive end on the subcarrier numbered j+2 in the symbol period numbered i may be denoted by $r_{i,j+2}$, and a signal received by the receive end on the subcarrier numbered j+2 in the symbol period numbered i+1 may be denoted by $r_{i+1,j+2}$. A signal received by the receive end on the subcarrier numbered j+3 in the symbol period numbered i may be denoted by $r_{i,j+3}$, and a signal received by the receive end on the subcarrier numbered j+3 in the symbol period numbered i+1 may be denoted by $r_{i-1,j+3}$.

Channel information of the transmit antenna corresponding to the first spatial flow at the transmit end on the two subcarriers may be denoted by $h_{1,j}$, $h_{1,j+1}$, $h_{1,j+2}$, and $h_{1,j+3}$, and channel information of the transmit antenna corresponding to the second spatial flow at the transmit end on the two subcarriers may be denoted by $h_{2,j}$, $h_{2,j+1}$, $h_{2,j+2}$, and $h_{2,j+3}$. A phase deviation of the transmit antenna corresponding to the first spatial flow at the transmit end may be denoted by $\theta_1$, and a phase deviation of the transmit antenna corresponding to the second spatial flow at the transmit end may be denoted by $\theta_2$.

$r_{i,j}$ may be denoted by Formula (59), $r_{i+1,j}$ may be denoted by Formula (60), $r_{i,j+1}$ may be denoted by Formula (61), and $r_{i+1,j+1}$ may be denoted by Formula (62). $r_{i,j+2}$ may be denoted by Formula (63), $r_{i+1,j+2}$ may be denoted by Formula (64), $r_{i,j+3}$ may be denoted by Formula (65), and $r_{i+1,j+3}$ may be denoted by Formula (66).

$$r_{i,j}=h_{1,j}LTF_j+h_{2,j}LTF_j \tag{59}$$

$$r_{i+1,j}=-e^{j\theta_1}h_{1,j}LTF_j+e^{j\theta_2}h_{2,j}LTF_j \tag{60}$$

$$r_{i,j+1}=h_{1,j+1}LTF_{j+1}+h_{2,j+1}LTF_{j+1} \tag{61}$$

$$r_{i+1,j+1}=-e^{j\theta_1}h_{1,j+1}LTF_{j+1}+e^{j\theta_2}h_{2,j+1}LTF_{j+1} \tag{62}$$

$$r_{i,j+2}=h_{1,j+2}LTF_{j+2}+h_{2,j+2}LTF_{j+2} \tag{63}$$

$$r_{i+1,j+2}=-e^{j\theta_1}h_{1,j+2}LTF_j+e^{j\theta_2}h_{2,j+2}LTF_{j+2} \tag{64}$$

$$r_{i,j+3}=h_{1,j+3}LTF_{j+3}+h_{2,j+3}LTF_{j+3} \tag{65}$$

$$r_{i+1,j+3}=-e^{j\theta_1}h_{1,j+3}LTF_{j+3}+e^{j\theta_2}h_{2,j+2}LTF_{j+3} \tag{66}$$

Step 904: The receive end calculates a phase deviation of each transmit antenna at the transmit end with reference to the pilot signal of each spatial flow at the transmit end.

By using $r'_{i,j}$ to refer to dividing $r_{i,j}$ by $LTF_j$, Formula (59) is converted into Formula (67); by using $r'_{i+1,j}$ to refer to dividing $r_{i-1,j}$ by $LTF_j$ Formula (60) is converted into Formula (68); by using $r'_{i,j+1}$ to refer to dividing $r_{i,j+1}$ by $LTF_{j+1}$, Formula (61) is converted into Formula (69); by using $r'_{i+1,j+1}$ to refer to dividing $r_{i+1,j+1}$ by $LTF_{j+1}$, Formula (62) is converted into Formula (70); by using $r'_{i,j+2}$ to refer to dividing $r_{i,j+2}$ by $LTF_{j+2}$, Formula (63) is converted into Formula (71); by using $r'_{i+1,j+2}$ to refer to dividing $r_{i+1,j+2}$ by $LTF_{j+2}$, Formula (64) is converted into Formula (72); by using $r'_{i,j+3}$ to refer to dividing $r_{i,j+3}$ by $LTF_{j+3}$, Formula (65) is converted into Formula (73); and by using $r'_{i+1,j+3}$ to refer to dividing $r_{i+1,j+3}$ by $LTF_{j+3}$, Formula (66) is converted into Formula (74).

$$r'_{i,j}=h_{1,j}+h_{2,j} \tag{67}$$

$$r'_{i+1,j}=-e^{j\theta_1}h_{1,j}+e^{j\theta_2}h_{2,j} \tag{68}$$

$$r'_{i,j+1} = h_{1,j+1} + h_{2,j+1} \quad (69)$$

$$r'_{i+1,j+1} = -e^{j\theta_1} h_{1,j+1} + e^{j\theta_2} h_{2,j+1} \quad (70)$$

$$r'_{i,j+2} = -h_{1,j+2} + h_{2,j+2} \quad (71)$$

$$r'_{i+1,j+1} = -e^{j\theta_1} h_{1,j+2} + e^{j\theta_2} h_{2,j+2} \quad (72)$$

$$r'_{i,j+3} = -h_{1,j+3} + h_{2,j+3} \quad (73)$$

$$r'_{i+1,j+3} = -e^{j\theta_1} h_{1,j+3} + e^{j\theta_2} h_{2,j+3} \quad (74)$$

$h_{1,j+1}$ minus $h_{1,j}$ is equal to $h_{1,j+3}$ minus $h_{1,j+2}$; and $h_{2,j+1}$ minus $h_{2,j}$ is equal to $h_{2,j+3}$ minus $h_{2,j+2}$.

Therefore, Formula (67), Formula (69), Formula (71), and Formula (73) may be used to deduce:

$$\begin{bmatrix} r'_{i,j+1} - r'_{i,j} \\ r'_{i,j+3} - r'_{i,j+2} \end{bmatrix} = \begin{bmatrix} 1 & 1 \\ -1 & 1 \end{bmatrix} \begin{bmatrix} h_{1,j+1} - h_{1,j} \\ h_{2,j+1} - h_{2,j} \end{bmatrix} = Q_1 \begin{bmatrix} h_{1,j+1} - h_{1,j} \\ h_{2,j+1} - h_{2,j} \end{bmatrix} \quad (75)$$

Formula (68), Formula (70), Formula (72), and Formula (74) may be used to deduce:

$$\begin{bmatrix} r'_{i+1,j+1} - r'_{i+1,j} \\ r'_{i+1,j+3} - r'_{i+1,j+2} \end{bmatrix} = \begin{bmatrix} -1 & 1 \\ 1 & 1 \end{bmatrix} \begin{bmatrix} e^{j\theta_1}(h_{1,j+1} - h_{1,j}) \\ e^{j\theta_2}(h_{2,j+1} - h_{2,j}) \end{bmatrix} = Q_2 \begin{bmatrix} e^{j\theta_1}(h_{1,j+1} - h_{1,j}) \\ e^{j\theta_2}(h_{2,j+1} - h_{2,j}) \end{bmatrix} \quad (76)$$

where $$Q_1 = \begin{bmatrix} 1 & 1 \\ -1 & 1 \end{bmatrix} \text{ and } Q_2 = \begin{bmatrix} -1 & 1 \\ 1 & 1 \end{bmatrix}.$$

Therefore, Formula (75) may be used to deduce:

$$\begin{bmatrix} h_{1,j+1} - h_{1,j} \\ h_{2,j+1} - h_{2,j} \end{bmatrix} = Q_1^H Q_1 \begin{bmatrix} r'_{i,j+1} - r'_{i,j} \\ r'_{i,j+3} - r'_{i,j+2} \end{bmatrix} \quad (77)$$

Similarly, Formula (76) may be used to deduce:

$$\begin{bmatrix} e^{j\theta_1}(h_{1,j+1} - h_{1,j}) \\ e^{j\theta_2}(h_{2,j+1} - h_{2,j}) \end{bmatrix} = Q_2^H Q_2 \begin{bmatrix} r'_{i+1,j+1} - r'_{i+1,j} \\ r'_{i+1,j+3} - r'_{i+1,j+2} \end{bmatrix} \quad (78)$$

Therefore, a phase may be calculated according to results of the foregoing two formulas, and $\theta_1$ is determined. $\theta^1$ may be denoted by Formula (79):

$$\theta_1 = \angle(e^{j\theta_1}) = \angle((h_{1,j+1} - h_{1,j})^* e^{j\theta_1}(h_{1,j+1} - h_{1,j})) \quad (79)$$

where ( )* indicates calculation of a conjugate.

$\eta_2$ is determined in a similar way, and $\theta_2$ may be denoted by formula (80):

$$\theta_2 = \angle(e^{j\theta_2}) = \angle((h_{2,j+1} - h_{2,j})^* e^{j\theta_2}(h_{2,j+1} - h_{2,j})) \quad (80)$$

Step 905: The receive end corrects the pilot signal of each spatial flow at the transmit end according to a phase deviation of the transmit antenna corresponding to a first spatial flow at the transmit end and a phase deviation of the transmit antenna corresponding to a second spatial flow at the transmit end.

Step 906: According to the corrected pilot signal and the LTF of each subcarrier in the four contiguous subcarriers, the receive end performs channel estimation on the transmit antenna corresponding to the first spatial flow at the transmit end and the transmit antenna corresponding to the second spatial flow at the transmit end.

After determining the phase deviation of the transmit antenna corresponding to the first spatial flow at the transmit end and the phase deviation of the transmit antenna corresponding to the second spatial flow at the transmit end, the receive end may determine, according to Formula (81), channel information $h_{1,j}$ of the transmit antenna corresponding to the first spatial flow at the transmit end on the subcarrier numbered j, and channel information $h_{2,j}$ of the transmit antenna corresponding to the second spatial flow at the transmit end on the sub carrier numbered j.

The receive end may determine, according to Formula (82), channel information $h_{1,j+1}$, of the transmit antenna corresponding to the first spatial flow at the transmit end on the subcarrier numbered j+1, and channel information $h_{2,j+1}$, of the transmit antenna corresponding to the second spatial flow at the transmit end on the subcarrier numbered j+1.

The receive end may determine, according to Formula (83), channel information $h_{1,j+2}$, of the transmit antenna corresponding to the first spatial flow at the transmit end on the subcarrier numbered j+2, and channel information $h_{2,j+2}$, of the transmit antenna corresponding to the second spatial flow at the transmit end on the subcarrier numbered j+2.

The receive end may determine, according to Formula (84), channel information $h_{1,j+3}$, of the transmit antenna corresponding to the first spatial flow at the transmit end on the subcarrier numbered j+3, and channel information $h_{2,j+3}$, of the transmit antenna corresponding to the second spatial flow at the transmit end on the subcarrier numbered j+3.

$$\begin{bmatrix} h_{1,j} \\ h_{2,j} \end{bmatrix} = \left( \begin{bmatrix} 1 & 1 \\ -e^{j\theta_1} & e^{j\theta_2} \end{bmatrix}^H \begin{bmatrix} 1 & 1 \\ -e^{j\theta_1} & e^{j\theta_2} \end{bmatrix} \right)^{-1} \begin{bmatrix} 1 & 1 \\ -e^{j\theta_1} & e^{j\theta_2} \end{bmatrix}^H \begin{bmatrix} r'_{i,j} \\ r'_{i+1,j} \end{bmatrix} \quad (81)$$

$$\begin{bmatrix} h_{1,j+1} \\ h_{2,j+1} \end{bmatrix} = \left( \begin{bmatrix} 1 & 1 \\ -e^{j\theta_1} & e^{j\theta_2} \end{bmatrix}^H \begin{bmatrix} 1 & 1 \\ -e^{j\theta_1} & e^{j\theta_2} \end{bmatrix} \right)^{-1} \begin{bmatrix} 1 & 1 \\ -e^{j\theta_1} & e^{j\theta_2} \end{bmatrix}^H \begin{bmatrix} r'_{i,j+1} \\ r'_{i+1,j+1} \end{bmatrix} \quad (82)$$

$$\begin{bmatrix} h_{1,j+2} \\ h_{2,j+2} \end{bmatrix} = \left( \begin{bmatrix} -1 & 1 \\ e^{j\theta_1} & e^{j\theta_2} \end{bmatrix}^H \begin{bmatrix} -1 & 1 \\ e^{j\theta_1} & e^{j\theta_2} \end{bmatrix} \right)^{-1} \begin{bmatrix} -1 & 1 \\ e^{j\theta_1} & e^{j\theta_2} \end{bmatrix}^H \begin{bmatrix} r'_{i,j+2} \\ r'_{i+1,j+2} \end{bmatrix} \quad (83)$$

$$\begin{bmatrix} h_{1,j+3} \\ h_{2,j+3} \end{bmatrix} = \left( \begin{bmatrix} -1 & 1 \\ e^{j\theta_1} & e^{j\theta_2} \end{bmatrix}^H \begin{bmatrix} -1 & 1 \\ e^{j\theta_1} & e^{j\theta_2} \end{bmatrix} \right)^{-1} \begin{bmatrix} -1 & 1 \\ e^{j\theta_1} & e^{j\theta_2} \end{bmatrix}^H \begin{bmatrix} r'_{i,j+3} \\ r'_{i+1,j+3} \end{bmatrix} \quad (84)$$

In the solution provided in Embodiment 6 of the present disclosure, the receive end may perform channel estimation on each transmit antenna at the transmit end according to the determined phase deviation after determining the phase deviation of each transmit antenna at the transmit end, thereby improving channel estimation precision.

It should be noted that the solution provided in Embodiment 6 of the present disclosure can also improve channel estimation precision of the transmit end when the quantity of spatial flows in the wireless local area network is 3 or 4.

Embodiment 7

Figure 10:
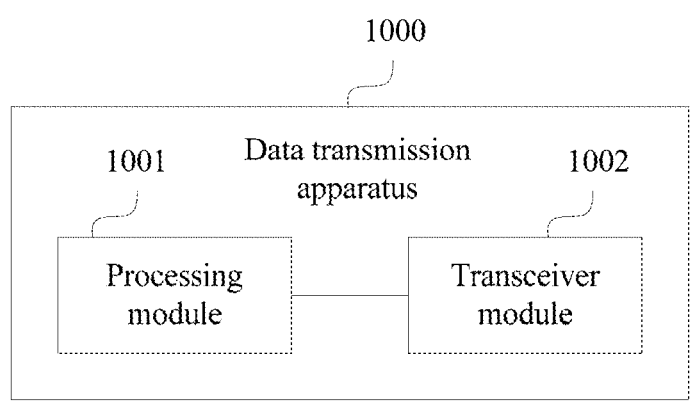
FIG. 10 is a schematic structural diagram of a data transmission apparatus according to Embodiment 7 of the present disclosure.

According to Embodiment 7 of the present disclosure, a data transmission apparatus is further provided. FIG. 10 is a schematic structural diagram of a data transmission apparatus according to Embodiment 7 of the present disclosure. As shown in FIG. 10, the data transmission apparatus 1000 may include:

a processing module 1001, configured to apply a pilot matrix to an LTF to generate a pilot signal, where the pilot matrix includes: a matrix formed from pilot sequences that each consist of pilot coefficient of each of the spatial flows, where the spatial flow is on M subcarriers in N consecutive symbol periods, the pilot matrix is an orthogonal matrix, N is a positive integer greater than or equal to L, L is a quantity of spatial flows in a wireless local area network, and M is a positive integer multiple of L; and a transceiver module 1002, configured to send the pilot signal on the M subcarriers.

Optionally, the pilot matrix includes: a matrix formed from pilot sequences that each consist of pilot coefficient of each of the spatial flows successively on each subcarrier in the M subcarriers in the N consecutive symbol periods.

A pilot sequence that includes pilot coefficient of the $n^{th}$ spatial flow successively that are sent on the $l^{th}$ subcarrier in the N consecutive symbol periods is $[p^n_{1,l}\ p^n_{2,l}\ \cdots\ p^n_{N,l}]^T$, where n=1, 2, ..., L and l=1, 2, ..., M.

The pilot matrix $P_l$ of L spatial flows on the $l^{th}$ subcarrier in the N consecutive symbol periods is:

$$P_l = \begin{bmatrix} p^1_{1,l} & p^2_{1,l} & \cdots & p^n_{1,l} & \cdots & p^L_{1,l} \\ p^1_{2,l} & p^2_{2,l} & \vdots & p^n_{2,l} & \vdots & p^L_{2,l} \\ \vdots & \vdots & \vdots & \vdots & \vdots & \vdots \\ p^1_{N,l} & p^2_{N,l} & \cdots & p^n_{N,l} & \cdots & p^L_{N,l} \end{bmatrix}.$$

Optionally, the pilot matrix further includes: a matrix formed from pilot sequences that each consist of pilot coefficient of each of the spatial flows successively on the M subcarriers in each symbol period in the N consecutive symbol periods.

A pilot sequence that includes pilot coefficient of the $n^{th}$ spatial flow successively on the M subcarriers in the $l'^{th}$ symbol period is $[p^n_{l',1}\ p^n_{l',2}\ \cdots\ p^n_{l',L}]^T$, where n=1, 2, ..., L, and l'=1, 2, ..., N.

The pilot matrix of the L spatial flows on the M subcarriers in the $l'^{th}$ symbol period is:

$$Q_{l'} = \begin{bmatrix} p^1_{l',1} & p^2_{l',1} & \cdots & p^{n_1}_{l',1} & \cdots & p^L_{l',1} \\ p^1_{l',2} & p^2_{l',2} & \vdots & p^{n_1}_{l',2} & \vdots & p^L_{l',2} \\ \vdots & \vdots & \vdots & \vdots & \vdots & \vdots \\ p^1_{l',M} & p^2_{l',M} & \cdots & p^{n_1}_{l',M} & \cdots & p^L_{l',M} \end{bmatrix}.$$

Optionally, M subcarriers include L groups of subcarriers, and each group of subcarriers includes one subcarrier.

Optionally, the M subcarriers include L groups of subcarriers, each group of subcarriers includes two subcarriers, the serial number differences of subcarriers in each group of subcarriers are equal, and the serial number difference of subcarriers in each group of subcarriers is greater than or equal to 1.

The data transmission apparatus 1000 provided in Embodiment 7 of the present disclosure may be a data transmission apparatus in a wireless local area network. The data transmission apparatus 1000 may be, for example, a station, an access point, or an application-specific circuit or chip for implementing related functions. The data transmission apparatus 1000 may be a transmit end in each implementation manner. The data transmission apparatus 1000 may be, for example, a transmit end of the station or access point shown in FIG. 1.

The data transmission apparatus provided in Embodiment 7 of the present disclosure may implement the pilot transmission method in any one of Embodiments 1 to 3. A specific implementation process is similar to that in the foregoing embodiments, and details are not described herein.

Embodiment 8

Figure 11:
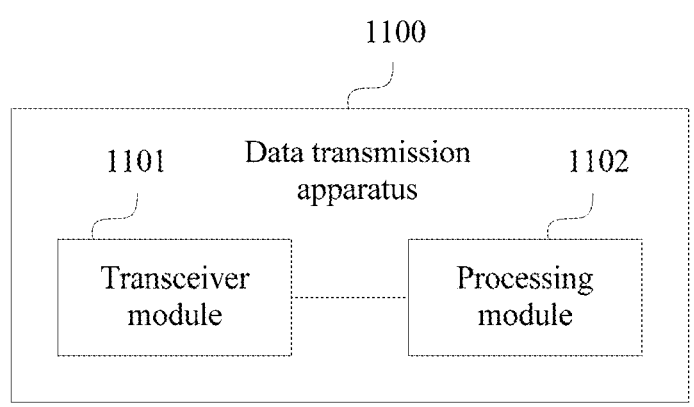
FIG. 11 is a schematic structural diagram of a data transmission apparatus according to Embodiment 8 of the present disclosure.

According to Embodiment 8 of the present disclosure, a data transmission apparatus is further provided. FIG. 11 is a schematic structural diagram of a data transmission apparatus according to Embodiment 8 of the present disclosure.

As shown in FIG. 11, the data transmission apparatus 1100 may include:

a transceiver module 1101, configured to: receive a pilot signal of each spatial flow on M subcarriers in N consecutive symbol periods separately, where the pilot signal is sent by a transmit end, the pilot signal of each spatial flow is a pilot signal generated by the transmit end by applying a pilot matrix to an LTF, the pilot matrix includes: a pilot sequence that includes pilot coefficient of each of the spatial flows on the M subcarriers in the N consecutive symbol periods, the pilot matrix is an orthogonal matrix, N is a positive integer greater than or equal to L, L is a quantity of spatial flows in the wireless local area network, and M is a positive integer multiple of L; and a processing module 1102, configured to calculate a phase deviation of a transmit antenna corresponding to each spatial flow at the transmit end with reference to the pilot signal of each spatial flow at the transmit end.

Optionally, the processing module 1102 is further configured to correct the pilot signal of each spatial flow at the transmit end according to the phase deviation of a transmit antenna corresponding to each spatial flow at the transmit end; and perform channel estimation on the transmit antenna corresponding to each spatial flow at the transmit end according to the corrected pilot signal and the LTF of each subcarrier in the M subcarriers.

Optionally, the pilot matrix includes: a pilot sequence that includes pilot coefficient of each of the spatial flows successively on the M subcarriers in the N consecutive symbol periods.

A pilot sequence that includes pilot coefficient of the $n^{th}$ spatial flow successively that are sent on the $l^{th}$ subcarrier in the N consecutive symbol periods is $[p^n_{1,l}\ p^n_{2,l}\ \cdots\ p^n_{N,l}]^T$, where n=1, 2, ..., L, and l=1, 2, ..., M.

The pilot matrix $P_l$ of L spatial flows on the $l^{th}$ subcarrier in the N consecutive symbol periods is:

$$P_l = \begin{bmatrix} p^1_{1,l} & p^2_{1,l} & \cdots & p^n_{1,l} & \cdots & p^L_{1,l} \\ p^1_{2,l} & p^2_{2,l} & \vdots & p^n_{2,l} & \vdots & p^L_{2,l} \\ \vdots & \vdots & \vdots & \vdots & \vdots & \vdots \\ p^1_{N,l} & p^2_{N,l} & \cdots & p^n_{N,l} & \cdots & p^L_{N,l} \end{bmatrix}.$$

Optionally, the pilot matrix further includes: a pilot sequence that includes pilot coefficient of each of the spatial flows successively on the M subcarriers in each symbol period in the N consecutive symbol periods.

A pilot sequence that includes pilot coefficient of the $n^{th}$ spatial flow successively on the M subcarriers in the $l'^{th}$ symbol period is $[p''_{l',1} \ p''_{l',2} \ \ldots \ p''_{l',L}]^T$, where n=1, 2, ..., L, and l'=1, 2, ..., N.

The pilot matrix $Q_{l'}$ of the L spatial flows on the M subcarriers in the $l'^{th}$ symbol period is:

$$Q_{l'} = \begin{bmatrix} p^1_{l',1} & p^2_{l',1} & \cdots & p^{n_1}_{l',1} & \cdots & p^L_{l',1} \\ p^1_{l',2} & p^2_{l',2} & \vdots & p^{n_1}_{l',2} & \vdots & p^L_{l',2} \\ \vdots & \vdots & \vdots & \vdots & \vdots & \vdots \\ p^1_{l',M} & p^2_{l',M} & \cdots & p^{n_1}_{l',M} & \cdots & p^L_{l',M} \end{bmatrix}.$$

Optionally, M subcarriers include L groups of subcarriers, and each group of subcarriers includes one subcarrier.

Optionally, the M subcarriers include L groups of subcarriers, each group of subcarriers includes two subcarriers, the serial number differences of subcarriers in each group of subcarriers are equal, and the serial number difference of subcarriers in each group of subcarriers is greater than or equal to 1.

The data transmission apparatus 1100 provided in Embodiment 8 of the present disclosure may be a data transmission apparatus in a wireless local area network. The data transmission apparatus 1100 may be, for example, a station, an access point, or an application-specific circuit or chip for implementing related functions. The data transmission apparatus 1100 may be a receive end in each implementation manner. The data transmission apparatus 1100 may be, for example, a receive end of the station or access point shown in FIG. 1.

The data transmission apparatus provided in Embodiment 8 of the present disclosure may implement the pilot transmission method in Embodiment 4. A specific implementation process is similar to that in the foregoing embodiment, and details are not described herein.

Embodiment 9

Figure 12:
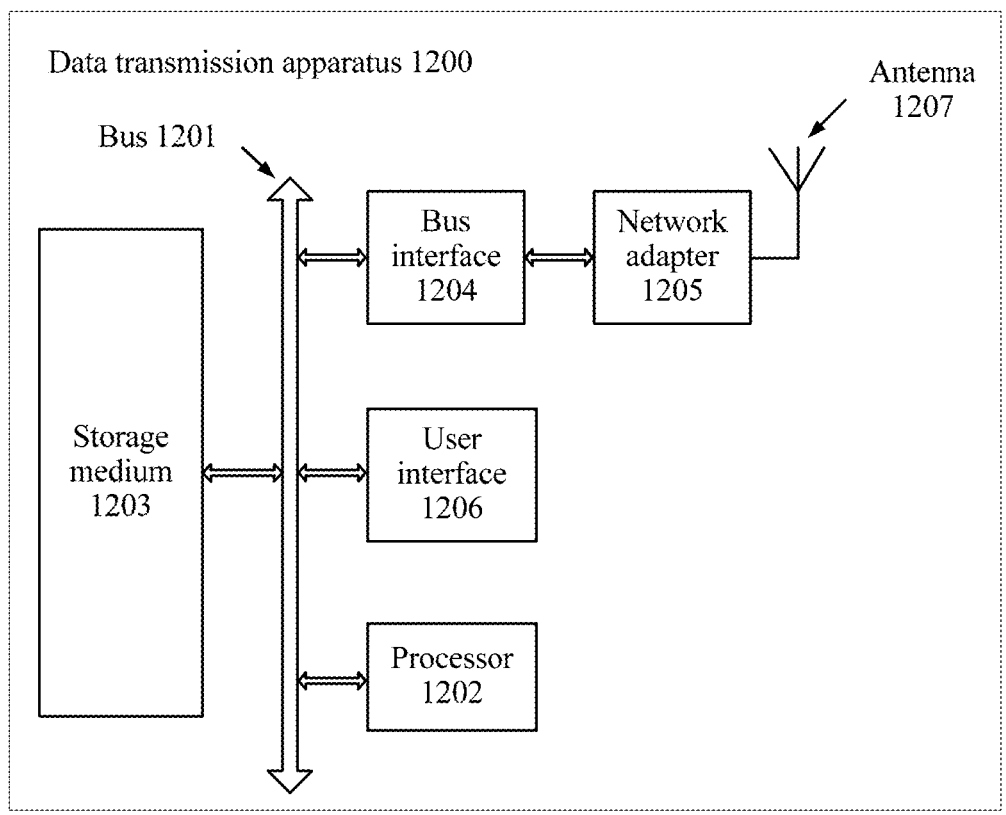
FIG. 12 is a schematic structural diagram of a data transmission apparatus according to Embodiment 9 of the present disclosure.

According to Embodiment 9 of the present disclosure, a data transmission apparatus is further provided. FIG. 12 is a schematic structural diagram of a data transmission apparatus according to Embodiment 9 of the present disclosure. As shown in FIG. 12, the data transmission apparatus 1200 may be implemented by using a bus 1201 as a general bus architecture. According to constraints on specific applications and overall design of the data transmission apparatus 1200, the bus 1201 may include any quantity of interconnection buses and bridges. The bus 1201 connects various circuits together, and the circuits include a processor 1202, a storage medium 1203, and a bus interface 1204. The data transmission apparatus 1200 uses the bus interface 1204 to connect a network adapter 1205 and the like by means of the bus 1201. The network adapter 1205 may be configured to implement signal processing functions of a physical layer in a wireless local area network, and send and receive a radio frequency signal by using an antenna 1207. A user interface 1206 may connect to a user terminal such as a keyboard, a display, a mouse, or a joystick. The bus 1201 may further connect to other various circuits, for example, a timing source, a peripheral device, a voltage regulator, and a power management circuit. These circuits are well-known in the art, and are not detailed herein any further.

The data transmission apparatus 1200 may be configured as a general processing system. The general processing system includes one or more microprocessors that provide processor functions, and an external memory that provides at least a part of the storage medium 1203. All of them are connected to other supporting circuits by using an external bus architecture. Alternatively, the data transmission apparatus 1200 may be implemented by using an ASIC (application-specific integrated circuit) with a processor 1202, a bus interface 1204, and a user interface 1206, or by using at least a part of the storage medium 1203 integrated into a single chip; or the data transmission apparatus 1200 may be implemented by using one or more FPGAs (field programmable gate array), a PLD (programmable logic device), a controller, a state machine, gate logic, a discrete hardware component, any other appropriate circuits, or a circuit capable of performing functions described in the present disclosure, or any combination thereof.

The processor 1202 is responsible for managing the bus and general processing (including: executing software stored in the storage medium 1203). The processor 1202 may be implemented by using one or more general purpose processors and/or special purpose processors. Examples of the processors include a microprocessor, a microcontroller, a DSP processor, and other circuits capable of executing software. The software should be broadly construed as instructions, data or any other combinations regardless of whether it is referred to as software, firmware, middleware, microcode, hardware description language or others.

In FIG. 12, the storage medium 1203 is separated from the processor 1202. However, it is apparent to persons skilled in the art that the storage medium 1203 or any part thereof may be located outside the data transmission apparatus 1200. For example, the storage medium 1203 may include a transmission wire, a carrier waveform modulated by using data, and/or a computer product separated from a wireless node. Such media are accessible by the processor 1202 by using the bus interface 1204. Alternatively, the storage medium 1203 or any part thereof may be integrated into the processor 1202, for example, may be a cache and/or a general purpose register.

The processor 1202 may execute an instruction corresponding to the method according to any one of Embodiments 1 to 6, and details are not described herein.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A pilot transmission method in a wireless local area network, the method comprising:
applying a pilot matrix to a long training field (LTF) to generate a pilot signal; and sending the pilot signal on M subcarriers from a transmit end to a receive end, wherein:

the pilot signal enables the receive end to calculate a phase deviation between a transmit antenna and a receive antenna corresponding to each spatial flow at the transmit end with reference to the pilot signal of each spatial flow at the transmit end and correct the pilot signal of each spatial flow according to the phase deviation, the pilot matrix is formed from pilot sequences each having a pilot coefficient of each of L spatial flows successively in the wireless local area network, the spatial flow is on each subcarrier in the M subcarriers in N consecutive symbol periods, the pilot matrix is an orthogonal matrix, N is a positive integer greater than or equal to L, M is a positive integer multiple of L, a pilot sequence that includes a pilot coefficient of an $n^{th}$ spatial flow successively that is sent on an $l^{th}$ subcarrier in the N consecutive symbol periods is $[p''_{1,l}\ p''_{2,l}\ \ldots\ p''_{N,l}]^T$, wherein $n=1, 2, \ldots, L$, and $l=1, 2, \ldots, M$, and the pilot matrix $P_l$ of the L spatial flows on the $l^{th}$ subcarrier in the N consecutive symbol periods is denoted as:

$$P_l = \begin{bmatrix} p^1_{1,l} & p^2_{1,l} & \cdots & p^n_{1,l} & \cdots & p^L_{1,l} \\ p^1_{2,l} & p^2_{2,l} & \vdots & p^n_{2,l} & \vdots & p^L_{2,l} \\ \vdots & \vdots & \vdots & \vdots & \vdots & \vdots \\ p^1_{N,l} & p^2_{N,l} & \cdots & p^n_{N,l} & \cdots & p^L_{N,l} \end{bmatrix}.$$

2. The method according to claim 1, wherein the M subcarriers comprise L groups of subcarriers, and each group of subcarriers comprises one subcarrier.

3. The method according to claim 1, wherein the M subcarriers comprise L groups of subcarriers, each group of subcarriers comprises two subcarriers, serial number differences of subcarriers in each group of subcarriers are equal, and a serial number difference of subcarriers in each group of subcarriers is greater than or equal to 1.

4. A pilot transmission method in a wireless local area network, the method comprising:

applying a pilot matrix to a long training field (LTF) to generate a pilot signal; and sending the pilot signal on M subcarriers from a transmit end to a receive end, wherein:

the pilot signal enables the receive end to calculate a phase deviation between a transmit antenna and a receive antenna corresponding to each spatial flow at the transmit end with reference to the pilot signal of each spatial flow at the transmit end and correct the pilot signal of each spatial flow according to the phase deviation, the pilot matrix is formed from pilot sequences each having a pilot coefficient of each of L spatial flows successively in the wireless local area network, the spatial flow is on the M subcarriers in each symbol period in N consecutive symbol periods, the pilot matrix is an orthogonal matrix, N is a positive integer greater than or equal to L, M is a positive integer multiple of L, a pilot sequence that includes a pilot coefficient of an $n^{th}$ spatial flow successively on the M subcarriers in an $l'^{th}$ symbol period is $[p''_{l',1}\ p''_{l',2}\ \ldots\ p''_{l',L}]^T$, where $n=1, 2, \ldots, L$, and $l'=1, 2, \ldots, N$, and the pilot matrix $Q_{l'}$ of the L spatial flows on the M subcarriers in the $l'^{th}$ symbol period is denoted as:

$$Q_{l'} = \begin{bmatrix} p^1_{l',1} & p^2_{l',1} & \cdots & p^{n_1}_{l',1} & \cdots & p^L_{l',1} \\ p^1_{l',2} & p^2_{l',2} & \vdots & p^{n_1}_{l',2} & \vdots & p^L_{l',2} \\ \vdots & \vdots & \vdots & \vdots & \vdots & \vdots \\ p^1_{l',M} & p^2_{l',M} & \cdots & p^{n_1}_{l',M} & \cdots & p^L_{l',M} \end{bmatrix}.$$

5. A pilot transmission method in a wireless local area network, the method comprising:

receiving, at a receive end, a pilot signal of each spatial flow on M subcarriers in N consecutive symbol periods separately, wherein the pilot signal is sent by a transmit end, and the pilot signal of each spatial flow is generated by the transmit end by applying a pilot matrix to a long training field (LTF);

calculating, at the receive end, a phase deviation between a transmit antenna and a receive antenna corresponding to each spatial flow at the transmit end with reference to the pilot signal of each spatial flow at the transmit end; and correcting, at the receive end, the pilot signal of each spatial flow according to the phase deviation, wherein:

the pilot matrix comprises a pilot sequence that includes a pilot coefficient of each of the spatial flows successively on the M subcarriers in the N consecutive symbol periods, the pilot matrix is an orthogonal matrix, L is a quantity of spatial flows in the wireless local area network, N is a positive integer greater than or equal to L, M is a positive integer multiple of L, a pilot sequence that includes a pilot coefficient of an $n^{th}$ spatial flow successively that is sent on an $l^{th}$ subcarrier in the N consecutive symbol periods is $[p''_{1,l}\ p''_{2,l}\ \ldots\ p''_{N,l}]^T$, where $n=1, 2, \ldots, L$, and $l=1, 2, \ldots, M$, and the pilot matrix Pi of the L spatial flows on the $l^{th}$ subcarrier in the N consecutive symbol periods is denoted as:

$$P_l = \begin{bmatrix} p^1_{1,l} & p^2_{1,l} & \cdots & p^n_{1,l} & \cdots & p^L_{1,l} \\ p^1_{2,l} & p^2_{2,l} & \vdots & p^n_{2,l} & \vdots & p^L_{2,l} \\ \vdots & \vdots & \vdots & \vdots & \vdots & \vdots \\ p^1_{N,l} & p^2_{N,l} & \cdots & p^n_{N,l} & \cdots & p^L_{N,l} \end{bmatrix}.$$

6. The method according to claim 5, further comprising:

correcting the pilot signal of each spatial flow at the transmit end according to the phase deviation between the transmit antenna and the receive antenna corresponding to each spatial flow at the transmit end; and performing channel estimation on the transmit antenna corresponding to each spatial flow at the transmit end according to the corrected pilot signal and the LTF of each subcarrier in the M subcarriers.

7. The method according to claim 5, wherein the M subcarriers comprise L groups of subcarriers, and each group of subcarriers comprises one subcarrier.

8. The method according to claim 5, wherein the M subcarriers comprise L groups of subcarriers, each group of subcarriers comprises two subcarriers, serial number differences of subcarriers in each group of subcarriers are equal, and a serial number difference of subcarriers in each group of subcarriers is greater than or equal to 1.

9. A pilot transmission method in a wireless local area network, the method comprising:
receiving, at a receive end, a pilot signal of each spatial flow on M subcarriers in N consecutive symbol periods separately, wherein the pilot signal is sent by a transmit end, the pilot signal of each spatial flow is generated by the transmit end by applying a pilot matrix to a long training field (LTF);
calculating, at the receive end, a phase deviation between a transmit antenna and a receive antenna corresponding to each spatial flow at the transmit end with reference to the pilot signal of each spatial flow at the transmit end; and
correcting, at the receive end, the pilot signal of each spatial flow according to the phase deviation, wherein:
the pilot matrix comprises a pilot sequence that includes a pilot coefficient of each of the spatial flows successively on the M subcarriers in each symbol period in the N consecutive symbol periods,
the pilot matrix is an orthogonal matrix,
L is a quantity of spatial flows in the wireless local area network,
N is a positive integer greater than or equal to L,
M is a positive integer multiple of L,
a pilot sequence that includes a pilot coefficient of an $n^{th}$ spatial flow successively on the M subcarriers in an $l'^{th}$ symbol period is $[p''_{l',1}\ p''_{l',2} \ldots p''_{l',L}]^T$, wherein n=1, 2, ..., L and l'=1, 2, ..., N, and
the pilot matrix $Q_{l'}$ of the L spatial flows on the M subcarriers in the $l'^{th}$ symbol period is denoted as:

$$Q_{l'} = \begin{bmatrix} p^1_{l',1} & p^2_{l',1} & \cdots & p^{n_1}_{l',1} & \cdots & p^L_{l',1} \\ p^1_{l',2} & p^2_{l',2} & \vdots & p^{n_1}_{l',2} & \vdots & p^L_{l',2} \\ \vdots & \vdots & \vdots & \vdots & \vdots & \vdots \\ p^1_{l',M} & p^2_{l',M} & \cdots & p^{n_1}_{l',M} & \cdots & p^L_{l',M} \end{bmatrix}.$$

10. A data transmission apparatus, comprising:
a processor configured to apply a pilot matrix to a long training field (LTF) to generate a pilot signal; and
a transceiver configured to send the pilot signal on M subcarriers from the data transmission apparatus to a receive end, wherein:
the pilot signal enables the receive end to calculate a phase deviation between a transmit antenna and a receive antenna corresponding to each spatial flow at the data transmission apparatus with reference to the pilot signal of each spatial flow at the data transmission apparatus and correct the pilot signal of each spatial flow according to the phase deviation,
the pilot matrix is formed from pilot sequences each having a pilot coefficient of each of L spatial flows successively in a wireless local area network,
the spatial flow is on each subcarrier in the M subcarriers in N consecutive symbol periods,
the pilot matrix is an orthogonal matrix,
N is a positive integer greater than or equal to L,
M is a positive integer multiple of L,
a pilot sequence that includes a pilot coefficient of an $n^{th}$ spatial flow successively that is sent on an $l^{th}$ subcarrier in the N consecutive symbol periods is $[p''_{1,l}\ p''_{2,l} \ldots p''_{N,l}]^T$, where n=1, 2, ..., L, and l=1, 2, ..., M, and the pilot matrix $P_l$ of the L spatial flows on the $l^{th}$ subcarrier in the N consecutive symbol periods is denoted as:

$$P_l = \begin{bmatrix} p^1_{1,l} & p^2_{1,l} & \cdots & p^n_{1,l} & \cdots & p^L_{1,l} \\ p^1_{2,l} & p^2_{2,l} & \vdots & p^n_{2,l} & \vdots & p^L_{2,l} \\ \vdots & \vdots & \vdots & \vdots & \vdots & \vdots \\ p^1_{N,l} & p^2_{N,l} & \cdots & p^n_{N,l} & \cdots & p^L_{N,l} \end{bmatrix}.$$

11. The apparatus according to claim 10, wherein the M subcarriers comprise L groups of subcarriers, and each group of subcarriers comprises one subcarrier.

12. The apparatus according to claim 10, wherein the M subcarriers comprise L groups of subcarriers, each group of subcarriers comprises two subcarriers, serial number differences of subcarriers in each group of subcarriers are equal, and a serial number difference of subcarriers in each group of subcarriers is greater than or equal to 1.

13. A data transmission apparatus, comprising:
a processor configured to apply a pilot matrix to a long training field (LTF) to generate a pilot signal; and
a transceiver configured to send the pilot signal on M subcarriers from the data transmission apparatus to a receive end, wherein:
the pilot signal enables the receive end to calculate a phase deviation between a transmit antenna and a receive antenna corresponding to each spatial flow at the data transmission apparatus with reference to the pilot signal of each spatial flow at the data transmission apparatus and correct the pilot signal of each spatial flow according to the phase deviation,
the pilot matrix is formed from pilot sequences each having a pilot coefficient of each of L spatial flows successively in a wireless local area network,
the spatial flow is on the M subcarriers in each symbol period in N consecutive symbol periods,
the pilot matrix is an orthogonal matrix,
N is a positive integer greater than or equal to L,
M is a positive integer multiple of L,
a pilot sequence that includes a pilot coefficient of an $n^{th}$ spatial flow successively on the M subcarriers in an $l'^{th}$ symbol period is $[p''_{l',1}\ p''_{l',2} \ldots p''_{l',L}]^T$, where n=1, 2, ..., L, and l'=1, 2, ..., N, and
the pilot matrix $Q_{l'}$ of the L spatial flows on the M subcarriers in the $l'^{th}$ symbol period is denoted as:

$$Q_{l'} = \begin{bmatrix} p^1_{l',1} & p^2_{l',1} & \cdots & p^{n_1}_{l',1} & \cdots & p^L_{l',1} \\ p^1_{l',2} & p^2_{l',2} & \vdots & p^{n_1}_{l',2} & \vdots & p^L_{l',2} \\ \vdots & \vdots & \vdots & \vdots & \vdots & \vdots \\ p^1_{l',M} & p^2_{l',M} & \cdots & p^{n_1}_{l',M} & \cdots & p^L_{l',M} \end{bmatrix}.$$

14. A data transmission apparatus, comprising:
a transceiver configured to receive a pilot signal of each spatial flow on M subcarriers in N consecutive symbol periods separately, wherein the pilot signal is sent by a transmit end, and the pilot signal of each spatial flow is generated by the transmit end by applying a pilot matrix to a long training field LTF; and
a processor configured to:
calculate a phase deviation between a transmit antenna and a receive antenna corresponding to each spatial flow at the transmit end with reference to the pilot signal of each spatial flow at the transmit end, and correct the pilot signal of each spatial flow according to the phase deviation, wherein:

the pilot matrix comprises a pilot sequence that includes a pilot coefficient of each of the spatial flows successively on the M subcarriers in the N consecutive symbol periods, the pilot matrix is an orthogonal matrix, L is a quantity of spatial flows in a wireless local area network, N is a positive integer greater than or equal to L, M is a positive integer multiple of L, a pilot sequence that includes a pilot coefficient of an $n^{th}$ spatial flow successively that is sent on an $l^{th}$ subcarrier in the N consecutive symbol periods is $[p''_{1,l}\ p''_{2,l}\ \cdots\ p''_{N,l}]^T$, where $n=1, 2, \ldots, L$, and $l=1, 2, \ldots, M$, and the pilot matrix $P_l$ of the L spatial flows on the $l^{th}$ subcarrier in the N consecutive symbol periods is denoted as:

$$P_l = \begin{bmatrix} p_{1,l}^1 & p_{1,l}^2 & \cdots & p_{1,l}^n & \cdots & p_{1,l}^L \\ p_{2,l}^1 & p_{2,l}^2 & \vdots & p_{2,l}^n & \vdots & p_{2,l}^L \\ \vdots & \vdots & \vdots & \vdots & \vdots & \vdots \\ p_{N,l}^1 & p_{N,l}^2 & \cdots & p_{N,l}^n & \cdots & p_{N,l}^L \end{bmatrix}.$$

15. The apparatus according to claim 14, wherein the processor is further configured to:

correct the pilot signal of each spatial flow at the transmit end according to the phase deviation between the transmit antenna and the receive antenna corresponding to each spatial flow at the transmit end; and perform channel estimation on the transmit antenna corresponding to each spatial flow at the transmit end according to the corrected pilot signal and the LTF of each subcarrier in the M subcarriers.

16. The apparatus according to claim 14, wherein the M subcarriers comprise L groups of subcarriers, and each group of subcarriers comprises one subcarrier.

17. The apparatus according to claim 14, wherein the M subcarriers comprise L groups of subcarriers, each group of subcarriers comprises two subcarriers, serial number differences of subcarriers in each group of subcarriers are equal, and a serial number difference of subcarriers in each group of subcarriers is greater than or equal to 1.

18. A data transmission apparatus, comprising:

a transceiver configured to receive a pilot signal of each spatial flow on M subcarriers in N consecutive symbol periods separately, wherein the pilot signal is sent by a transmit end, and the pilot signal of each spatial flow is generated by the transmit end by applying a pilot matrix to a long training field LTF; and a processor configured to:

calculate a phase deviation between a transmit antenna and a receive antenna corresponding to each spatial flow at the transmit end with reference to the pilot signal of each spatial flow at the transmit end, and correct the pilot signal of each spatial flow according to the phase deviation, wherein:

the pilot matrix comprises a pilot sequence that includes a pilot coefficient of each of the spatial flows successively on the M subcarriers in each symbol period in the N consecutive symbol periods, the pilot matrix is an orthogonal matrix, L is a quantity of spatial flows in a wireless local area network, N is a positive integer greater than or equal to L, M is a positive integer multiple of L, a pilot sequence that includes a pilot coefficient of an $n^{th}$ spatial flow successively on the M subcarriers in an $l'^{th}$ symbol period is $[p''_{l',1}\ p''_{l',2}\ \cdots\ p''_{l',L}]^T$, where $n=1, 2, \ldots, L$, and $l'=1, 2, \ldots, N$, and the pilot matrix $Q_{l'}$ of the L spatial flows on the M subcarriers in the $l'^{th}$ symbol period is denoted as:

$$Q_{l'} = \begin{bmatrix} p_{l',1}^1 & p_{l',1}^2 & \cdots & p_{l',1}^{n_1} & \cdots & p_{l',1}^L \\ p_{l',2}^1 & p_{l',2}^2 & \vdots & p_{l',2}^{n_1} & \vdots & p_{l',2}^L \\ \vdots & \vdots & \vdots & \vdots & \vdots & \vdots \\ p_{l',M}^1 & p_{l',M}^2 & \cdots & p_{l',M}^{n_1} & \cdots & p_{l',M}^L \end{bmatrix}.$$

* * * * *